United States Patent
Perrig et al.

(10) Patent No.: US 9,177,153 B1
(45) Date of Patent: Nov. 3, 2015

(54) VERIFYING INTEGRITY AND GUARANTEEING EXECUTION OF CODE ON UNTRUSTED COMPUTER PLATFORM

(75) Inventors: Adrian Perrig, Pittsburgh, PA (US); Pradeep Khosla, Pittsburgh, PA (US); Arvind Seshadri, Pittsburgh, PA (US); Mark Luk, Fremont, CA (US); Leendert van Doorn, Valhalla, NY (US)

(73) Assignee: Carnegie Mellon University, Pittsburg, PA (US)

( * ) Notice: Subject to any disclaimer, the term of this patent is extended or adjusted under 35 U.S.C. 154(b) by 2026 days.

(21) Appl. No.: 11/545,924

(22) Filed: Oct. 10, 2006

Related U.S. Application Data

(60) Provisional application No. 60/724,682, filed on Oct. 7, 2005.

(51) Int. Cl.
*G06F 21/57* (2013.01)

(52) U.S. Cl.
CPC .................... *G06F 21/577* (2013.01)

(58) Field of Classification Search
CPC .................................................. G06F 21/577
USPC ....................................................... 726/22–25
See application file for complete search history.

(56) References Cited

U.S. PATENT DOCUMENTS

| | | | |
|---|---|---|---|
| 5,421,006 A * | 5/1995 | Jablon | G06F 21/565 713/187 |
| 5,892,899 A | 4/1999 | Aucsmith et al. | |
| 6,006,328 A | 12/1999 | Drake | |
| 6,128,774 A * | 10/2000 | Necula | G06F 9/44589 717/126 |
| 6,182,238 B1 * | 1/2001 | Cooper | 714/2 |
| 6,347,398 B1 * | 2/2002 | Parthasarathy | G06F 8/60 707/999.202 |
| 6,405,320 B1 * | 6/2002 | Lee et al. | 713/300 |
| 6,567,917 B1 | 5/2003 | Ziese | |
| 6,594,783 B1 * | 7/2003 | Dollin | G06F 8/427 714/38.14 |
| 6,597,917 B1 | 7/2003 | Meuronen | |
| 6,880,149 B2 | 4/2005 | Cronce | |
| 6,925,566 B1 | 8/2005 | Feigen et al. | |
| 6,988,250 B1 | 1/2006 | Proudler et al. | |
| 7,000,117 B2 | 2/2006 | Hiltunen et al. | |
| 7,000,151 B2 | 2/2006 | Dwyer | |
| 7,036,111 B2 | 4/2006 | Dollin et al. | |
| 7,085,933 B2 | 8/2006 | Challener et al. | |
| 7,131,143 B1 * | 10/2006 | LaMacchia | G06F 21/51 726/27 |

(Continued)

OTHER PUBLICATIONS

Schneier, "Applied Cryptrography", 1996, Wiley and Sons, Second Edition, pp. 75-77.*

Yumerefendi et al.; Published in: Proceeding EW 11 Proceedings of the 11th workshop on ACM SIGOPS European workshop; Article No. 37; 2004; ACM Digital Library.*

(Continued)

*Primary Examiner* — Bradley Holder

(74) *Attorney, Agent, or Firm* — Fox Rothschild LLP; Dennis M. Carleton

(57) ABSTRACT

A method, system, and apparatus for verifying integrity and execution state of an untrusted computer. In one embodiment, the method includes placing a verification function in memory on the untrusted computer; invoking the verification function from a trusted computer; determining a checksum value over memory containing both the verification function and the execution state of a processor and hardware on the untrusted computer; sending the checksum value to the trusted computer; determining at the trusted computer whether the checksum value is correct; and determining at the trusted computer whether the checksum value is received within an expected time period.

35 Claims, 30 Drawing Sheets

(56) References Cited

U.S. PATENT DOCUMENTS

| | | | | |
|---|---|---|---|---|
| 7,302,704 | B1* | 11/2007 | Elliott | H04L 45/02 380/2 |
| 7,370,211 | B2* | 5/2008 | Rindborg et al. | 713/191 |
| 7,376,970 | B2* | 5/2008 | Marinescu | 726/22 |
| 7,565,547 | B2* | 7/2009 | Matta | G06F 21/31 713/182 |
| 2003/0115453 | A1* | 6/2003 | Grawrock | 713/155 |
| 2003/0159090 | A1 | 8/2003 | Wray et al. | |
| 2003/0188231 | A1 | 10/2003 | Cronce | |
| 2004/0078572 | A1* | 4/2004 | Pearson et al. | 713/170 |
| 2004/0268140 | A1* | 12/2004 | Zimmer et al. | 713/200 |
| 2005/0066191 | A1* | 3/2005 | Thibadeau | 713/200 |
| 2005/0086509 | A1* | 4/2005 | Ranganathan | 713/200 |
| 2005/0102523 | A1* | 5/2005 | Harrison et al. | 713/185 |
| 2005/0235149 | A1* | 10/2005 | Beckmann et al. | 713/168 |
| 2005/0251857 | A1* | 11/2005 | Schunter et al. | 726/16 |
| 2006/0090209 | A1* | 4/2006 | Garay et al. | 726/26 |
| 2006/0179324 | A1* | 8/2006 | Hatakeyama | 713/187 |

OTHER PUBLICATIONS

Zhang; Secure code distribution; Published in: Computer (vol. 30 , Issue: 6 ); pp. 76-79; Date of Publication: Jun. 1997; IEEE Xplore.*
T. Garfinkel, B. Pfaff, J. Chow, M. Rosenblum, D. Boneh, "Terra: A Virtual Machine-Based Platform for Trusted Computing" SOSP '03, Oct. 2003.
Intel, LaGrande Technology Overview, "Today's IA-32 PCs", pp. 1-8.
Intel, "IA-32 Intel Architecture Software Developer's Manual", vol. 1, Basic Architecture, Sep. 2005.
K. Jones, "Loadable Kernel Modules" ;login: The Magazine of Usenix & Sage, Special Focus Issue: Security, Nov. 2001, pp. 43-49 vol. 26, No. 7.
R. Joshi, G. Nelson, K. Randall, "Denali: A Goal-directed Superoptimizer" PLDI '02, Jun. 2002, pp. 304-314.
R. Kennell, L. Jamieson, "Establishing the Genuinity of Remote Computer Systems", Proceedings of the 12th USENIX Security Symposium, USENIX Association, Aug. 2003, pp. 295-310.
S. King, P. Chen, "Backtracking Intrusions", SOSP '03, Oct. 2003, pp. 223-236.
A. Klimov, A. Shamir, "A New Class of Invertible Mappings", B. S. Kaliski, Jr., et al. (Eds.): CHES 2002, LNCS 2523, 2003, pp. 470-483.
N. Petroni, T. Fraser, J. Molina, W. Arbaugh, "Copilot—a Coprocessor-based Kernel Runtime Integrity Monitor", In Proceedings of USENIX Security Symposium, 2004, pp. 179-194.
R. Sailer, X. Zhang, T. Jaeger, L. van Doorn, "Design and Implementation of a TCG-based Integrity Measurement Architecture", Proceedings of the 13th USENIX Security Symposium, USENIX Association, Aug. 2004.
A. Seshadri, A. Perrig, L. van Doorn, P. Khosla, "SWATT: SoftWare-based ATTestation for Embedded Devices", In Proceedings of IEEE Symposium on Security and Privacy, May 2004.
U. Shankar, M. Chew, J. Tygar, "Side effects are not sufficient to authenticate software", In Proceedings of the 13th USENIX Security Symposium, Aug. 2004, pp. 89-101.
E. Shi, A. Perrig, L. van Doorn, "BIND: A Fine-grained Attestation Service for Secure Distributed Systems", In Proc. of the IEEE Symposium on Security and Privacy, 2005, pp. 154-168.
X. Wang, Y. Yin, H. Yu, "Finding Collisions in the Full SHA-1" In Proceedings of Crypto, Aug. 2005.
Y. Wang, R. Roussev, C. Verbowski, A. Johnson, D. Ladd, "AskStrider: What Has Changed on My Machine Lately?", Technical Report MSR-TR-2004-03, Microsoft Research, Microsoft Corp. Jan. 2004, pp. 0-12.
Y. Wang, B. Vo, R. Roussev, C. Verbowski, A. Johnson, "Strider GhostBuster: Why It's A Bad Idea for Stealth Software to Hide Files", Technical Report MSR-TR-2004-71, Microsoft Research, Microsoft Corp., Jul. 2004, pp. 1-15.
G. Wurster, P. van Oorschot, A. Somayaji, "A generic attack on checksumming-based software tamper resistance", Proceedings of the 2005 IEEE Symposium on Security and Privacy.
D. Zovi, "Kernel Rootkits", http://www/theta44.org/lkr.pdf, Jul. 3, 2001, dadizo@sandia.gov, pp. 1-6.
AMD, AMD64 Virtualizaton Codenamed "Pacifia" Technology, "Secure Virtual Machine Architecure Reference Manual", Pub. No. 33047, Rev. 3.01., May 2005.
"The Microarchitecture of the Intel Pentium 4 Processor on 90nm Technology", Intel Technology Journal, vol. 8, Issue 01, Feb. 18, 2004, ISSN 1535-864X, pp. 1-18.
B. Chen, R. Morris, "Certifying Program Execution with Secure Processors", Intel Corporation, 2004, developer.intel.com/technology/itj/index.htm.
A. Chuvakin, "Ups and Downs of UNIX/Linux Host-Based Security Solutions", ;login: The Magazine of USENIX & SAGE, Apr. 2003, pp. 57-62, vol. 28, No. 2.
R. Anderson, F. Bergadano, B. Crispo, J. Lee, C. Manifavas, R. Needham, "A New Family of Authentication Protocols", pp. 1-13, Oct. 1998, ACM Operating Systems Review, 32(4):9-20.
A. Klimov, A. Shamir, "New Cryptographic Primitives Based on Multiword T-Functions", B. Roy, W. Meier (Eds.), FSE 2004, LNCS 3017, pp. 1-15, 2004.
P. Levis, S. Madden, D. Gay, J. Polastre, R. Szewczyk, A. Woo, E. Brewer, D. Culler, "The Emergence of Networking Abstractions and Techniques in TinyOS", In Proceedings of Symposium on Networked Systems Design and Implementations (NSDI), Mar. 2004.
P. Levis, N. Patel, D. Culler, S. Shenker, "Trickle: A Self-Regulating Algorithm for Code Propagation and Maintenance in Wireless Sensor Networks", Proceedings of the First Symposium on Networked Systems Design and Implementation, USENIX Association, Mar. 2004.
D. Malan, M. Welsh, M. Smith, "A Public-Key Infrastructure for Key Distribution inTinyOS Based on Elliptic Curve Cryptography", In Proceedings of IEEE Conference on Sensor and Ad hoc Communications and Networks (SECON), Oct. 2004.
M. Shaneck, K. Mahadevan, V. Kher, Y. Kim, "Remote Software-based Attestation for Wireless Sensors", In European Workshop on Security and Privacy in Adhoc and Sensor Networks (ESAS), 2005, pp. 27-41.
A. Perrig, R. Szewczyk, V. Wen, D. Culler, J. Tygar, "SPINS: Security Protocols for Sensor Networks", ACM SIGMOBILE, 7/01, 2001, pp. 189-199.
T. Stathopoulos, J. Heidemann, D. Estrin, "A Remote Code Update Mechanism for Wireless Sensor Networks", CENS Technical Report #30, Center for Embedded Networked Sensing, UCLA Dept. of Computer Science.
T. Park, K. Shin, "Soft Tamper-Proofing via Program Integrity Verification in Wireless Sensor Networks" IEEECS, log No. TMC-0237-0704, published online Mar. 29, 2005, pp. 297-309.
C. Wan, A. Campbell, L. Krishnamurthy, "PSFQ: A Reliable Transport Protocol for Wireless Sensor Networks", WSNA '02, Sep. 28, 2002, pp. 1-11.
M. Bellare; R. Canetti, H. Krawczyk, "Keying Hash Functions for Message Authentication" (Preliminary version), Jan. 25, 1996, http://www.research.ibm.com/security/keyed-md5.html,pp. 1-19.
J. Deng, R. Han, S. Mishra, "Secure Code Distribution in Dynamically Programmable Wireless Sensor Networks", IPSN '06, Apr. 2006, pp. 292-300.
J. Douceur, "The Sybil Attack", Microsoft Research, pp. 1-6, In Proceedings of Workshop on Peer-to-Peer Systems (IPTPS), Mar. 2002.
D. Spinellis, "Reflection as a Mechanism for Software Integrity Verification", ACM Transctions on Information and Systems Security, vol. 3, No. 1, Feb. 2000, pp. 51-62.
P. Dutta, J. Hui, D. Chu, D. Culler, "Securing the Deluge Network Programming System", IPSN '06, Apr. 2006, pp. 326-333.
J. Hui, D. Culler, "The Dynamic Behavior of a Data Dissemination Protocol for Network Programming at Scale", SenSys '04, Nov. 2004, pp. 81-94.
Seshadri, A., Perrig, A., Van Doorn, L., Using Software-based Attestation for Verifying Embedded Systems in Cars, Embedded Security in Cars Workshop, 2004 IEEE Symposium, Nov. 10, 2004, Bochum, Germany.

* cited by examiner

1. $D$: $t_1 \leftarrow$ current time, $nonce \xleftarrow{R} \{0,1\}^n$
2. $D \rightarrow P$: $\langle nonce \rangle$
3. $P$: $c \leftarrow$ Checksum($nonce, P$)
4. $P \rightarrow D$: $\langle c \rangle$
5. $D$: $t_2 \leftarrow$ current time
   if $(t_2 - t_1 > \Delta t)$ then exit with failure
   else verify checksum $c$
6. $P$: $h \leftarrow$ Hash($nonce, E$)
7. $P \rightarrow D$: $\langle h \rangle$
8. $D$: verify measurement result $h$
9. $P$: transfer control to $E$
10. $E \rightarrow D$: $\langle$result (optional)$\rangle$

Fig. 2

//Input: $y$ number of iterations of the verification procedure
//Output: Checksum $C$, (10 segments in registers $C_0$ to $C_9$,
//         and 2 on stack $C_{stk_1}$, $C_{stk_2}$, each being 64 bits)
//Variables: $[code\_start, code\_end]$ - bounds of memory address under verification
//          $daddr$ - address of current memory access
//          $x$ - value of T function
//          $l$ - counter of iterations
//          $rflags$ - flags register
//          $jump\_target[1:0]$ - determines which code block to execute
//          $temp$ - temp register used to compute checksum
$daddr \leftarrow code\_start$
for $l = y$ to $0$ do
  Checksum 1
  //T function updates $x$ where $0 \leq x \leq 2^n$
  $x \leftarrow x + (x^2 \vee 5) \bmod 2^n$
  //Read $rflags$ and incorporate into $daddr$
  $daddr \leftarrow daddr + rflags$
  //Read from memory address $daddr$, calculate checksum. Let $C$ be the checksum
  vector and $j$ be the current index.
  $jump\_target \leftarrow not(jump\_target) + loop\_ctr \oplus x$
  $temp \leftarrow x \oplus C_{j-1} + daddr \oplus C_j$
  if $jump\_target[1] == 0$ and $jump\_target[0] == 0$ then
    $C_j \leftarrow C_j + mem[daddr + 8] + jump\_target$
  else
    $C_j \leftarrow C_j + jump\_target$
  end if
  $C_{j-1} \leftarrow C_{j-1} + temp$
  $C_{stk} \leftarrow C_{stk} \oplus jump\_target$
  $C_{j-2} \leftarrow C_{j-2} + C_j$
  $C_{j-3} \leftarrow C_{j-3} + C_{j-1}$
  $C_j \leftarrow rotate\_right(C_j)$
  //Update $daddr$ to perform pseudo-random memory traversal
  $daddr \leftarrow daddr + x$
  //Update $rsp$ and jump_target
  $rsp[1] \leftarrow C_j[1]$
  $j \leftarrow (j + 1) \bmod 11$
  $jump\_target[8:7] \leftarrow C_j[8:7]$
  $jump\_target[1:0] \leftarrow temp[0], temp[0]$

Fig. 10a if $jump\_target[8:7] = 0$ then
   goto Checksum 1
else if $jump\_target[8:7] = 1$ then
   goto Checksum 2
else if $jump\_target[8:7] = 2$ then
   goto Checksum 3
else if $jump\_target[8:7] = 3$ then
   goto Checksum 4
end if
Checksum 2
...
Checksum 3
...
Checksum 4
...
end for

Fig. 10b

| Assembly Instruction | Explanation |
| --- | --- |
| //Read memory | |
| add (rbx), r15 | memory read |
| sub 1, ecx | decrement loop counter |
| add rdi, rax | $x \leftarrow (x*x) \ OR \ 5 + x$ |
| //modifies jump_target register rdx and rdi | |
| xor r14, rdi | $rdi \leftarrow rdi \oplus C_{j-1}$ |
| add rcx, rdx | $rdx \leftarrow rdx + loopctr$ |
| add rbx, rdi | $rdi \leftarrow rdi + daddr$ |
| xor rax, rdx | input x (from T function) |
| xor r15, rdi | $rdi \leftarrow rdi \oplus c_j$ |
| //modifies checksum with rdx and rdi | |
| add rdx, r15 | modify checksum $C_j$ |
| add rdi, r14 | modify checksum $C_{j-1}$ |
| xor rdx, -8(rsp) | modify checksum on stack |
| xor r15, r13 | $C_{j-2} \leftarrow C_{j-2} \oplus C_j$ |
| add r14, r12 | $C_{j-3} \leftarrow C_{j-3} + C_{j-1}$ |
| rol r15 | $r15 \leftarrow rotate[r15]$ |
| //Pseudorandom memory access | |
| xor rdi, rbx | $daddr \leftarrow daddr \oplus random_bits$ |
| and mask1, ebx | modify daddr |
| or mask2, rbx | modify daddr |
| //Modify stack pointer and target jump address | |
| xor rdx, rsp | Modify rsp |
| and mask3, esp | create rsp |
| or mask4, rsp | create rsp |
| and 0x180, edx | jump_target $\leftarrow r15$ |
| and 0x1, rdi | $rdi \leftarrow rdi AND 0x1$ |
| add rdi, rdx | $rdx \leftarrow rdx + rdi$ |
| add rdi, rdi | shift rdi |
| add rdi, rdx | $rdx \leftarrow rdx + rdi$ |
| or mask, rdx | create jump_target address |
| xor rdx, r15 | add jump target address into checksum |
| //T function updates x, at rax | |
| mov rax, rdi | save value of T function |
| imul rax, rax | $x = x*x$ |
| or 0x5, rax | $x \leftarrow x*x \ OR \ 5$ |
| //Read flags | |
| pushfq | push rflags |
| add (rsp), rbx | $daddr \leftarrow daddr + rflags$ |
| jmp *rdx | jump to 1 of the 4 blocks |

Fig. 11

```
//Input: y number of iterations of the verification procedure
//Output: Checksum C
//Variables: [code_start, code_end] - bounds of memory address under verification
//           daddr - address of current memory access
//           b - content of daddr
//           x - value of T function
//           l - counter of iterations
daddr ← code_start
for l = y to 0 do
   //T function updates x
   x ← x + (x² ∨ 5)
   //Read from memory address a
   b ← mem[daddr++]
   if daddr > code_end then
      daddr ← code_start
   end if
   //Calculate checksum. Let C be the checksum vector and j be the current index.
   $C_j \leftarrow C_j + PC \oplus (b \oplus PC + l \oplus C_{j-2}) \oplus (x \oplus daddr + C_{j-1}) + PC$
   $C_j \leftarrow$ rotate left($C_j$)
   //update checksum index
   $j \leftarrow (j + 1) \mod 8$
end for
```

Fig. 18

```
//T function updates x
mov r15, &MPY           load x into first operand of hardware multiplier
mov r15, &OP2           load x into second operand of hardware multiplier
bis #0x05, &RESLO       OR 5 into output of hardware multiplier, which holds $x^2$
add &RESLO, r15         $x \leftarrow x + (x^2 \vee 5)$
//reads memory at address daddr, and calculates checksum ($C_j$ at register 6)
mov r14+, r13           $r13 \leftarrow mem[daddr++]$
xor r0, r13             $r13 \leftarrow r13 \oplus PC$
add r12, r13            $r13 \leftarrow r13 + loopIndex$
xor r4, r13             $r13 \leftarrow r13 \oplus C_{j-2}$
add r0, r6              $C_j \leftarrow C_j + PC$
xor r13, r6             $C_j \leftarrow C_j \oplus r13$
mov r15, r13            $r13 \leftarrow x($ from T function$)$
xor r14, r13            $r13 \leftarrow r13 \oplus daddr$
add r5, r13             $r13 \leftarrow r13 + C_{j-1}$
xor r13, r6             $C_j \leftarrow C_j \oplus r13$
add r0, r6              $C_j \leftarrow C_j + PC$
rla r6                  $C_j \leftarrow$ rotate left$[C_j]$
adc r6
```

Fig. 19

$B \rightarrow A$ : (ICE Challenge)
$B$ : $T_1$ = Current time
$A$ : Compute ICE checksum over memory region containing ICE verification function and the hash function
$A \rightarrow B$ : (ICE checksum)
$B$ : $T_2$ = Current time
Verify $(T_2 - T_1) \leq$ Allowed time to compute ICE checksum
Verify ICE checksum from sensor node using checksum computed by self
$A \rightarrow B$ : (Hash of rest of memory)
$B$ : Use hash of sensor node memory contents to determine if rest of sensor node memory is correct
Prepare code patches for sensor node
$B \rightarrow A$ : (Code patches)
$A$ : Apply patches

Fig. 22

$B \to A$: (ICE Challenge, DH half-key $g^y \bmod p$)

$B$: $T_1$ = Current time $A$: Compute ICE checksum over memory region containing ICE verification function, hash function and node ID
$C_1$ = ICE checksum
$r \xleftarrow{R} \{0,1\}^{128}$
Generate one-way hash chain, $d_2 = F(C_1) \oplus r, d_1 = F(d_2), d_0 = F(d_1)$ $A \to B$: $(d_0, MAC_{C_1}(d_0))$ $B$: $T_2$ = Current time
Verify $(T_2 - T_1) \leq$ Allowed time to compute ICE checksum
Compute MAC of $d_0$ using ICE checksum computed by self
If MAC of $d_0$ computed by self equals MAC of $d_0$ sent by sensor node, then node's ICE checksum is correct $A$: Compute hash of rest of memory $H_{mem}$ $A \to B$: $(MAC_{d_1}(H_{mem}))$ $A$: Generate DH half-key $g^x \bmod p$ $A \to B$: $(d_1, g^x \bmod p, MAC_{d_1}(g^x \bmod p))$ $B$: Verify $d_0 = F(d_1)$
Compute $MAC_{d_1}(H_{mem})$ using $d_1$ and $H_{mem}$ computed by self
Verify MAC of $H_{mem}$ returned by A $A \to B$: $(r)$ $B$: Compute $d_2 = F(C_1) \oplus r$ using $r$ and ICE checksum computed by self
Verify $d_1 = F(d_2)$
Verify MAC of $g^x \bmod p$ using $d_2$
Compute $(g^x \bmod p)^y \bmod p$ $A$: Compute $(g^y \bmod p)^x \bmod p$

Fig. 23

$B:$     $h_4 \xleftarrow{R} \{0,1\}^{144}$
Generate one-way hash chain $h_3 = F(h_4), h_2 = F(h_3), h_1 = F(h_2), h_0 = F(h_1)$ $B \rightarrow A:$     $\langle h_0, \{h_0\}_{K_B^{-1}} \rangle$ $A:$     Verify signature on $h_0$ using base station's public key from ROM $B:$     Wait for 15 secs to allow node to verify signature on $h_0$ $B \rightarrow A:$     $\langle h_1 \rangle$ $B:$     $T_1 =$ Current time $A:$     Verify $h_0 = F(h_1)$
Compute ICE checksum over memory region containing ICE verification function, hash function and node ID using $h_1$ as key
$C_1 =$ ICE checksum
$r \xleftarrow{R} \{0,1\}^{128}$
Generate one-way hash chain $d_2 = F(C_1) \oplus r, d_1 = F(d_2), d_0 = F(d_1)$ $A \rightarrow B:$     $\langle d_0, MAC_{C_1}(d_0) \rangle$ $B:$     $T_2 =$ Current time
Verify $(T_2 - T_1) \leq$ Allowed time to compute ICE checksum
Verify MAC of $d_0$ by recomputing MAC using ICE checksum computed by self
If MAC of $d_0$ computed by self equals MAC of $d_0$ sent by sensor node, then node's ICE checksum is $B \rightarrow A:$     $\langle h_2 \rangle$ $A:$     Verify base station's acknowledgment $(h_2)$, $h_1 = F(h_2)$
Compute hash of rest of memory
$H_{mem} =$ Hash of memory $A \rightarrow B:$     $\langle MAC_{d_1}(H_{mem}) \rangle$ $B \rightarrow A:$     $\langle h_3 \rangle$ $A:$     Verify base station's acknowledgment $(h_3)$, $h_2 = F(h_3)$ $A \rightarrow B:$     $\langle d_1 \rangle$ $B:$     Verify, $d_0 = F(d_1)$
Compute $MAC_{d_1}(H_{mem})$ using $d_1$ and $H_{mem}$ computed by self
Verify MAC of $H_{mem}$ returned by A $B \rightarrow A:$     $\langle codepatch, MAC_{h_4}(codepatch) \rangle$ $A \rightarrow B:$     $\langle r \rangle$ $B:$     Compute $d_2 = F(C_1) \oplus r$ using $r$ and ICE checksum computed by self
Verify, $d_1 = F(d_2)$ $B \rightarrow A:$     $\langle h_4 \rangle$ $A:$     Verify, $h_3 = F(h_4)$
Compute and verify $MAC_{h_4}(codepatch)$ using $h_4$
Apply patch

Fig. 24

| | |
|---|---|
| $B:$ | $h_4 \xleftarrow{R} \{0,1\}^{144}$ |
| | Generate one-way hash chain $h_3 = F(h_4), h_2 = F(h_3), h_1 = F(h_2), h_0 = F(h_1)$ |
| $B \to A:$ | $\{h_0, (h_0)_{K_B^{-1}}\}$ |
| $A:$ | Verify signature on $h_0$ using base station's public key from ROM |
| $B:$ | $y \xleftarrow{R} \{0,1\}^{112}$ |
| | Wait for 15 secs to allow node to verify signature on $h_0$ |
| $B \to A:$ | $(h_1, g^y \bmod p, MAC_{h_0}(g^y \bmod p))$ |
| $B:$ | $T_1 =$ Current time |
| $A:$ | Verify, $h_0 = F(h_1)$ |
| | Compute ICE checksum over memory region containing ICE verification function, hash function and node ID using $h_1$ as key |
| | $C_1 =$ ICE checksum |
| | $r \xleftarrow{R} \{0,1\}^{128}$ |
| | Generate one-way hash chain, $d_2 = F(C_1) \oplus r, d_1 = F(d_2), d_0 = F(d_1)$ |
| $A \to B:$ | $(d_0, MAC_{C_1}(d_0))$ |
| $B:$ | $T_2 =$ Current time |
| | Verify $(T_2 - T_1) \leq$ Allowed time to compute ICE checksum |
| | Verify MAC of $d_0$ by recomputing MAC using ICE checksum computed by self |
| | If MAC of $d_0$ computed by self equals MAC of $d_0$ sent by sensor node, then ICE checksum corr. |
| $B \to A:$ | $(h_2)$ |
| $A:$ | Verify base station's acknowledgment $(h_2), h_1 = F(h_2)$ |
| | Verify MAC of $g^y \bmod p$ using $h_2$ |
| | Compute hash of rest of memory |
| | $H_{mem} =$ Hash of memory |
| $A \to B:$ | $(MAC_{d_1}(H_{mem}))$ |
| $B \to A:$ | $(h_3)$ |
| $A:$ | Verify base station's acknowledgment $(h_3), h_2 = F(h_3)$ |
| | $x \xleftarrow{R} \{0,1\}^{112}$ |
| $A \to B:$ | $(d_1, g^x \bmod p, MAC_{d_1}(g^x \bmod p))$ |
| $B:$ | Verify, $d_0 = F(d_1)$ |
| | Compute $MAC_{d_1}(H_{mem})$ using $d_1$ and $H_{mem}$ computed by self |
| | Verify MAC of $H_{mem}$ returned by A |
| $B \to A:$ | $(h_4)$ |
| $A \to B:$ | $(r)$ |
| $B:$ | Compute $d_2 = F(C_1) \oplus r$ using $r$ and ICE checksum computed by self |
| | Verify, $d_1 = F(d_2)$ |
| | Verify MAC of $g^x \bmod p$ using $d_2$ |
| | Compute $(g^x \bmod p)^y \bmod p$ |
| $A:$ | Verify base station's acknowledgment $(h_4), h_3 = F(h_4)$ |
| | Compute $(g^y \bmod p)^x \bmod p$ |

Fig. 25

```
//Input: y number of iterations of the verification procedure
//Output: Checksum C
//Variables:
//    [code_start, code_end]: verified memory area
//    daddr: address of current memory access
//    b: content at daddr
//    x: value of T function
//    l: loop counter
//    SR: status (flags) register for l = y to 0 do
    //T function updates x using x
    $x \leftarrow x + (x^2 \vee 5) \mod 2^{16}$
    //Compute random memory address using x
    $daddr = ((daddr \oplus x) \wedge MASK) + code\_start$
    //Calculate checksum. j: current index into checksum vector.
    $C_j \leftarrow C_j + PC \oplus mem[daddr] + l \oplus C_{j-1} + x \oplus daddr +$
        $C_{j-2} \oplus SR$
    $C_j \leftarrow \text{rotate left}(C_j)$
    //update checksum index
    $j \leftarrow (j+1) \mod 10$
end for
```

Fig. 29

| Assembly Instruction | Explanation |
|---|---|
| //T function updates x | |
| mov r15, &MPY | load x into first operand of hardware multiplier |
| mov r15, &OP2 | load x into second operand of hardware multiplier |
| bis #0x05, &RESLO | OR 5 into output of hardware multiplier, which holds $x^2$ |
| | $x \leftarrow x + (x^2 \vee 5) \bmod 2^n$ |
| add &RESLO, r15 | |
| //modifies address daddr, based on x from T function | |
| xor r14, r6 | $daddr \leftarrow daddr \oplus x$ |
| and #0x1FF, r6 | mask last few bits of $daddr$ |
| add #ICE_LOOP, r6 | $daddr \leftarrow daddr + $ ICE LOOP |
| //reads memory at address daddr, and calculates checksum | |
| add r10, r6 | $C_j \leftarrow C_j + PC$ |
| xor @r14, r6 | $C_j \leftarrow C_j \oplus mem[daddr]$ |
| add r13, r6 | $C_j \leftarrow C_j + loopIndex$ |
| xor r5, r6 | $C_j \leftarrow C_j \oplus C_j - 1$ |
| add r15, r6 | $C_j \leftarrow C_j + x$ (from T function) |
| xor r14, r6 | $C_j \leftarrow C_j \oplus daddr$ |
| add r4, r6 | $C_j \leftarrow C_j + C_{j-2}$ |
| xor SR, r6 | $C_j \leftarrow C_j \oplus$ status register |
| rla r6 | $C_j \leftarrow$ rotate left $[C_j]$ |
| adc r6 | |

Fig. 30

B → A : (ICE Challenge)
B : T₁ = Current time
A : Compute ICE checksum over memory region containing the ROM, the ICE verification function, and the SCUBA executable A → B : (ICE checksum)
B : T₂ = Current time
Verify (T₂ − T₁) ≤ Time allowed to compute ICE checksum
Verify ICE checksum from node by recomputing it A → B : (Hash of code memory)
B : Use hash from node to determine if node's code memory is unmodified
Prepare code patches for sensor node B → A : (Code patches)
A : Apply patches

Fig. 32

| | |
|---|---|
| $B:$ | $h_4 \xleftarrow{R} \{0,1\}^{128}$<br>Generate one-way hash chain $h_3 = F(h_4)$,<br>$h_2 = F(h_3), h_1 = F(h_2), h_0 = F(h_1)$ |
| $B \to A:$ | $(h_0, \{h_0\}_{K_B^{-1}})$ |
| $A:$ | Verify signature on $h_0$ using base station's public key from ROM |
| $B:$ | Wait for node to verify signature on $h_0$ |
| $B:$ | $T_1 = $ Current time |
| $B \to A:$ | $(h_1)$ |
| $A:$ | Verify $h_0 = F(h_1)$<br>Compute ICE checksum over expected memory region using $h_1$ as challenge<br>$C = $ ICE checksum<br>$r \xleftarrow{R} \{0,1\}^{128}$<br>Generate one-way hash chain $d_2 = F(C \| r)$,<br>$d_1 = F(d_2), d_0 = F(d_1)$ |
| $A \to B:$ | $(d_0, MAC_C(d_0))$ |
| $B:$ | $T_2 = $ Current time<br>Verify $(T_2 - T_1) \leq$ Allowed time<br>Verify MAC of $d_0$ by recomputing ICE checksum.<br>Abort if incorrect. |
| $B \to A:$ | $(h_2)$ |
| $A:$ | Verify base station's acknowledgement<br>$h_1 = F(h_2)$<br>Compute hash of code memory<br>$H_{mem} = $ Hash of code memory |
| $A \to B:$ | $(H_{mem}, MAC_{d_1}(H_{mem}))$ |
| $B \to A:$ | $(h_3)$ |
| $A:$ | Verify base station's acknowledgement<br>$h_2 = F(h_3)$ |
| $A \to B:$ | $(d_1)$ |
| $B:$ | Verify authenticity of $d_1$<br>$d_0 = F(d_1)$<br>Verify MAC of $H_{mem}$ returned by A.<br>If $H_{mem}$ sent by $A$ equals known good value then stop |
| $B \to A:$ | $(codepatch, MAC_{h_4}(codepatch))$ |
| $A \to B:$ | $(r)$ |
| $B:$ | Compute $d_2 = F(C \| r)$<br>Verify $d_1 = F(d_2)$ |
| $B \to A:$ | $(h_4)$ |
| $A:$ | Verify $h_3 = F(h_4)$<br>Compute and verify $MAC_{h_4}(codepatch)$ using $h_4$<br>Apply patch |

Fig. 33

VERIFYING INTEGRITY AND GUARANTEEING EXECUTION OF CODE ON UNTRUSTED COMPUTER PLATFORM

CROSS-REFERENCE TO RELATED APPLICATIONS

This application claims priority from U.S. Provisional Patent Application Ser. No. 60/724,682, filed Oct. 7, 2005, and which is incorporated herein by reference. This application is related to U.S. non-provisional patent application Ser. No. 12/720,008, filed Mar. 9, 2010.

STATEMENT REGARDING FEDERALLY-SPONSORED RESEARCH AND DEVELOPMENT

This invention was made with government support under Grant DAAD19-02-1-0389 from the Army Research Office. The government may have certain rights in this invention.

FIELD OF THE INVENTION

The present invention is directed generally to methods, apparatuses, and systems for verifying code integrity and guaranteeing execution of code on untrusted computers.

BACKGROUND OF THE INVENTION

Obtaining a guarantee that a given code has executed untampered on an untrusted legacy computing platform has been an open research challenge. We refer to this as the problem of verifiable code execution. An untrusted computing platform can tamper with code execution in at least three ways: 1) by modifying the code before invoking it; 2) executing alternate code; or 3) modifying execution state such as memory or registers when the code is running.
Verifiable Code Execution Two techniques, Cerium [B. Chen and R. Morris. Certifying program execution with secure procesors. In Proceedings of HotOS IX, 2003] and BIND [E. Shi, A. Perrig, and L. van Doorn. Bind: A fine-grained attestation service for secure distributed systems. In *Proc. of the IEEE Symposium on Security and Privacy*, pages 154-168, 2005], have been proposed to address the problems of verifiable code execution. These use hardware extensions to the execution platform to provide a remote host with the guarantee of verifiable code execution. Cerium relies on a physically tamper-resistant CPU with an embedded public-private key pair and a μ-kernel that runs from the CPU cache. BIND requires that the execution platform has a TPM chip and CPU architectural enhancements similar to those found in Intel's LaGrande Technology (LT) [Intel Corp. *LaGrande Technology Architectural Overview*, September 2003] or AMD's Secure Execution Mode (SEM) [AMID platform for trustworthy computing. In *WinHEC*, September 2003] and Pacifica technology [Secure virtual machine architecture reference manual. AMD Corp., May 2005]. Unlike the present invention, neither Cerium nor BIND can be used on legacy computing platforms.

Intel's LaGrande Technology (LT) [Intel Corp. *LaGrande Technology Architectural Overview*, September 2003] and AMD's Secure Virtual Machine (SVM) extensions [AMD64 Architecture Programmer's Manual Volume 2: System Programming, Rev 3.11, December 2005] are also hardware-based technologies that can be used to obtain the guarantee of verifiable code execution. Unlike the present invention, however, both these technologies are not suitable for legacy computers since they require CPU architecture extensions and a cryptographic co-processor in the form of a Trusted Platform Module (TPM) chip.
Memory Integrity Verification Techniques for memory integrity verification allow a remote verifier to check the memory contents of an untrusted computer to detect the presence of malicious changes. Memory integrity verification provides a strictly weaker property than verifiable code execution. The verifier can only obtain the guarantee that the code present in the memory of an untrusted computer is unmodified but cannot obtain the guarantee that the correct code will execute untampered on the untrusted computer. Prior work in the area of memory integrity verification can be classified into hardware-based and software-based approaches.
Hardware-Based Techniques.

Sailer et al. describe a "load-time attestation" technique that relies on the TPM chip standardized by the Trusted Computing Group [R. Sailer, X. Zhang, T. Jaeger, and L. van Doorn. Design and implementation of a TCG-based integrity measurement architecture. In *Proceedings of USENIX Security Symposium*, pages 223-238, 2004]. Their technique allows a remote verifier to verify what software was loaded into the memory of a platform. However, a malicious peripheral could overwrite code that was just loaded into memory with a DMA-write, thereby breaking the load-time attestation guarantee. Also, as discussed herein, the load-time attestation property provided by the TCG standard is no longer secure since the collision resistance property of SHA-1 has been compromised.

Terra uses a Trusted Virtual Machine Monitor (TVMM) to partition a tamper-resistant hardware platform in multiple virtual machines (VM) that are isolated from each other [T. Garfinkel, B. Pfaff, J. Chow, M. Rosenblum, and D. Boneh. Terra: A virtual machine-based platform for trusted computing. In *In Proceedings of ACM Symposium on Operating Systems Principles (SOSP)*, 2003]. CPU-based virtualization and protection are used to isolate the TVMM from the VMs and the VMs from each other. Although the authors only discuss load-time attestation using a TPM, Terra is capable of performing run-time attestation on the software stack of any of the VMs by asking the TVMM to take integrity measurements at any time. All the properties provided by Terra are based on the assumption that the TVMM is uncompromised when it is started and that it cannot be compromised subsequently. Terra uses the load-time attestation property provided by TCG to guarantee that the TVMM is uncompromised at start-up. Since this property of TCG is compromised, none of the properties of Terra hold. Even if TCG were capable of providing the load-time attestation property, the TVMM could be compromised at run-time if there are vulnerabilities in its code.

In Copilot, Petroni et al. use an add-in card connected to the PCI bus to perform periodic integrity measurements of the in-memory Linux kernel image [N. Petroni, T. Fraser, J. Molina, and W. Arbaugh. Copilot—a coprocessor-based kernel runtime integrity monitor. In *Proceedings of USENIX Security Symposium*, pages 179-194, 2004]. These measurements are sent to the trusted verifier through a dedicated side channel. The verifier uses the measurements to detect unauthorized modifications to the kernel memory image. The Copilot PCI card cannot access CPU-based state such as the pointer to the page table and pointers to interrupt and exception handlers. Without access to such CPU state, it is impossible for the PCI card to determine exactly what resides in the memory region that the card measures. The adversary can exploit this lack of knowledge to hide malicious code from the PCI card. For instance, the PCI card assumes that the Linux kernel code begins at virtual address 0xc0000000, since it does not have access to the CPU register that holds the pointer to the page tables. While this assumption is generally true on 32-bit systems based on the Intel x86 processor, the adversary can place a correct kernel image starting at address 0xc0000000 while in fact running a malicious kernel from another memory location. The authors of Copilot were aware of this attack [W. Arbaugh. Personal communication, May 2005]. It is not possible to prevent this attack without access to the CPU state. Also, if the host running Copilot has an IOMMU, the adversary can re-map the addresses to perform a data substitution attack. When the PCI card tries to read a location in the kernel, the IOMMU automatically redirects the read to a location where the adversary has stored the correct copy.

The kernel rootkit detector we build using the present invention is able to provide properties equivalent to Copilot without the need for additional hardware. Further, because our rootkit detector has access to the CPU state, it can determine exactly which memory locations contain the kernel code and static data. This ensures that our rootkit detector measures the running kernel and not a correct copy masquerading as a running kernel.

Software-Based Techniques.

Genuinity is a technique proposed by Kennell and Jamieson that explores the problem of detecting the difference between a simulator-based computer system and an actual computer system [R. Kennell and L. Jamieson. Establishing the genuinity of remote computer systems. In *Proceedings of USENIX Security Symposium*, August 2003]. Genuinity relies on the premise that simulator-based program execution is bound to be slower because a simulator has to simulate the CPU architectural state in software, in addition to simulating the program execution. A special checksum function computes a checksum over memory, while incorporating different elements of the architectural state into the checksum. By the above premise, the checksum function should run slower in a simulator than on an actual CPU. While this statement is probably true when the simulator runs on an architecturally different CPU than the one it is simulating, an adversary having an architecturally similar CPU can compute the Genuinity checksum within the alloted time while maintaining all the necessary architectural state in software. As an example, in their implementation on the x86, Kennell and Jamieson propose to use special registers, called Model Specific Registers (MSR), that hold various pieces of the architectural state like the cache and TLB miss count. The MSRs can only be read and written using the special rdmsr and wrmsr instructions. We found that these instructions have a long latency (≈300 cycles). An adversary that has an x86 CPU could simulate the MSRs in software and still compute the Genuinity checksum within the alloted time, even if the CPU has a lower clock speed than what the adversary claims. Also, Shankar et al. show weaknesses in the Genuinity approach [U. Shankar, M. Chew, and J. D. Tygar. Side effects are not sufficient to authenticate software. In *Proceedings of USENIX Security Symposium*, pages 89-101, August 2004].

SWATT is a technique proposed by Seshadri et al. that performs attestation on embedded devices with simple CPU architectures using a software verification function [A. Seshadri, A. Perrig, L. van Doorn, and P. Khosla. SWATT: Software-based attestation for embedded devices. In *Proceedings of IEEE Symposium on Security and Privacy*, May 2004]. The verification function is constructed so that any attempt to tamper with it will increase its running time. However, SWATT cannot be used in systems with complex CPUs. Also, since SWATT checks the entire memory, its running time becomes prohibitive on systems with large memories.

Other prior art dealing with software-based memory integrity verification that are based on computing hash values over code rely on the untrusted computer correctly performing the hash computation. See, for example, U.S. Pat. Nos. 6,567,917 and 6,925,566. Therefore, an attacker can defeat these techniques by simply subverting the hash computation of the untrusted computer.

Software Tamperproofing

Software tamperproofing is based on constructing self-checksumming code i.e. that computes checksums over its own instruction sequence. See, for example, U.S. Pat. No. 6,006,328. The claim is that doing so allows a piece of code to check its own integrity as it executes, without relying on an remote verifier. However, this claim is incorrect since all software tamperproofing techniques in existence today are vulnerable to two attacks: the Split-TLB Attack and Virtualization-based attacks. The Split-TLB Attack utilizes the existence of separate instruction and data translation look-aside buffers (TLB) in modern CPUs [G. Wurster, P. van Oorschot, and A. Somayaji. A generic attack on checksumming-based software tamper resistance. In Proceedings of IEEE Symposium on Security and Privacy, May 2005]. The attack desynchronizes the instruction and data TLBs so that the same virtual address translates to one physical address when used as an instruction pointer and translates to a different physical address than when used as a data pointer. Therefore, the Split-TLB Attack ensures that self-checksumming code computes checksums not over its own instructions but over a different copy of these instructions stored elsewhere in memory.

It is also possible to circumvent self-checksumming code by running the code inside a virtual machine (VM) hosted on top of a malicious virtual machine monitor (VMM). The VMM can undetectably interpose itself in to the execution of the self-checksumming code to ensure that the checksums computed by the code will be correct even though the code has been modified.

Accordingly, there is a need for improved methods, apparatuses, and systems for verifying code integrity and guaranteeing execution of code on untrusted computer platforms. Those and other advantages of the present invention will be described in more detail hereinbelow.

BRIEF SUMMARY OF THE INVENTION

The present invention is applicable to many embodiments and variations. Several embodiments of the present invention will be described, although advantages of the present invention may be realized with other variations and embodiments.

According to one embodiment of the present invention includes a method of verifying integrity and execution state of an untrusted computer, comprising placing a verification function in memory on the untrusted computer; invoking the verification function from a trusted computer; determining a checksum value over memory containing both the verification function and the execution state of a processor and hardware on the untrusted computer; sending the checksum value to the trusted computer; determining at the trusted computer whether the checksum value is correct; and determining at the trusted computer whether the checksum value is received within an expected time period.

In another embodiment the invention is a system including a first computer, a second computer, and a communication link connecting the first and second computers. The second computer includes a processor and a memory connected to the processor, wherein the memory includes computer-readable instructions which, when executed by the processor, cause placing a verification function in memory of the first computer, invoking the verification function from the second computer, wherein invoking the verification function establishes an untampered execution environment in the first computer in which the verification function and the target executable execute; determining whether the verification function and the target executable are unmodified from a value expected by the second computer, determining a state of the untampered execution environment, and invoking the target executable to execute in the untampered execution environment. In other embodiments, more than two computers can be used according to the present invention.

In another embodiment the invention is a computer-readable medium having stored thereon a set of instructions which, when executed by a first processor, cause the first processor to place a verification function in memory of a second processor; invoke the verification function from the first processor, wherein invoking the verification function establishes an untampered execution environment in the second processor in which the verification function and a target executable execute; determine whether the verification function and the target executable are unmodified from a value expected by the first processor; determine a state of the untampered execution environment; and invoke the target executable to execute in the untampered execution environment. In other embodiments, more than two processors can be used according to the present invention.

Many variations are possible with the present invention. For example, functions and implementations other than those described herein may be used with the present invention. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein:

FIG. 2 illustrates one embodiment of protocol according to the present invention, in which the numbering of events is the same as in FIG. 1, D is the dispatcher, P the verification function, and E is the executable.

FIGS. 10a and 10b illustrate one embodiment of Verification Function Pseudocode.

FIG. 11 illustrates one embodiment of Checksum Assembly Code.

FIG. 18 illustrates one embodiment of ICE Pseudo code according to the present invention.

FIG. 19 illustrates one embodiment of ICE Assembly code according to the present invention.

FIG. 22 illustrates one embodiment of protocol for detecting intrusion and sending code updates between the base station 102B and a sensor node 104 A.

FIG. 23 illustrates one embodiment of protocol for symmetric key establishment between the base station 102B and a sensor node 104 A. F is a cryptographic hash function based on the RC5 block cipher. The protocol uses a CBCMAC derived from RC5.

FIG. 24 illustrates one embodiment of the protocol that is used by the base station 102(B) detecting intrusion in a sensor node 104 and sending code updates to a sensor node 104 (A).

FIG. 25 illustrates one embodiment of the detailed protocol for symmetric key establishment between the base station, B, and a sensor node, A.

FIG. 29 illustrates one embodiment of ICE Pseudocode.

FIG. 30 illustrates one embodiment of ICE Assembly code.

FIG. 32 illustrates one embodiment of SCUBA Protocol between the base station B and a sensor node A.

FIG. 33 illustrates one embodiment of the full SCUBA protocol in which B is the base station, A is a potentially compromised node, and F is a cryptographic hash function.

DETAILED DESCRIPTION OF THE INVENTION

Figure 1:
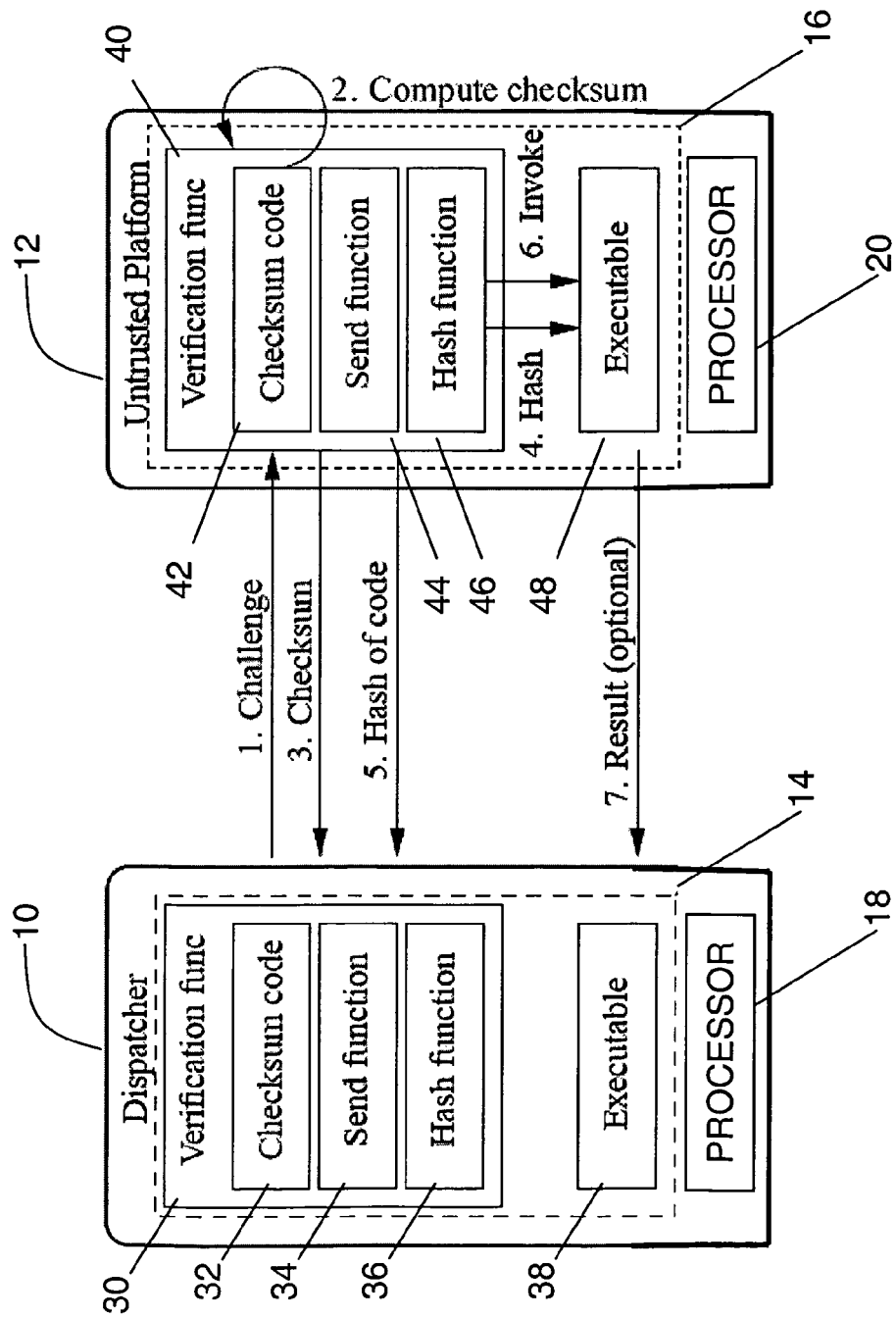
FIG. 1 illustrates an overview of one embodiment of the present invention in which the numbers represent the temporal ordering of events.

The present invention is applicable to many embodiments and variations. Several embodiments of the present invention will be described, although advantages of the present invention may be realized with other variations and embodiments. Furthermore, the present invention will generally be described in terms of a "dispatcher" and an "untrusted computer" in the first section, and as "base stations" and "sensor nodes" in the second and third sections. Other terms are also used. For example, the present invention will sometimes be described in terms of a "verifier" and a "device" or as a "verifier" and an "attestation platform". These and other terms are different ways of expressing the present invention in different environments and implementations. Other terms, such as "first computer "and "second computer", "first processor" and "second processor", and other terms may also be used to describe the present invention.

1.1 First Embodiment

In the first embodiment, the present invention includes a software-based primitive called Pioneer which is directed to addressing the problem of verifiable code execution on legacy computing platform without relying on secure co-processors or CPU architecture extensions such as virtualization support. Pioneer is based on a challenge-response protocol between external trusted entities, called dispatchers, and an untrusted computing platform, called the untrusted platform. To simplify understanding, in what follows we consider the case where there is only one dispatcher. One can easily extend our description based on one dispatcher to multiple dispatchers. The dispatcher communicates with the untrusted platform over a communication link, such as a network connection. After a successful invocation of Pioneer, the dispatcher obtains assurance that: 1) an arbitrary piece of code, called the executable, on the untrusted platform is unmodified; 2) the unmodified executable is invoked for execution on the untrusted platform; and 3) the executable is executed untampered, despite the presence of malicious software on the untrusted platform. According to some embodiments, the present invention can provide the verifiable code execution property solely through software techniques.

To provide these properties, we assume that the dispatcher knows the hardware configuration of the untrusted platform, and that the untrusted platform cannot collude with other devices during verification. We also assume that the communication channel between the dispatcher and the untrusted platform provides the property of message-origin authentication, i.e., the communication channel is configured so that the dispatcher obtains the guarantee that the Pioneer packets it receives originate from the untrusted platform. Furthermore, to provide the guarantee of untampered code execution, we assume that the executable is self-contained, not needing to invoke any other software on the untrusted platform, and that it can execute at the highest processor privilege level with interrupts turned off.

The dispatcher uses Pioneer to dynamically establish a trusted computing base on the untrusted platform, called the dynamic root of trust. All code contained in the dynamic root of trust is guaranteed to be unmodified and is guaranteed to execute in an untampered execution environment. Once established, the dynamic root of trust measures the integrity of the executable and invokes the executable. The executable is guaranteed to execute in the untampered execution environment of the dynamic root of trust. In Pioneer, the dynamic root of trust is instantiated through the verification function, a self-checking function that computes a checksum over its own instructions. The checksum computation slows down noticeably if the adversary tampers with the computation. Thus, if the dispatcher receives the correct checksum from the untrusted platform within the expected amount of time, it obtains the guarantee that the verification function code on the execution platform is unmodified.

Pioneer can be used as a basic primitive for developing security applications. We illustrate this by designing a kernel rootkit detector. Our rootkit detector uses a software-based kernel integrity monitor. Instead of using rootkit signatures or low level filesystem scans to find files hidden by a rootkit, our kernel integrity monitor computes periodic hashes of the kernel code segment and static data structures to detect unauthorized kernel changes. The trusted computer uses Pioneer to obtain a guarantee that the kernel integrity monitor is unmodified and runs untampered. When implemented on version 2.6 of the Linux kernel, our rootkit detector was able to detect all publicly-known rootkits for this series of the Linux kernel.

An important property of Pioneer is that it enables software-based code attestation [A. Seshadri, A. Perrig, L. van Doom, and P. Khosla. SWATT: Software-based attestation for embedded devices. In *Proceedings of IEEE Symposium on Security and Privacy*, May 2004]. Code attestation allows a trusted entity, known as the verifier, to verify the software stack running on another entity, known as the attestation platform. The verifier and the attestation platform are usually different physical computing devices. A measurement agent on the attestation platform takes integrity measurements of the platform's software stack and sends them to the verifier. The verifier uses the integrity measurements obtained from the attestation platform to detect modifications in the attestation platform's software stack.

The Trusted Computing Group (TCG) has released standards for secure computing platforms, based on a tamper-resistant chip called the Trusted Platform Module (TPM)

[Trusted Computing Group (TCG). https://www.trustedcomputinggroup.org/, 2003]. The verifier can use the TPM on the attestation platform to obtain the guarantee of load-time attestation, whereby the verifier obtains a guarantee of what code was loaded into the system memory initially. All code is measured before it is loaded and the measurements are stored inside the TPM. In response to an attestation request, the attestation platform sends the load-time measurements to the verifier.

The SHA-1 hash function is used as the measurement agent in TCG. However, the collision resistance property of SHA-1 has been compromised [Xiaoyun Wang, Yiqun Yin, and Hongbo Yu. Finding collisions in the full sha-1. In *Proceedings of Crypto*, August 2005]. As a result, the adversary can exploit this vulnerability to create a good version and a malicious version of an executable with the same hash value. The adversary can then undetectably exchange the good copy of the executable with the malicious copy on the attestation platform. After obtaining the load-time measurements from the attestation platform, the verifier believes that the attestation platform loaded the good copy of the executable. In reality, the attestation platform has loaded the malicious copy. Hence, the load-time attestation guarantee provided by TCG does not hold anymore. Also, other systems that rely on the load-time attestation provided by TCG such as Terra, Intel's LaGrande Technology and AMD's Pacifica are compromised as well [Secure virtual machine architecture reference manual. AMD Corp., May 2005; T. Garfinkel, B. Pfaff, J. Chow, M. Rosenblum, and D. Boneh. Terra: A virtual machine-based platform for trusted computing. In *In Proceedings of ACM Symposium on Operating Systems Principles (SOSP)*, 2003; Intel Corp. *LaGrande Technology Architectural Overview*, September 2003].

It is not possible to update the TCG measurement agent using software methods. The only way to update is to physically replace hardware. TCG is designed this way to prevent an adversary from replacing the measurement agent with a malicious version. However, this also means that whenever the cryptographic primitives used by TCG are compromised, the only way to re-secure already deployed systems is to physically replace their hardware.

The software-based code attestation provided by Pioneer does not require any hardware extensions to the attestation platform. The verifier depends on Pioneer to guarantee the verifiably correct execution of the measurement agent. Pioneer-based code attestation has three main advantages: 1) it can be updated using software methods if the underlying primitives are compromised, 2) it works on legacy systems that lack secure co-processors or other hardware enhancements to protect the measurement agent from a malicious attestation platform, and 3) it provides the property of run-time attestation, i.e., the verifier can verify the integrity of software running on the attestation platform at the present time. Run-time attestation provides a stronger guarantee than the TCG-based load-time attestation, since software can be compromised by dynamic attacks after loading.

1.2 Problem Definition, Assumptions & Attacker Model

In this section, we describe the problem we address, discuss the assumptions we make, and describe our attacker model.

1.2.1 Problem Definition

We define the problem of verifiable code execution, in which the dispatcher wants a guarantee that some arbitrary code has executed untampered on an untrusted external platform, even in the presence of malicious software on the external platform.

The untrusted platform has a self-checking function, called the verification function. The dispatcher invokes the verification function by sending a challenge to the untrusted platform. The verification function returns a checksum to the dispatcher. The dispatcher has a copy of the verification function and can independently verify the checksum. If the checksum returned by the untrusted platform is correct and is returned within the expected time, the dispatcher obtains the guarantee that a dynamic root of trust exists on the untrusted platform. The code in the dynamic root of trust measures the executable, sends the measurement to the dispatcher, and invokes the executable. The executable runs in an untampered execution environment, which was set up as part of instantiating the dynamic root of trust. The dispatcher can verify the measurement since it has a copy of the executable. Taken together, the correctness of the checksum and correctness of the executable measurement provide the guarantee of verifiable code execution to the dispatcher.

Even if malicious software runs on the untrusted platform, it cannot tamper with the execution of the executable. The adversary can perform an active DoS attack and thwart Pioneer from being run at all. However, the adversary cannot cheat by introducing a false negative, where the correct checksum value has been reported within the expected time to the dispatcher, without the correct code executing on the untrusted platform.

1.2.2 Assumptions

We assume that the dispatcher knows the exact hardware configuration of the untrusted platform, including the CPU model, the CPU clock speed, and the memory latency. We also assume that the CPU of the untrusted platform is not overclocked. In addition, the untrusted platform has a single CPU, that does not have support for Symmetric Multi-Threading (SMT). For the x86 architecture, we also assume that the adversary does not generate a System Management Interrupt (SMI) on the untrusted platform during the execution of Pioneer.

We assume the communication channel between the dispatcher and the untrusted platform provides message-origin authentication i.e., the dispatcher is guaranteed that all Pioneer packets it receives originate at the untrusted platform. Also, we assume that the untrusted platform can only communicate with the dispatcher during the time Pioneer runs. Equivalently, the dispatcher can detect the untrusted platform attempting to contact other computing platforms. We make this assumption to eliminate the proxy attack, where the untrusted platform asks a faster computing device (proxy), to compute the checksum on its behalf.

Assuming that the untrusted platform has only one wired communication interface, we can provide message-origin authentication and eliminate the proxy attack by physically connecting the untrusted platform to dispatcher with a cable. Also, if the untrusted platform can only communicate over a Local Area Network (LAN), the network administrators can configure the network switches such that any packets sent by the untrusted platform will reach only the dispatcher.

1.2.3 Attacker Model

We assume an adversary who has complete control over the software of the untrusted platform. In other words, the adversary has administrative privileges and can tamper with all software on the untrusted platform including the OS. However, we assume that the adversary does not modify the hardware on the untrusted platform. For example, the adversary does not load malicious firmware onto peripheral devices such as network cards or disk controllers, or replace the CPU with a faster one. In addition, the adversary does not perform DMA-based attacks like scheduling a DMA-write causing a benign peripheral device to overwrite the executable between the time of measurement and time of invocation.

1.3 Pioneer Overview

In this section, we give an overview of the verification function and describe the challenge-response protocol used to set up a dynamic root of trust on the execution platform and to obtain the guarantee of verifiable code execution.

1.3.1 The Verification Function

The verification function is the central component of the Pioneer system. It is responsible for performing an integrity measurement on the executable, setting up an execution environment for the executable that ensures untampered execution, and invoking the executable.

FIG. 1 illustrates a dispatcher 10 and an untrusted computer 12 according to one embodiment of the present invention. Sometimes the dispatcher 10 will be referred to as a "trusted computer". Similarly, the dispatcher 10 and untrusted 12 computers may also be referred to as "processors". For example, the "dispatcher" may be referred to as a "first processor" and the "untrusted computer" may be referred to as the "second processors", or vice versa. Alternatively, the words "trusted" and "untrusted" may be replaced with other designations, such as "first" and "second" or other designations to distinguish between the dispatcher 10 and the untrusted computer 12 computer and the methods and functions described herein.

The present invention will generally be described, in this embodiment and in other embodiments, as utilizing a single dispatcher, trusted computer, base station, etc. However, the present invention is applicable to the use of more than one dispatcher, trusted computer, base station, etc. For example, two or more dispatchers 10 may be used. Similarly, more than one untrusted computer 12 may present in a network or otherwise connected to the dispatchers 10.

The dispatcher 10 and untrusted 12 computers may also include other components such as memory 14, 16 and processors 18, 20. In the illustrated embodiment, the memory 14 of the dispatcher 10 includes a verification function 30, which includes checksum code 32, a send function 34, and a hash function 36. The memory 14 also includes an executable 38. Similarly, the memory of the untrusted computer 12 also includes a verification function 40, which includes a checksum code 42, a send function 44, and a hash function 46. The memory of the untrusted computer 12 also includes an executable 48. As FIG. 1 shows, the verification function, which is includes in both the dispatcher 10 and the untrusted computer 12, has three parts: a checksum code (32, 42), a hash function (34, 44) and a send function (36, 46).

Checksum Code.

The checksum code (32, 42) computes a checksum over the entire verification function (30, 40), and sets up an execution environment in which the send function (36, 46), the hash function (34, 44) and the executable (38, 48) are guaranteed to run untampered by any malicious software on the untrusted platform 12. The checksum code (32, 42) computes a fingerprint of the verification function (30, 40), i.e., if even a single byte of the verification function code is different, the checksum (32, 42) will be different with a high probability. Thus, a correct checksum (32, 42) provides a guarantee to the dispatcher that the verification function code (30, 40) is unmodified. However, an adversary could attempt to manipulate the checksum (32, 42) computation to forge the correct checksum value in spite of having modified the verification function (30, 40). For example, the adversary could detect when the checksum code (32, 42) reads the altered memory locations and redirect the read to other memory locations where the adversary has stored the correct values. To detect such manipulations, we construct the verification function (30, 40) such that if an adversary tries to manipulate the checksum computation, the computation time will noticeably increase. Thus, a correct checksum obtained within the expected amount of time is a guarantee to the dispatcher that the verification function code (30, 40) on the untrusted platform 12 is unmodified and that there is an environment for untampered execution on the untrusted platform 12. In other words, the dispatcher 10 obtains the guarantee that there is a dynamic root of trust on the untrusted platform 12.

Hash Function.

In the illustrated embodiment SHA-1 is used as the hash function to perform the integrity measurement of the executable. Although the collision resistance property of SHA-1 has been compromised, we rely on the second-preimage collision resistance property for which SHA-1 is still considered secure. To achieve this property, we design the hash function so that it computes the hash of the executable as a function of a nonce that is sent by the dispatcher. As used herein, "nonce" means "random challenge", or a randomly generated number. Thus, the adversary cannot take advantage of the compromised collision resistance property of SHA-1 to create to two different copies of the executable both of which have the same hash value. After the measurement, the hash function invokes the executable.

Send Function.

The send function returns the checksum and integrity measurement to the dispatcher over the communication link.

Although FIG. 1 illustrates only one dispatcher 10, more than one dispatcher 10 may be used with the present invention. For example, two dispatchers 10 may be used, for example, and one dispatcher checks the validity of the checksum code and the other dispatcher 10 checks the computation time required by the untrusted computer 12 to produce the checksum result. Other variations are also possible, such as using a third dispatcher 10 to invoke the verification function. Other variations are also possible, and those variations are application to this embodiment as well as to the other embodiments described herein.

1.3.2 the Pioneer Protocol

The dispatcher 10 uses a challenge-response protocol to obtain the guarantee of verifiable code execution on the untrusted platform 12. The protocol has two steps. First, the dispatcher obtains an assurance that there is a dynamic root of trust on the untrusted platform. Second, the dispatcher uses the dynamic root of trust to obtain the guarantee of verifiable code execution.

We describe the challenge-response protocol in FIG. 2. The dispatcher first sends a challenge containing a random nonce to the untrusted platform, initiating the checksum computation of the verification function. The untrusted platform uses the checksum code that is part of the verification function to compute the checksum. The checksum code also sets up an execution environment to ensure that the send function, the hash function and the executable can execute untampered. After computing the checksum, the checksum code invokes the send function to return the checksum to the dispatcher. The dispatcher has a copy of the verification function and can independently verify the checksum. Also, since the dispatcher knows the exact hardware configuration of the untrusted platform, the dispatcher knows the expected time duration of the checksum computation. After the send function returns the checksum to the dispatcher, it invokes the hash function. The hash function measures the executable by computing a hash over it as a function of the dispatcher's nonce and returns the hash of the executable to the dispatcher using the send function. The dispatcher also has a copy of the executable and can independently verify the hash value. The hash function then invokes the executable, which optionally returns the execution result to the dispatcher.

1.4 Design of the Checksum Code

In this section, we discuss the design of the checksum code that is part of the verification function. The design is presented in a CPU-architecture-independent manner. First, we discuss the properties of the checksum code, and explain how we achieve these properties and what attacks these properties can prevent or help detect. Then, we explain how we set up an execution environment in which the hash function, the send function and the executable execute untampered. In Section 1.5, we shall describe how to implement the checksum code on an Intel Pentium IV Xeon processor.

1.4.1 Required Properties of the Checksum Code

The checksum code has to be constructed such that adversarial tampering results in either a wrong checksum or a noticeable time delay. We now describe the required properties of the checksum code and explain how these properties achieve the goals mentioned above.

Time-Optimal Implementation.

Our checksum code needs to be the checksum code sequence with the fastest running time; otherwise the adversary could use a faster implementation of the checksum code and use the time saved to forge the checksum. Unfortunately, it is an open problem to devise a proof of optimality for our checksum function. Promising research directions to achieve a proof of optimality are tools such as Denali [R. Joshi, G. Nelson, and K. Randall. Denali: a goal-directed superoptimizer. In *Proceedings of ACM Conference on Programming Language Design and Implementation (PLDI)*, pages 304-314, 2002] or superopt [Free Software Foundation. superopt—finds the shortest instruction sequence for a given function. http://www.gnu.org/directory/devel/compilers/superopt.html] that automatically generate the most optimal code sequence for basic code blocks in a program. However, Denali currently only optimizes simple code that can be represented by assignments, and superopt would not scale to the code size of our checksum function.

To achieve a time-optimal implementation, we use simple instructions such as add and xor that are challenging to implement faster or with fewer operations. Moreover, the checksum code is structured as code blocks such that operations in one code block are dependent on the result of operations in the previous code block. This prevents operation reordering optimizations across code blocks.

Instruction Sequencing to Eliminate Empty Issue Slots.

Most modern CPUs are superscalar, i.e., they issue multiple instructions in every clock cycle. If our checksum code does not have a sufficient number of issuable instructions every clock cycle, then one or more instruction issue slots will remain empty. An adversary could exploit an empty issue slot to execute additional instructions without overhead. To prevent such an attack, we need to arrange the instruction sequence of the checksum code so that the processor issue logic always has a sufficient number of issuable instructions for every clock cycle. Note that we cannot depend solely on the processor out-of-order issue logic for this since it is not guaranteed that the out-of-order issue logic will always be able to find a sufficient number of issuable instructions.

CPU State Inputs.

Figure 3:
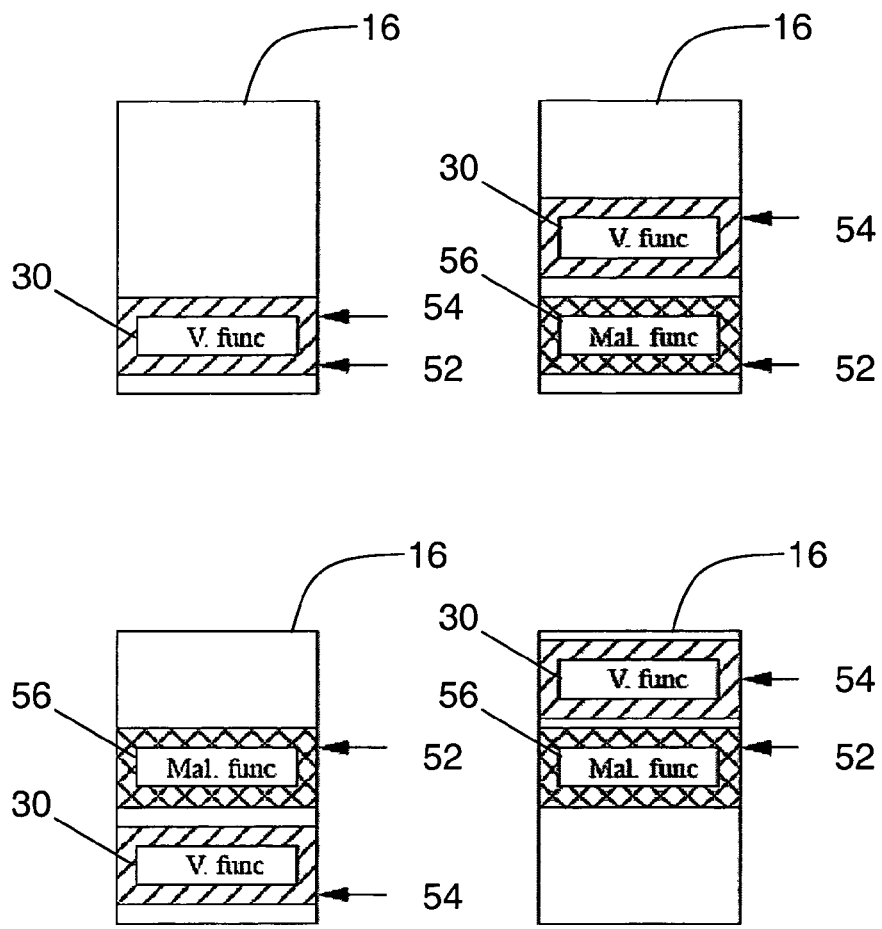
FIG. 3 illustrates one embodiment of memory copy attacks, in which PC refers to the program counter, DP refers to the data pointer, V.func refers to the verification function, and Mal. func refers to the malicious verification function.

The checksum code is self-checksumming, i.e., it computes a checksum over its own instruction sequence. The adversary can modify the checksum code so that instead of checksumming its own instructions, the adversary's checksum code computes a checksum over a correct copy of the instructions that is stored elsewhere in memory. We call this attack a memory copy attack. This attack is also mentioned by Wurster et al. in connection with their attack on software tamperproofing [G. Wurster, P. van Oorschot, and A. Somayaji. A generic attack on checksumming-based software tamper resistance. In *Proceedings of IEEE Symposium on Security and Privacy*, May 2005]. FIG. 3($a$) illustrates an example of memory in the untrusted computer when there has been no attack and the program counter ("PC") 52 and the data pointer ("DP") 54 are within the correct range. FIGS. 3($b$), 3($c$). and 3($d$) illustrate examples of memory in the untrusted computer 12 during various memory copy attacks on that computer 12. A malevolent function 56 is present in the memory 16. The adversary can perform the memory copy-attack in three different ways: 1) as shown in FIG. 3($b$), the adversary executes an altered checksum function from the correct location in memory, but computes the checksum over a correct copy of the checksum function elsewhere in memory; 2) as shown in FIG. 3($c$), the adversary does not move the correct checksum code, but executes its modified checksum code from other locations in memory; or 3) the adversary places both the correct checksum code and its modified checksum code in memory locations that are different from the memory locations where the correct checksum code originally resided, as shown in FIG. 3($d$).

It is obvious from the above description that when the adversary performs a memory copy attack, either the adversary's Program Counter (PC) value or the data pointer value or both will differ from the correct execution. We cause the adversary to suffer an execution time overhead for the memory copy attack by incorporating both the PC and the data pointer value into the checksum. In a memory copy attack, the adversary will be forced to forge one or both of these values in order to generate the correct checksum, leading to an increase in execution time.

Both the PC and the data pointer hold virtual addresses. The verification function is assumed to execute from a range of virtual addresses that is known to the dispatcher. As a result, the dispatcher knows the excepted value of the PC and the data pointer and can compute the checksum independently.

Iterative Checksum Code.

Figure 4:
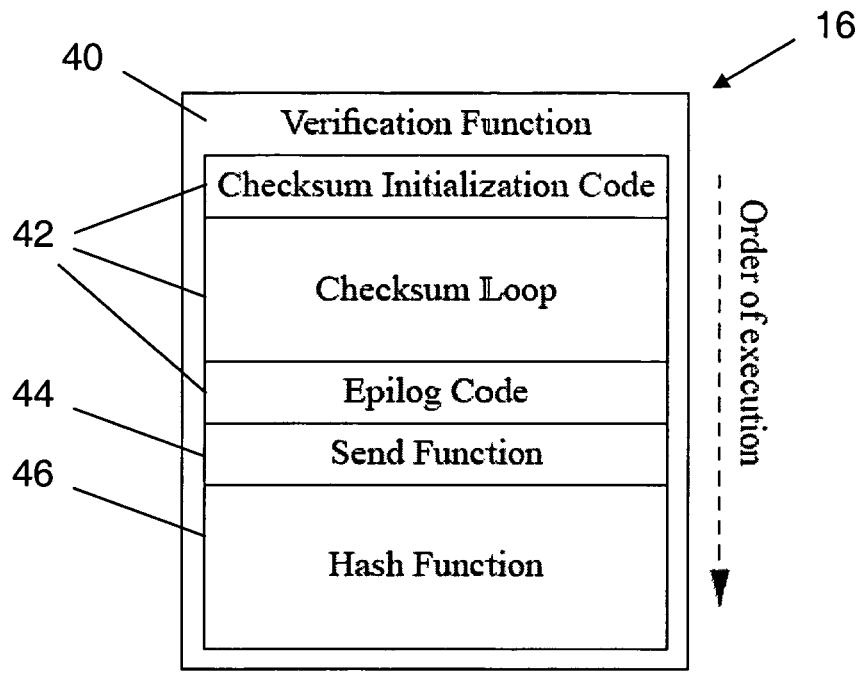
FIG. 4 illustrates one embodiment of functional structure of the verification function, in which the checksum code consists of an initialization code, the checksum loop which computes the checksum, and the epilog code that runs after the checksum loop but before the send function.

As FIG. 4 shows, the checksum code consists of three parts; the initialization code, the checksum loop and the epilog code. The most important part is the checksum loop. Each checksum loop reads one memory location of the verification function and updates the running value of the checksum with the memory value read, a pseudo-random value and some CPU state in formation. If the adversary alters the checksum function but wants to forge a correct checksum output, it has to manipulate the values of one or more of the inputs in every iteration of the checksum code, causing a constant time overhead per iteration.

Strongly-Ordered Checksum Function.

A strongly-ordered function is a function whose output differs with high probability if the operations are evaluated in a different order. A strongly-ordered function requires an adversary to perform the same operations on the same data in the same sequence as the original function to obtain the correct result. For example, if a1, a2, a3, a4, and a5 are random inputs, the function a1⊕a2+a3⊕a4+a5 is strongly-ordered. We use a strongly ordered function consisting of alternate add and xor operations for two reasons. First, this prevents parallelization, as at any step of the computation the current value is needed to compute the succeeding values. For example, the correct order of evaluating the function a1⊕a2+a3⊕a4 is (((a1⊕a2)+a3)⊕a4). If the adversary tries to parallelize the computation by computing the function in the order ((a1⊕a2)+(a3⊕a4)), the output will be different with high probability. Second, the adversary cannot change the order of operations in the checksum code to try to speed up the checksum computation. For example, if the adversary evaluates a1⊕a2+a3⊕a4 in the order (a1⊕(a2+(a3⊕a4))), the output will be different with high probability.

In addition to using a strongly ordered checksum function, we also rotate the checksum. Thus, the bits of the checksum change their positions from one iteration of the checksum loop to the next, which makes our checksum function immune to the attack against the Genuinity function that we point out in our earlier paper [A. Seshadri, A. Perrig, L. van Doorn, and P. Khosla. SWATT: Software-based attestation for embedded devices. In *Proceedings of IEEE Symposium on Security and Privacy*, May 2004].

Small Code Size.

The size of the checksum loop needs to be small for two main reasons. First, the code needs to fit into the processor cache to achieve a fast and deterministic execution time. Second, since the adversary usually has a constant overhead per iteration, the relative overhead increases with a smaller checksum loop.

Low Variance of Execution Time.

Code execution time on modern CPUs is non-deterministic for a number of reasons. We want a low variance for the execution time of the checksum code so that the dispatcher can easily find a threshold value for the correct execution time. We leverage three mechanisms to reduce the execution time variance of the checksum code. One, the checksum code executes at the highest privilege CPU privilege level with all maskable interrupts turned off, thus ensuring that no other code can run when the checksum code executes. Two, the checksum code is small enough to fit completely inside the CPU's L1 instruction cache. Also, the memory region containing the verification function is small enough to fit inside the CPU's L1 data cache. Thus, once the CPU caches are warmed up, no more cache misses occur. The time taken to warm up the CPU caches is a small fraction of the total execution time. As a result, the variance in execution time caused by cache misses during the cache warm-up period is small. Three, we sequence the instructions of the checksum code such that a sufficient number of issuable instructions are available at each clock cycle. This eliminates the non-determinism due to out-of-order execution. As we show in our results in Section 1.5.3, the combination of the above three factors leads to a checksum code with very low execution time variance.

Keyed-Checksum.

To prevent the adversary from pre-computing the checksum before making changes to the verification function, and to prevent the replaying of old checksum values, the checksum needs to depend on a unpredictable challenge sent by the dispatcher. We achieve this in two ways. First, the checksum code uses the challenge to seed a Pseudo-Random Number Generator (PRNG) that generates inputs for computing the checksum. Second, the challenge is also used to initialize the checksum variable to a deterministic yet unpredictable value.

We use a T-function as the PRNG [A. Klimov and A. Shamir. A new class of invertible mappings. In *CHES '02: Revised Papers from the 4th International Workshop on Cryptographic Hardware and Embedded Systems*, pages 470-483, 2003]. A T-function is a function from n-bit words to n-bit words that has a single cycle length of $2^n$. That is, starting from any n-bit value, the T-function is guaranteed to produce all the other $2^n-1$ n-bit values before starting to repeat the values. The T-function we use is $x \leftarrow x+(x^2 \vee 5) \mod 2^n$, where $\_$ is the bitwise-or operator. Since every iteration of the checksum code uses one random number to avoid repetition of values from the T-function, we have to ensure that the number of iterations of the checksum code is less than $2^n$ when we use an n-bit T-function. We use n=64 in our implementation to avoid repetition.

It would appear that we could use a Message Authentication Code (MAC) function instead of the simple checksum function we use. MAC functions derive their output as a function of their input and a secret key. We do not use a MAC function for two reasons. First, the code of current cryptographic MAC functions is typically large, which is against our goal of a small code size. Also, MAC functions have much stronger properties than what we require. MAC functions are constructed to be resilient to MAC forgery attacks. In a MAC-forgery attack, the adversary knows a finite number of (data, MAC(data)) tuples, where each MAC value is generated using the same secret key. The task of the adversary is to generate a MAC for a new data item that will be valid under the unknown key. It is clear that we do not require resilience to the MAC forgery attack, as the nonce sent by the Pioneer dispatcher is not a secret but is sent in the clear. We only require that the adversary be unable to pre-compute the checksum or replay old checksum values.

Pseudo-Random Memory Traversal.

The adversary can keep a correct copy of any memory locations in the verification function it modifies. Then, at the time the checksum code tries to read one of the modified memory locations, the adversary can redirect the read to the location where the adversary has stored the correct copy. Thus, the adversary's final checksum will be correct. We call this attack the data substitution attack. To maximize the adversary's time overhead for the data substitution attack, the checksum code reads the memory region containing the verification function in a pseudo-random pattern. A pseudo-random access pattern prevents the adversary from predicting which memory read(s) will read the modified memory location(s). Thus, the adversary is forced to monitor every memory read by the checksum code. This approach is similar to our earlier work in SWATT [A. Seshadri, A. Perrig, L. van Doorn, and P. Khosla. SWATT: Software-based attestation for embedded devices. In *Proceedings of IEEE Symposium on Security and Privacy*, May 2004].

We use the result of the Coupon Collector's Problem to guarantee that the checksum code will read every memory location of the verification function with high probability, despite the pseudo-random memory access pattern. If the size of the verification function is n words, the result of the Coupon Collector's Problem states: if X is the number of memory reads required to read each of the n words at least once, then $Pr[X>cn \ln n] \leq n^{-c+1}$. Thus, after $O(n \ln n)$ memory reads, each memory location is accessed at least once with high probability.

1.4.2 Execution Environment for Untampered Code Execution

We now explain how the checksum code sets up and verifies an untampered environment for the hash function, the send function, and the executable.

Externally verifiable code execution performs two high level tasks: verifying software integrity and establishing an untampered execution environment for the verification function and target executable. These two can be performed concurrently or separately. Since performing them separately is susceptible to TOCTTOU attacks (time-of-check-to-time-of-use), we describe a system that performs them concurrently.

Guaranteeing an untampered execution environment can be further divided into two parts: setting up such an environment, and verifying that the environment is correctly established. Verification of an untampered execution environment occurs during checksum computation. However, the set up of the execution environment can be performed in three time periods, either before, during, or after checksum computation (but before the checksum is returned). Furthermore, this process can be broken into multiple parts, each part occurring at one of the three possible periods. In our design, we verify a particular function during checksum computation, and this function in turns sets up the untampered execution environment after the checksum is computed. However, we would like to highlight the flexibility of the design space we present, which allows the designer to mix-and-match different time periods for performing the setup of the untampered execution environment and verifying a correct setup.

Execution at Highest Privilege Level with Maskable Interrupts Turned Off.

All CPUs have an instruction to disable maskable interrupts. Executing this instruction changes the state of the interrupt enable/disable bit in the CPU condition codes (flags) register. The disable-maskable-interrupt instruction can only be executed by code executing at the highest privilege level. The initialization code, which runs before the checksum loop (see FIG. 4), executes the disable-maskable-interrupt instruction. If the checksum code is executing at the highest privilege level, the instruction execution proceeds normally and the interrupt enable/disable flag in the flags register is set to the disable state. If the checksum code is executing at lower privilege levels one of two things can happen: 1) the disable-maskable-interrupts instruction fails and the status of the interrupt enable/disable flag is not set to disable, or 2) the disable-maskable-interrupt instruction traps into software that runs at the highest privilege level. Case 2 occurs when the checksum code is running inside a virtual machine (VM). Since we assume a legacy computer system where the CPU does not have support for virtualization, the VM must be created using a softwarebased virtual machine monitor (VMM) such as VMware [VMware. http://www.vmware.com/]. The VMMinternally maintains a copy of the flags register for each VM. When the VMMgains control as a result of the checksum code executing the di sable-maskable-interrupt instructions, the VMM changes the state of the interrupt enable/disable flag in the copy of the flags register it maintains for the VM and returns control to the VM. This way, the actual CPU flags register remains unmodified.

We incorporate the flags register into the checksum in each iteration of the checksum loop. Note that the adversary cannot replace the flags register with an immediate since the flags register contains status flags, such as the carry and zero flag, whose state changes as a result of arithmetic and logical operations. If the adversary directly tries to run the checksum code at privilege levels lower than the highest privilege level, the final checksum will be wrong since the interrupt enable/disable flag will not be set to the disable state. On the other hand, if the adversary tries to cheat by using a software VMM, then each read of the flags register will trap into the VMM or execute dynamically generated code, thereby increasing the adversary's checksum computation time. In this way, when the dispatcher receives the correct checksum within the expected time, it has the guarantee that the checksum code executed at the highest CPU privilege level with all maskable interrupts turned off. Since the checksum code transfers control to the hash function and the hash function in turn invokes the executable, the dispatcher also obtains the guarantee that both the hash function and executable will run at the highest CPU privilege level with all maskable interrupts turned off.

Replacing Exception Handlers and Non-Maskable Interrupt Handlers.

Unlike maskable interrupts, exceptions and non-maskable interrupts cannot be temporarily turned off. To ensure that the hash function and executable will run untampered, we have to guarantee that the exception handlers and the handlers for non-maskable interrupts are non-malicious. We achieve this guarantee by replacing the existing exception handlers and the handlers for non-maskable interrupts with our own handlers in the checksum code. Since both the hash function and the executable operate at the highest privilege level, they should not cause any exceptions. Also, non-askable interrupts normally indicate catastrophic conditions, such as hardware failures, which are low probability events. Hence, during normal execution of the hash function and the executable, neither non-maskable interrupts nor exceptions should occur. Therefore, we replace the existing exception handlers and handlers for nonmaskable interrupts with code that consists only of an interrupt return instruction (e.g., iret on x86). Thus, our handler immediately returns control to whatever code was running before the interrupt or exception occurred.

An intriguing problem concerns where in the checksum code we should replace the exception and non-maskable interrupt handlers. We cannot do this in the checksum loop since the instructions that replace the exception and non-maskable interrupt handlers do not affect the value of the checksum. Thus, the adversary can remove these instructions and still compute the correct checksum within the expected time. Also, we cannot place the instructions to replace the exception and non-maskable interrupt handlers in the initialization code, since the adversary can skip these instructions and jump directly into the checksum loop.

Figure 5:
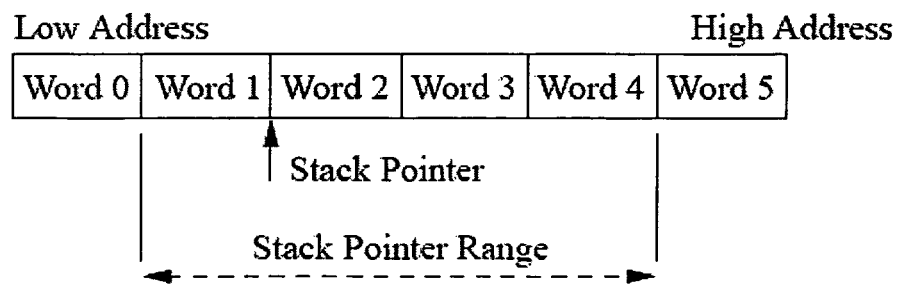
FIG. 5 illustrates one embodiment of a stack trick, in which a part of the checksum (6 words long in the figure) is on the stack, the stack pointer is randomly moved to one of the locations between the markers by each iteration of the checksum code, and the stack pointer never points to either end of the checksum.

We therefore place the instructions that replace the handlers for exceptions and non-maskable interrupts in the epilog code. The epilog code (see FIG. 4) is executed after the checksum loop is finished. If the checksum is correct and is computed within the expected time, the dispatcher is guaranteed that the epilog code is unmodified, since the checksum is computed over the entire verification function. The adversary can, however, generate a non-maskable interrupt or exception when the epilog code tries to run, thereby gaining control. For example, the adversary can set an execution break-point in the epilog code. The processor will then generate a debug exception when it tries to execute the epilog code. The existing debug exception handler could be controlled by the adversary. This attack can be prevented by making use of the stack to store a part of the checksum. The key insight here is that all CPUs automatically save some state on the stack when an interrupt or exception occurs. If the stack pointer is pointing to the checksum that is on the stack, any interrupt or exception will cause the processor to overwrite the checksum. FIG. 5 illustrates one embodiment of this aspect of the present invention. In particular, if one ensures that the stack pointer always points to the middle of the checksum on the stack, then part of the checksum will always be overwritten regardless of whether the stack grows up or down in memory.

Each iteration of the checksum loop randomly picks a word of the stack-based checksum for updating. It does this by moving the stack pointer to a random location within the checksum on the stack, taking care to ensure that the stack pointer is never at either end of the checksum (see FIG. 5). The new value of the stack pointer is generated using the current value of the checksum and the current value of the stack pointer, thereby preventing the adversary from predicting its value in advance.

The epilog code runs before the send function, which sends the checksum back to the dispatcher. Thereby, a valid piece of checksum is still on the stack when the epilog code executes. Thus, the adversary cannot use a non-maskable interrupt or exception to prevent the epilog code from running without destroying a part of the checksum. Once the epilog code finishes running, all the exception handlers and the handlers for non-maskable interrupts will have been replaced. In this manner, the dispatcher obtains the guarantee that any code that runs as a result of an exception or a non-maskable interrupt will be non-malicious.

1.5 Checksum Code Implementation on the Netburst Microarchitecture

In this section we describe our implementation of the checksum code on an Intel Pentium IV Xeon processor with EM64T extensions. First, we briefly describe the Netburst microarchitecture, which is implemented by all Intel Pentium IV processors, and the EM64T extensions. Next, we describe how we implement the checksum code on the Intel x86 architecture. Section 1.5.3 shows the results of our experiments measuring the time overhead of the different attacks. Finally, in Section 1.5.4 we discuss some points related to the practical deployment of Pioneer and extensions to the current implementation of Pioneer.

1.5.1 the Netburst Microarchitecture and EM64T Extensions

In this section, we present a simplified overview of the Intel Netburst microarchitecture that is implemented in the Pentium IV family of CPUs. We also describe the EM64T extensions that add support for 64-bit addresses and data to the 32-bit x86 architecture.

Figure 6:
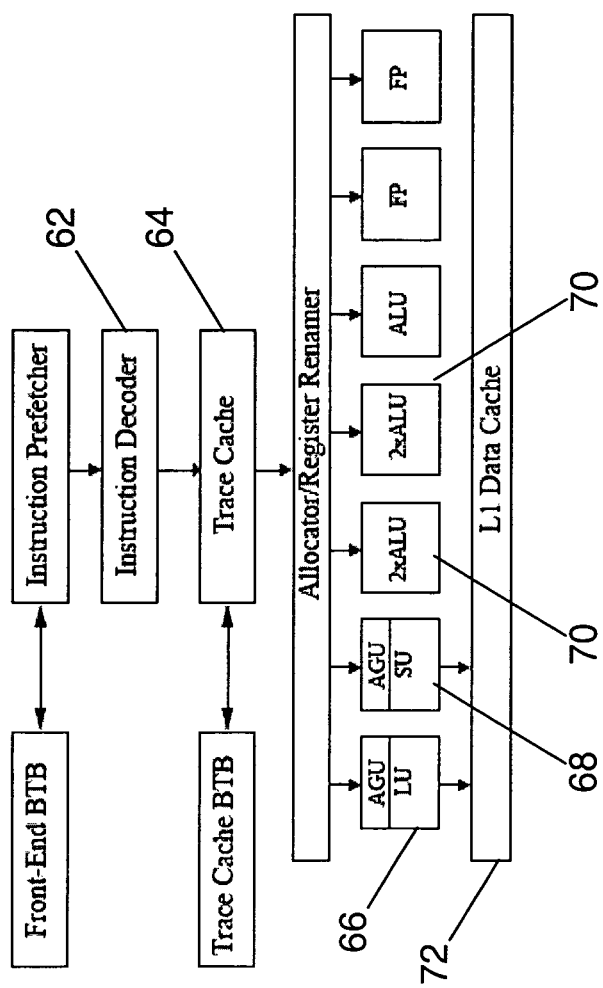
FIG. 6 illustrates the Intel Netburst Microarchitecture, in which the execution units are LU: Load Unit; SU: Store Unit; AGU: Address Generation Unit; 2×ALU: Double-speed Integer ALUs that execute two µops each per cycle; ALU: Complex Integer ALU; FP: Floating Point, MMX, and SSE unit.

FIG. 6 shows a simplified view of the front-end and execution units in the Netburst architecture. In that illustration, the execution units are LU: Load Unit; SU: Store Unit; AGU: Address Generation Unit; 2×ALU: Double-speed Integer ALUs that execute two μops each per cycle; ALU: Complex Integer ALU; FP: Floating Point, MMX, and SSE unit. The figure and our subsequent description are based on a description of the Netburst microarchitecture by Boggs et al. [D. Boggs, A. Baktha, J. Hawkins, D. Marr, J. Miller, P. Roussel, R. Singhal, B. Toll, and K. S. Venkatraman. The microarchitecture of the Intel Pentium 4 processor on 90 nm technology. *Intel Technology Journal*, 8(01), February 2004].

The instruction decoder 62 in Pentium IV CPUs can only decode one instruction every clock cycle. To prevent the instruction decoder from creating a performance bottleneck, the Netburst microarchitecture uses a trace cache 64 instead of a regular L1 instructions cache. The trace cache 64 holds decoded x86 instructions in the form of μops. μops are RISC-style instructions that are generated by the instruction decoder 62 when it decodes the x86 instructions. Every x86 instruction breaks down into one or more dependent μops. The trace cache 64 can hold up to 12000 μops and can issue up to three μops to the execution core per clock cycle. Thus, the Netburst microarchitecture is a 3-way issue superscalar microarchitecture.

The Netburst microarchitecture employs seven execution units. The load 66 and store 68 units have dedicated Arithmetic Logic Units (ALU) called Address Generation Units (AGU) to generate addresses for memory access. Two double-speed integer ALUs 70 execute two μops every clock cycle. The double speed ALUs handle simple arithmetic operations like add, subtract and logical operations.

The L1-data cache is 16 KB in size, 8-way set associative and has a 64 byte line size. The L2 cache is unified (holds both instructions and data). Its size varies depending on the processor family. The L2 cache is 8 way set associative and has a 64 byte line size.

The EM64T extensions add support for a 64-bit address space and 64-bit operands to the 32-bit x86 architecture. The general purpose registers are all extended to 64 bits and eight new general purpose registers are added by the EM64T extensions. In addition, a feature called segmentation (Unlike the IA32 architecture, the EM64T extensions do not use code or stack segments, so the cs and ss segment registers are ignored by the processor, and the ds and es segment registers are not used by the processor for accessing data segments.) allows a process to divide up its data segment into multiple logical address spaces called segments. Two special CPU registers (fs and gs) hold pointers to segment descriptors that provide the base address and the size of a segment as well as segment access rights. To refer to data in a particular segment, the process annotates the pointer to the data with the segment register that contains the pointer to the descriptor of the segment. The processor adds the base address of the segment to the pointer to generate the full address of the reference. Thus, fs:0000 would refer to the first byte of the segment whose descriptor is pointed to by fs.

1.5.2 Implementation of Pioneer on x86

We now discuss how we implement the checksum code so that it has all the properties we describe in Section 1.4.1. Then we describe how the checksum code sets up the execution environment described in Section 1.4.2 on the x86 architecture.

Every iteration of the checksum code performs these five actions: 1) deriving the next pseudo-random number from the T-function, 2) reading the memory word for checksum computation, 3) updating the checksum, 4) rotating the checksum using a rotate instruction, and 5) updating some program state such as the data pointer. Except for reading the CPU state and our defense against the memory copy attack, all properties are implemented on the x86 architecture exactly as we describe in Section 1.4.1. Below, we describe the techniques we employ to obtain the CPU state on the x86 architecture. We also describe how we design our defense against the memory copy attacks.

CPU State Inputs.

The CPU state inputs, namely the Program Counter (PC) and the data pointer, are included in the checksum to detect the three memory copy attacks. On the x86 architecture with EM64T extensions, the PC cannot be used as an operand for any instruction other than the lea instruction. So, if we want to include the value of the PC in the checksum, the fastest way to do it is to use the following two instructions: first, the lea instruction moves the current value of PC into a general purpose register, and next, we incorporate the value in the general purpose register into the checksum. Since the value of the PC is known in advance, the adversary can directly incorporate the corresponding value into the checksum as an immediate. Doing so makes the adversary's checksum computation faster since it does not need the lea instruction. Hence, on the x86 platform we cannot directly include the PC in the checksum. Instead of directly including the PC in the checksum, we construct the checksum code so that correctness of the checksum depends on executing a sequence of absolute jumps. By including the jump target of each jump into the checksum, we indirectly access the value of the PC.

Figure 7:
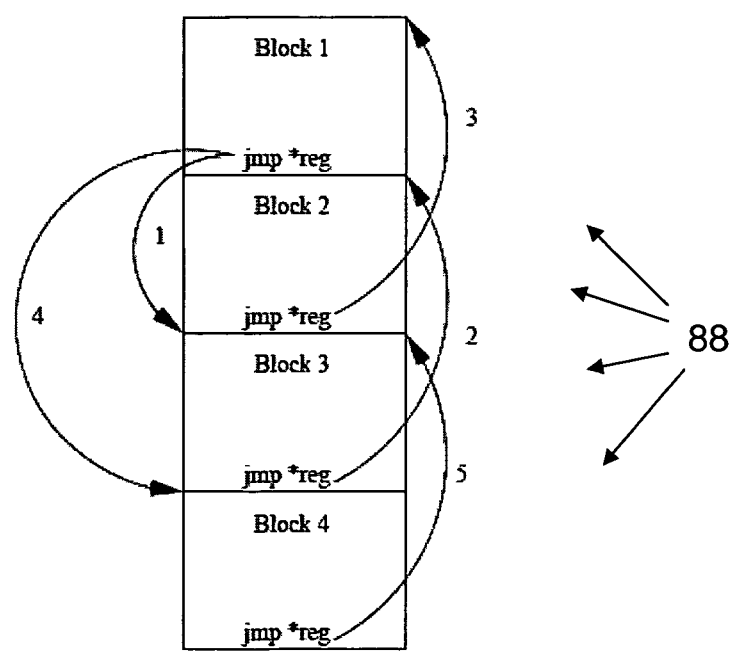
FIG. 7 illustrates one embodiment of the structure of the checksum code in which there are 4 code blocks, each block is 128 bytes in size, and the arrows show one possible sequence of control transfers between the blocks.

FIG. 7 illustrates one embodiment of the present invention in which the checksum code is constructed as a sequence of four code blocks 88. Each code block 88 generates the absolute address of the entry point of any of the four code blocks 88 using the current value of the checksum as a parameter. Both the code block 88 we are jumping from and the code block 88 we are jumping to incorporate the jump address in the checksum. The last instruction of code block 88 jumps to the absolute address that was generated earlier. All of the code blocks 88 execute the same set of instructions to update the checksum but have a different ordering of the instructions. Since the checksum function is strongly ordered, the final value of the checksum depends on executing the checksum code blocks 88 in the correct sequence, which is determined by the sequence of jumps between the blocks 88. The checksum code blocks 88 are contiguously placed in memory. Each block 88 is 128 bytes in size. The blocks are aligned in memory so that the first instruction of each block 88 is at an address that is a multiple of 128. This simplifies the jump target address generation since the jump targets can be generated by appropriately masking the current value of the checksum.

Memory Copy Attacks.

Memory copy attacks are the most difficult attacks to defend against on the x86 architecture, mainly for of three reasons: 1) the adversary can use segmentation to have the processor automatically add a displacement to the data pointer without incurring a time overhead; 2) the adversary can utilize memory addressing with an immediate or register displacement, without incurring a time overhead because of the presence of dedicated AGUs in the load and the store execution units; and 3) the PC cannot be used like a general purpose register in instructions, which limits our flexibility in designing defenses for the memory copy attacks.

We now describe how the adversary can implement the three memory copy attacks on the x86 architecture and how we construct the checksum code so that the memory copy attacks increase the adversary's checksum computation time.

In the first memory copy attack shown in FIG. 3(b), the adversary runs a modified checksum code from the correct memory location and computes the checksum over a copy of the unmodified verification function placed elsewhere in memory. This attack requires the adversary to add a constant displacement to the data pointer. There are two ways the adversary can do this efficiently: 1) it can annotate all instructions that use the data pointer with one of the segment registers, fs or gs, and the processor automatically adds the segment base address to the data pointer, or 2) the adversary can use an addressing mode that adds an immediate or a register value to the data pointer, and the AGU in the load execution unit will add the corresponding value to the data pointer. However, our checksum code uses all sixteen general purpose registers, so the adversary can only use an immediate to displace the data pointer.

Neither of these techniques adds any time overhead to the adversary's checksum computation. Also, both techniques retain the correct value of the data pointer. Thus, this memory copy attack cannot be detected by including the data pointer in the checksum. However, both these techniques increase the instruction length. We leverage this fact in designing our defense against this memory copy attack. The segment register annotation adds one byte to the length of any instruction that accesses memory, whereas addressing with immediate displacement increases the instruction length by the size of the immediate. Thus, in this memory copy attack, the adversary's memory reference instructions increase in length by a minimum of one byte. An instruction that reads memory without a segment register annotation or an immediate displacement is 3 bytes long on the x86 architecture with EM64T extensions. We place an instruction having a memory reference, such as add mem, reg, as the first instruction of each of the four checksum code blocks. In each checksum code block, we construct the jump target address so that, the jump lands with equal probability on either the first instruction of a checksum code block or at an offset of 3 bytes from the start of a code block. In an unmodified code block, the second instruction is at an offset of 3 bytes from the start of the block. When the adversary modifies the code blocks to do a memory copy attack, the second instruction of the block cannot begin before the 4th byte of the block. Thus, 50% of the jumps would land in the middle of the first instruction, causing the processor to generate an illegal opcode exception.

Figure 8:
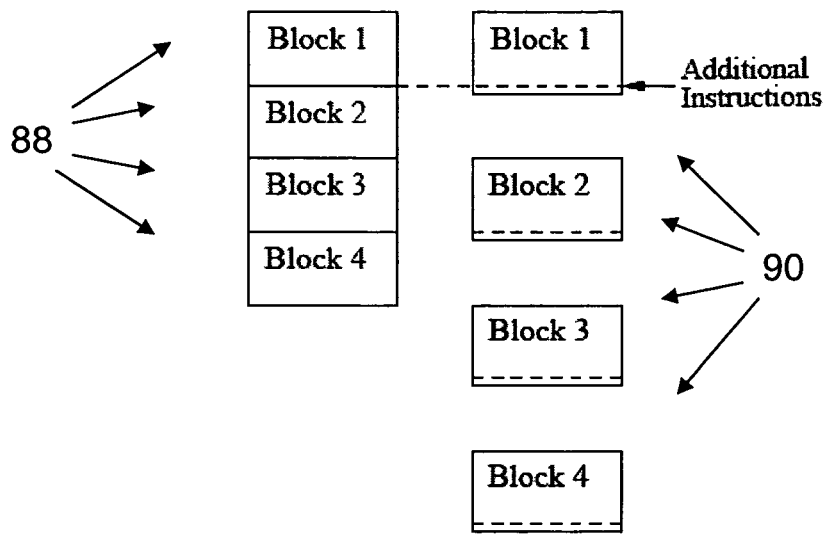
FIG. 8 illustrates one embodiment of a comparison of the code block lengths in the original verification function and an adversary-modified verification function, and in which the adversary moves its code blocks in memory so that the entry points of its code blocks are at addresses that are a power of two.

To accommodate the longer first instruction, the adversary would move its code blocks farther apart. FIG. 8 illustrates one embodiment of a comparison of the code block 88 lengths in the original verification function and an adversary-modified verification function, and in which the adversary moves its code blocks 90 in memory so that the entry points of its code blocks 90 are at addresses that are a power of two. The adversary can generate its jump target addresses efficiently by aligning its checksum code blocks in memory in the following way. The adversary places its code blocks on 256 byte boundaries and separates its first and second instruction by 8 bytes. Then, the adversary can generate its jump addresses by left-shifting the correct jump address by 1. We incorporate the jump address into the checksum both before and after the jump. So, the adversary has to left-shift the correct jump address by 1 before the jump instruction is executed and restore the correct jump address by right-shifting after the jump is complete. Thus, the adversary's overhead for the first memory copy attack is the execution latency of one left-shift instruction and one right-shift instruction.

In the second memory copy attack shown in FIG. 3(c), the adversary keeps the unmodified verification function at the correct memory location, but computes the checksum using a modified checksum code that runs at different memory locations. In this case, the entry points of the adversary's code blocks will be different, so the adversary would have to generate different jump addresses. Since we include the jump addresses in the checksum, the adversary would also have to generate the correct jump addresses. Hence, the adversary's checksum code blocks would be larger than 128 bytes. As before, to accommodate the larger blocks, the adversary would move its code blocks apart and align the entry points at 256 byte boundaries (FIG. 8). Then, the adversary can generate its jump address by left-shifting the correct jump address and by changing one or more bits in the resulting value using a logical operation. To restore the correct jump address, the adversary has to undo the changes either by loading an immediate value or by using a right-shift by 1 and a logical operation. In any case, the adversary's time overhead for this memory copy attack is greater than the time overhead for first memory copy attack.

In the third memory copy attack shown in FIG. 3(d), both the unmodified verification function and the adversary's checksum code are not present at the correct memory locations. Thus, this attack is a combination of the first and the second memory copy attacks. The adversary's time overhead for this memory copy attack is the same as the time overhead for the second memory copy attack.

Variable Instruction Length.

The x86 Instruction Set Architecture (ISA) supports variable length instructions. Hence, the adversary can reduce the size of the checksum code blocks by replacing one or more instructions with shorter variants that implement the same operation with the same or shorter latency. The adversary can use the space saved in this manner to implement the memory copy attacks without its code block size exceeding 128 bytes. To prevent this attack, we carefully select the instructions used in the checksum code blocks so that they are the smallest instructions able to perform a given operation with minimum latency.

Execution Environment for Untampered Code Execution.

In order to get the guarantee of execution at the highest privilege level with maskable interrupts turned off, the checksum code incorporates the CPU flags in the checksum. The flags register on the x86 architecture, rflags, can only be accessed if it is pushed onto the stack. Since we use to the stack to hold a part of the checksum, we need to ensure that pushing the rflags onto the stack does not overwrite the part of the checksum that is on the stack. Also, a processor with EM64T extensions always pushes the processor state starting at a 16-byte boundary on receiving interrupts or exceptions. Thus, we need to make sure that the checksum pieces on the stack are aligned on 16-byte boundaries so they will be overwritten when an interrupt or exception occurs.

Figure 9:
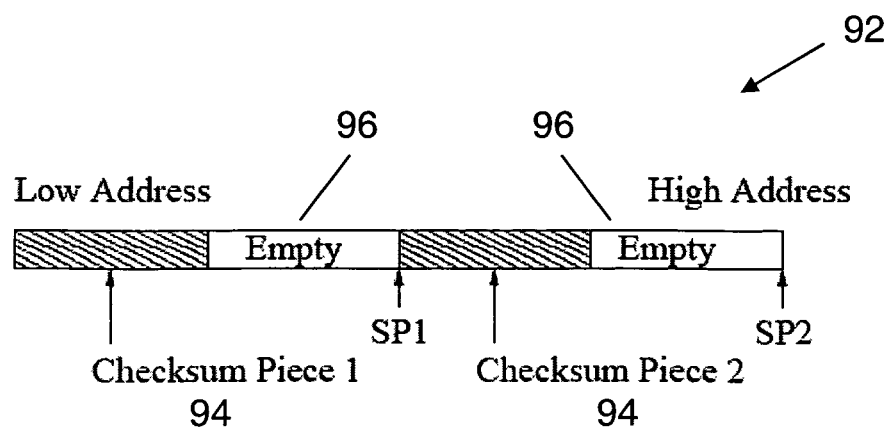
FIG. 9 illustrates the layout of the stack on an x86 processor with EM64T extensions, in which both checksum pieces are 8 bytes long and are aligned on 16-byte boundaries, and the empty regions are also 8 bytes long, and the stack pointer is assigned at random to one of the two locations SP1 or SP2.

FIG. 9 shows the stack layout we use for x86 processors with EM64T extensions. Our stack layout has checksum pieces alternating with empty slots. All four elements are eight bytes in size. The checksum code moves the stack pointer so that the stack pointer points either to location SP1 or to location SP2. On the x86 architecture, the stack grows downwards from high addresses to low addresses. To push an item onto the stack, the processor first decrements the stack pointer and then writes the item to the memory location pointed to by the stack pointer. With EM64T extensions, pushes and µops normally operate on 8-byte data. Since the stack pointer is always initialized to either SP1 or to SP2, a push of the rflags register will always write the flags to one of the empty 8-byte regions. If an interrupt or exception were to occur, the processor would push 40 bytes of data onto the stack, thereby overwriting either checksum piece 1 or both checksum pieces.

We keep checksum pieces on the stack to prevent the adversary from getting control through an exception or a non-maskable interrupt. However, the x86 architecture has a special non-maskable interrupt called System Management Interrupt (SMI), which switches the processor into the System Management Mode (SMM). The purpose of SMM is to fix chipset bugs and for hardware control.

The SMI does not save the processor state on the stack. So, it is not possible to prevent the SMI by keeping checksum pieces on the stack. Since the SMI is a special-purpose interrupt, we assume that it never occurs when the verification function runs. During our experiments, we found this assumption to be true all the time. In Section 1.5.4, we discuss how we can extend the current implementation of Pioneer to handle the SMI.

Description of Verification Function Code.

FIG. 10 shows the pseudocode of one code block of the verification function. The block performs six actions: 1) deriving the next pseudo-random value from the T-function; 2) generating the jump address, the stack pointer, and the data pointer using the current value of the checksum, 3) pushing rflags onto the stack, 4) reading a memory location containing the verification function, 5) updating the checksum using the memory read value, previous value of the checksum, the output of the T-function, the r f lags register, and the jump address, and 6) rotating the checksum using the rotate instruction.

The checksum is made up of twelve 64-bit pieces, ten in the registers and two on the stack. The checksum code uses all sixteen general purpose registers.

FIG. 11 shows the assembler code of one block of the verification function. The code shown is not the optimized version but a verbose version to aid readability.

1.5.3 Experiments and Results

Any attack that the adversary uses has to be combined with a memory copy attack because the adversary's checksum code will be different from the correct checksum code. Hence, the memory copy attack is the attack with the lowest overhead. Of the three memory copy attacks, the first has the lowest time overhead for the adversary. Hence, we implemented two versions of the checksum code using x86 assembly: a legitimate version and a malicious version that implements the first memory copy attack (the correct code plus two extra shift instructions).

Experimental Setup.

The dispatcher is a PC with a 2.2 GHz Intel Pentium IV processor and a 3Com 3c905C network card, running Linux kernel version 2.6.11-8. The untrusted platform is a PC with a 2.8 GHz Intel Pentium IV Xeon processor with EM64T extensions and an Intel 82545GM Gigabit Ethernet Controller, running Linux kernel version 2.6.7. The dispatcher code and the verification function are implemented inside the respective network card interrupt handlers. Implementing code inside the network card interrupt handler enables both the dispatcher and the untrusted platform to receive the Pioneer packets as early as possible. The dispatcher and the untrusted platform are on the same LAN segment.

Empty Instruction Issue Slots.

In Section 1.4.1, we mentioned that the checksum code instruction sequence has to be carefully arranged to eliminate empty instruction issue slots. The Netburst Microarchitecture issues µops, which are derived from decoding x86 instructions. Hence, to properly sequence the instructions, we need to know what µops are generated by the instructions we use in the checksum code. This information is not publically available. In the absence of this information, we try to sequence the instructions through trial-and-error. To detect the presence of empty instruction issue slots we place no-op instructions at different places in the code. If there are no empty instruction issue slots, placing noop instructions should always increase the execution time of the checksum code. We found this assertion to be only partially true in our experiments. There are places in our code where no-op instructions can be placed without increasing the execution time, indicating the presence of empty instruction issue slots.

Determining Number of Verification Function Iterations.

The adversary can try to minimize the Network Round-Trip Time (RTT) between the untrusted platform and dispatcher. Also, the adversary can pre-load its checksum code and the verification function into the CPU's L1 instruction and data caches respectively to ensure that it does not suffer any cache misses during execution. We prevent the adversary from using the time gained by these two methods to forge the checksum.

The theoretically best adversary has zero RTT and no cache misses, which is a constant gain over the execution time of the correct checksum code. We call this constant time gain as the adversary time advantage. However, the time overhead of the adversary's checksum code increases linearly with the number of iterations of the checksum loop. Thus, the dispatcher can ask the untrusted platform to perform a sufficient number of iterations so that the adversary's time overhead is at least greater than the adversary time advantage.

The expression for the number of iterations of the checksum loop to be performed by the untrusted platform can be derived as follows. Let c be the clock speed of the CPU, a be the time advantage of the theoretically best adversary, o be the adversary's overhead per iteration of the checksum loop represented in CPU cycles, and n is the number of iterations. Then $n > c\_a\ o$ to prevent false negatives3 in the case of the theoretically best adversary.

Experimental Results.

To calculate the time advantage of the theoretically best adversary, we need to know the upper bound on the RTT and the time saved by pre-warming the caches. We determine the RTT upper bound by observing the ping latency for different hosts on our LAN segment. This gives us an RTT upper bound of 0.25 ms since all ping latencies are smaller than this value. Also, we calculate the amount of time that cache prewarming saves the adversary by running the checksum code with and without pre-warming the caches and observing the running times using the CPU's rdtsc instruction. The upper bound on the cache pre-warming time is 0.0016 ms. Therefore, for our experiments we fix the theoretically best adversary's time advantage to be 0.2516 ms. The attack that has the least time overhead is the first memory copy attack, which has an overhead of 0.6 CPU cycles per iteration of the checksum loop. The untrusted platform has a 2.8 GHz CPU. Using these values, we determine the required number of checksum loop iterations to be 1,250,000. To prevent false positives due to RTT variations, we double the number of iterations to 2,500,000.

The dispatcher knows, r, the time taken by the correct checksum code to carry out 2,500,000 iterations. It also knows that the upper bound on the RTT, rtt. Therefore, the dispatcher considers any checksum result that is received after time r+rtt to be late. This threshold is the adversary detection threshold.

We place the dispatcher at two different physical locations on our LAN segment. We run our experiments for 2 hours at each location. Every 2 minutes, the dispatcher sends a challenge to the untrusted platform. The untrusted platform returns a checksum computed using the correct checksum code. On receiving the response, the dispatcher sends another challenge. The untrusted platform returns a checksum computed using the adversary's checksum code, in response to this challenge. Both the dispatcher and the untrusted platform measure the time taken to compute the two checksums using the CPU's rdtsc instruction. The time measured on the untrusted platform for the adversary's checksum computation is the checksum computation time of the theoretically best adversary.

Figure 12:
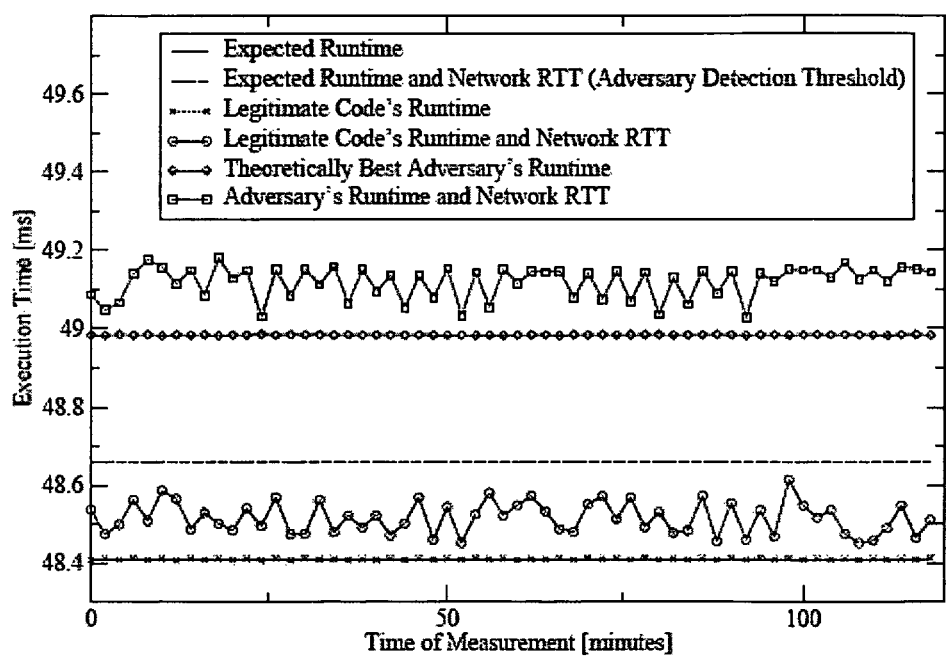
FIG. 12 illustrates one embodiment of results from Location 1.
Figure 13:
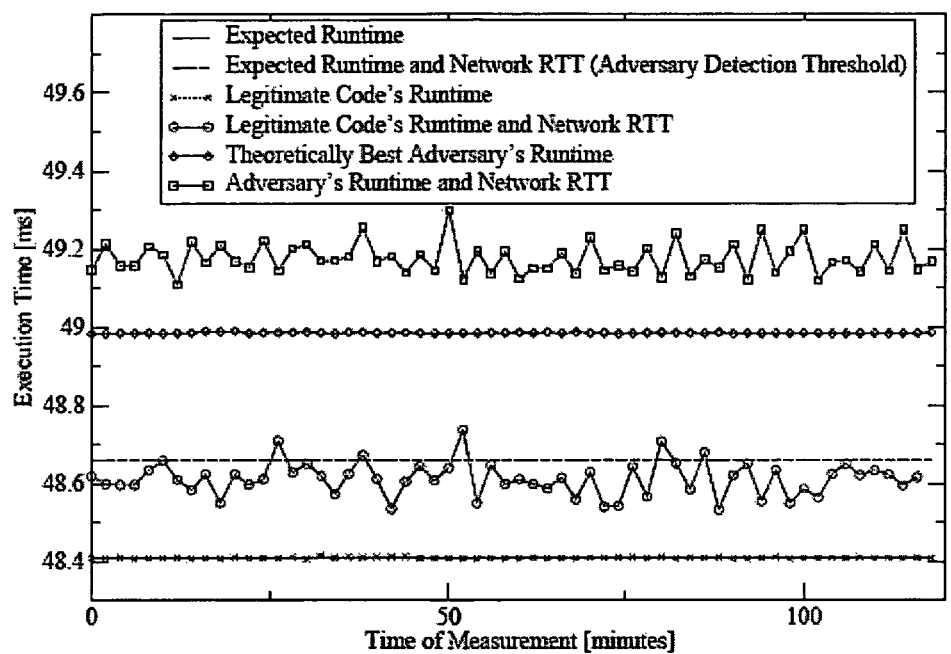
FIG. 13 illustrates one embodiment of result from Location 2.

FIGS. 12 and 13 show the results of our experiments at the two physical locations on the LAN segment. Based on the results, we observe the following points: 1) even the running time of the theoretically best adversary is greater than the Adversary Detection Threshold, yielding a false negative rate of 0%; 2) the checksum computation time shows a very low variance, that we have a fairly deterministic runtime; 3) we observe some false positives (5 out of 60) at location 2, which we can avoid by better estimating the RTT.

We suggest two methods for RTT estimation. First, the dispatcher measures the RTT to the untrusted platform just before it sends the challenge and assumes that the RTT will not significantly increase in the few tens of milliseconds between the time it measures the RTT and the time it receives the checksum packet from the untrusted platform. Second, the dispatcher can take RTT measurements at coarser time granularity, say every few seconds, and use these measurements to update its current value of the RTT.

1.5.4 Discussion

We now discuss virtual-memory-based attacks, issues concerning the practical deployment of Pioneer, and potential extensions to the current implementation of Pioneer to achieve better properties.

Implementing the Verification Function as SMM Module.

The System Management Mode (SMM) is a special operating mode present on all x86 CPUs. Code running in the SMM mode runs at the highest CPU privilege level. The execution environment provided by SMM has the following properties that are useful for implementing Pioneer: 1) all interrupts, including the Non-Maskable Interrupt (NMI) and the System Management Interrupt (SMI), and all exceptions are disabled by the processor, 2) paging and virtual memory are disabled in SMM, which precludes virtual-memory-based attacks, and 3) real-mode style segmentation is used, making it easier to defend against the segmentation-based memory copy attack.

Virtual-Memory-Based Attacks.

There are two ways in which the adversary might use virtual memory to attack the verification function: 1) the adversary could create memory protection exceptions by manipulating the page table entries and obtain control through the exception handler, or 2) the adversary could perform a memory copy attack by loading the instruction and data Translation Lookaside Buffer (TLB) entries that correspond to the same virtual address with different physical addresses. Since we use the stack to hold checksum pieces during checksum computation and later replace the exception handlers, the adversary cannot use memory protection exceptions to gain control.

The adversary can, however, use the CPU TLBs to perform a memory copy attack.

Wurster et al. discuss how the second attack can be implemented on the UltraSparc processor [G. Wurster, P. van Oorschot, and A. Somayaji. A generic attack on checksumming-based software tamper resistance. In *Proceedings of IEEE Symposium on Security and Privacy*, May 2005]. Their attack can be adapted to the Intel x86 architecture in the context of Pioneer as follows: 1) the adversary loads the page table entry corresponding to the virtual address of the verification function with the address of the physical page where the adversary keeps an unmodified copy of the verification function, 2) the adversary does data accesses to virtual addresses of the verification function, thereby loading the its mapping into the CPU's D-TLB, and 3) the adversary replaces the page table entry corresponding to the virtual address of the verification function with the address of the physical page where the adversary keeps the modified checksum code is kept. When the CPU starts to execute the adversary's checksum code, it will load its I-TLB entry with the mapping the adversary set up in step 3. Thus, the CPU's I-TLB and D-TLB will have different physical addresses corresponding to the same virtual address and the adversary will be able to perform the memory copy attack.

The current implementation of Pioneer does not defend against this memory copy attack. However, a promising idea to defend against the attack is as follows. We create virtual address aliases to the physical pages containing the verification function so that the number of aliases is greater than the number of entries in the CPU's TLB. Each iteration of the checksum code loads the PC and the data pointer with two of the virtual address aliases, selected in a pseudorandom manner. If the checksum loop performs a sufficient number of iterations so that with high probability all virtual address aliases are guaranteed to be used then the CPU will eventually evict the adversary's entry from the TLB.

The adversary can prevent its entry from being evicted from the TLB by not using all the virtual address aliases. However, in this case, the adversary will have to fake the value of the PC and the data pointer for the unused virtual address aliases. Since each iteration of the checksum code selects the virtual address aliases with which to load the PC and the data pointer in a pseudo-random manner, the adversary will have to check which aliases are used to load the PC and the data pointer in each iteration of the checksum code. This will increase the adversary's checksum computation time.

The TLB-based memory copy attack can also be prevented by implementing the verification function as an SMM module. Since the CPU uses physical addresses in SMM and all virtual memory support is disabled, the memory copy attack that uses the TLBs is not possible anymore.

Why Use Pioneer Instead of Trusted Network Boot?

In trusted network boot, the BIOS on a host fetches the boot image from a trusted server and executes the boot image. In order to provide the guarantee of verifiable code execution, trusted network boot has to assume that: 1) the host has indeed rebooted; 2) the correct boot image has indeed reached the host; and 3) the BIOS will correctly load and transfer control to the boot image. To guarantee that the BIOS cannot be modified by the adversary, the BIOS will have to stored on an immutable storage medium like Read-Only Memory (ROM). This makes it impossible to update the BIOS without physically replacing the ROM, should any vulnerability be discovered in the BIOS code.

Pioneer does not require any code to reside in immutable storage media, thereby making it easy to update. Also, Pioneer provides the property of verifiable code execution without having to reboot the untrusted platform, without having to transfer code over the network and without relying on any unverified software on the untrusted platform to transfer control to the executable.

MMX and SSE Instructions.

x86 processors provide support for Single Instruction Multiple Data (STMD) instructions in the form of MMX and SSE technologies [Intel Corporation. *IA32 Intel Architecture Software Developer's Manual* Vol. 1]. These instructions can simultaneously perform the same operation on multiple data items. This is faster than operating on the data items one at a time. However, the adversary cannot use the MMX or SSE instructions to speed up its checksum code, since we design the checksum code to be non-parallelizable.

Pioneer and TCG.

A promising approach for reducing exposure to network RTT and for achieving a trusted channel to the untrusted platform is to leverage a Trusted Platform Module (TPM). The TPM could issue the challenge and time the execution of the checksum code and return the signed result and computation time to the dispatcher. However, this would require that the TPM be an active device, whereas the current generation of TPMs are passive.

Directly Computing Checksum Over the Executable.

Why do we need a hash function? Why can the checksum code not simply compute the checksum over the executable? While this simpler approach may work in most cases, an adversary could exploit redundancy in the memory image of the executable to perform datadependent optimizations. A simple example is a executable image that contains a large area initialized to zeros, which allows the adversary to suppress memory reads to that region and also to suppress updating the checksum with the memory value read (in case of add or xor operations).

Skinit and Senter.

AMD's Pacifica technology has an instruction called skinit, which can verifiably transfer control to an executable after measuring it [Secure virtual machine architecture reference manual. AMD Corp., May 2005]. Intel's LaGrande Technology (LT) has a similar instruction, senter [Intel Corp. *LaGrande Technology Architectural Overview*, September 2003]. Both senter and skinit also set up an execution environment in which the executable that is invoked is guaranteed to execute untampered. These instructions are used to start-up a Virtual Machine Monitor (VMM) or a Secure Kernel (SK). Both instructions rely on the TCG loadtime attestation property to guarantee that the SK or the VMM is uncompromised at start-up. However, due to the vulnerability of the SHA-1 hash function, the TCG load-time attestation property is compromised as we describe in Section 1.1. Hence, there is no guarantee that the SK or the VMM that is started is not malicious.

Implementing Pioneer on Other Architectures.

We use the x86 architecture as our implementation platform example for the following reasons: 1) since x86 is the most widely deployed architecture today, our implementation of Pioneer on x86 can immediately be used on many legacy systems; and 2) due to requirements of backward compatibility, the x86 is a complex architecture, with a non-orthogonal ISA. Therefore, implementing Pioneer on the x86 architecture is more challenging than implementing it on RISC architectures with more orthogonal instruction sets, such as the MIPS, and the Alpha.

Verifying the Timing Overhead.

Pioneer relies on the execution time of the checksum code. Therefore, the dispatcher has to know ahead of time what the correct checksum computation time should be for the untrusted platform. The checksum computation time depends on the CPU of the untrusted platform. There are two ways by which the dispatcher can find out the correct checksum computation time: 1) if the dispatcher has access to a trusted platform having the same CPU as the untrusted platform, or a CPU simulator for the untrusted platform, it can run experiments to get the correct execution time; or 2) we can publish the correct execution time for different CPUs on a trusted web-site.

1.6 Applications

In this section, we first discuss the types of applications that can leverage Pioneer to achieve security, given the assumptions we make. Then, we describe the kernel rootkit detector, the sample application we have built using Pioneer.

1.6.1 Potential Security Applications

Pioneer can be applied to build security applications that run over networks controlled by a single administrative entity. On such networks, the network administrator could configure the network switches so that an untrusted host can only communicate with the dispatcher during the execution of Pioneer. This provides the property of message-origin-authentication while eliminating proxy attacks. Examples of networks that can be configured in this manner are corporate networks and cluster computing environments. On these networks the network administrator often needs to perform security-critical administrative tasks on untrusted hosts, such as installing security patches or detecting malware like viruses and rootkits. For such applications, the administrator has to obtain the guarantee that the tasks are executed correctly, even in the presence of malicious code on the untrusted host. This guarantee can be obtained through Pioneer.

As an example of how Pioneer could be used, we briefly discuss secure code updates. To verifiably install a code update, we can invoke the program that installs the code update using Pioneer. Pioneer can also be used to measure software on an untrusted host after a update to check if the code update has been successfully installed.

1.6.2 Kernel Rootkit Detection

In this section, we describe how we build a kernel rootkit detector using Pioneer. Our kernel rootkit detector allows a trusted verifier to detect kernel rootkits that may be installed on an external untrusted host without relying on signatures of specific rootkits or on low-level file system scans. Sailer et al. propose to use the loadtime attestation guarantees provided by a TPM to detect rootkits when the kernel boots [R. Sailer, X. Zhang, T. Jaeger, and L. van Doorn. Design and implementation of a TCG-based integrity measurement architecture. In *Proceedings of USENIX Security Symposium*, pages 223-238, 2004]. However, their technique cannot detect rootkits that do not make changes to the disk image of the kernel but only infect the in-memory image. Such rootkits do not survive reboots. Our rootkit detector is capable of detecting both kinds of rootkits. The only rootkit detection technique we are aware of that achieves similar properties to ours is Copilot [N. Petroni, T. Fraser, J. Molina, and W. Arbaugh. Copilot—a coprocessor-based kernel runtime integrity monitor. In *Proceedings of USENIX Security Symposium*, pages 179-194, 2004]. However, unlike our rootkit detector, Copilot requires additional hardware in the form of an add-in PCI card to achieve its guarantees. Hence, it cannot be used on systems that do not have this PCI card installed. Also, our rootkit detector runs on the CPU of the untrusted host, making it immune to the dummy kernel attack that we describe in the Background of the Invention in the context of Copilot.

Rootkits Primer.

Rootkits are software installed by an intruder on a host that allow the intruder to gain privileged access to that host, while remaining undetected [N. Petroni, T. Fraser, J. Molina, and W. Arbaugh. Copilot—a coprocessor-based kernel runtime integrity monitor. In *Proceedings of USENIX Security Symposium*, pages 179-194, 2004; D. Zovi. Kernel rootkits. http://www.cs.unm.edu/ghandi/lkr.pdf]. Rootkits can be classified into two categories: those that modify the OS kernel, and those that do not. Of the two, the second category of rootkits can be easily detected. These rootkits typically modify system binaries (e.g., ls, ps, and netstat) to hide the intruder's files, processes, network connections, etc. These rootkits can be detected by a kernel that checks the integrity of the system binaries against known good copies, e.g., by computing checksums. There are also tools like Tripwire that can be used to check the integrity of binaries [Tripwire. http://sourceforge.net/projects/tripwire/]. These tools are invoked from read-only or write-protected media so that the tools do not get compromised.

As kernel rootkits subvert the kernel, we can no longer trust the kernel to detect such rootkits. Therefore, Copilot uses special trusted hardware (a PCI add-on card) to detect kernel rootkits. All rootkit detectors other than Copilot, including AskStrider [Y. Wang, R. Roussev, C. Verbowski, A. Johnson, and D. Ladd. AskStrider: What has changed on my machine lately? Technical Report MSR-TR-2004-03, Microsoft Research, 2004], Carbonite [K. J. Jones. Loadable Kernel Modules. ;login: *The Magazine of USENIX and SAGE*, 26(7), November 2001] and St. Michael [A. Chuvakin. Ups and downs of unix/linux host-based security solutions. ;login: *The Magazine of USENIX and SAGE*, 28(2), April 2003], rely on the integrity of one or more parts of the kernel. A sophisticated attacker can circumvent detection by compromising the integrity of the rootkit detector. Recently Wang et al. proposed a method to detect stealth software that try to hide files [Y. Wang, B. Vo, R. Roussev, C. Verbowski, and A. Johnson. Strider GhostBuster: Why it's a bad idea for stealth software to hide files. Technical Report MSR-TR-2004-71, Microsoft Research, 2004]. Their approach does not rely on the integrity of the kernel; however, it only applies when the stealth software makes modifications to the file system.

Implementation.

We implement our rootkit detector on the x86 64 version of the Linux kernel that is part of the Fedora Core 3 Linux distribution. The x86 64 version of the Linux kernel reserves the range of virtual address space above 0xffff800000000000. The kernel text segment starts at address 0xffffffff80100000. The kernel text segment contains immutable binary code which remains static throughout its lifetime. Loadable Kernel Modules (LKM) occupy virtual addresses from 0xffffffff88000000 to 0xffffffffff00000.

We build our kernel rootkit detector using a Kernel Measurement Agent (KMA). The KMA hashes the kernel image and sends the hash values to the verifier. The verifier uses Pioneer to obtain the guarantee of verifiable code execution of the KMA. Hence, the verifier knows that the hash values it receives from the untrusted host were computed correctly.

The KMA runs on the CPU at the kernel privilege level, i.e., CPL0; hence, it has access to all the kernel resources (e.g., page tables, interrupt descriptor tables, jump tables, etc.), and the processor state, and can execute privileged instructions. The KMA obtains the virtual address ranges of the kernel over which to compute the hashes by reading the System.map file. The following symbols are of interest to the KMA: 1) text and etext, which indicate the start and the end of the kernel code segment; 2) sys call table which is the kernel system call table; and 3) module list which is a pointer to the linked list of all loadable kernel modules (LKM) currently linked into the kernel. When the Kernel Measurement Agent (KMA) is invoked, it performs the following steps:

1. The KMA hashes the kernel code segment between text and etext.
2. The KMA reads kernel version information to check which LKMs have been loaded and hashes all the LKM code.
3. The KMA checks that the function pointers in the system call table only refer to the kernel code segment or to the LKM code. The KMA also verifies that the return address on the stack points back to the kernel/LKM code segment. The return address is the point in the kernel to which control returns after the KMA exits.

4. The KMA returns the following to the verifier: 1) the hash of the kernel code segment; 2) the kernel version information and a list indicating which kernel modules have been loaded; 3) the hash of all the LKM code; 4) a success/failure indicator stating whether the function pointer check has succeeded. In other embodiments the KMA may return more or less information. For example, the KMA may return information related to all of the previous steps, or it may return less information, or it may return additional information.

5. The KMA flushes or clears the processor caches, restores the register values, and finally returns to the kernel. The register values and the return address were saved on the stack when the kernel called invoked the Pioneer verification function.

We now explain how the verifier verifies the hash values returned by the untrusted platform. First, because the kernel text is immutable, it suffices for the verifier to compare the hash value of the kernel code segment to the known good hash value for the corresponding kernel version. However, the different hosts may have different LKMs installed, and so the hash value of the LKM code can vary. Therefore, the verifier needs to recompute the hash of the LKM text on the fly according to the list of installed modules reported by the KMA. The hash value reported by the KMA is then compared with the one computed by the verifier.

Experimental Results.

We implemented our rootkit detector on the Fedora Core 2 Linux distribution, using SHA-1 as the hash function. The rootkit detector ran every 5 seconds and successfully detected adore-ng-0.53, the only publically-known rootkit for the 2.6 version of the Linux kernel.

TABLE 1 illustrates an embodiment of Overhead of the Pioneer-based rootkit detector:

|  | Standalone (s) | Rootkit Detect. (s) | % Overhead |
|---|---|---|---|
| PostMark | 52 | 52.99 | 1.9 |
| Bunzip2 | 21.396 | 21.713 | 1.5 |
| copy large file | 373 | 385 | 3.2 |

We monitor the performance overhead of running our rootkit detector in the background. We use three representative tasks for measurements: PostMark, bunzip2, and copying a large file. The first task, PostMark [Network Appliance. Postmark: A new file system benchmark. Available at http://www.netapp.com/techlibrary/3022.html, 2004], is a file system benchmark that carries out transactions on small files. As a result, PostMark is a combination of I/O intensive and computationally intensive tasks. We used bunzip2 to uncompress the Firefox source code, which is a computationally intensive task. Finally, we modeled an I/O intensive task by copying the entire /usr/src/linux directory, which totaled to 1.33 GB, from one harddrive to another. As the table above shows, all three tasks perform reasonably well in the presence of our rootkit detector.

Discussion.

As with Copilot, one limitation of our approach is that we do not verify the integrity of data segments or CPU register values. Therefore, the following types of attacks are still possible: 1) attacks that do not modify code segments but rely merely on the injection of malicious data; 2) if the kernel code contains jump/branch instructions whose target address is not read in from the verified jump tables, the jump/branch instructions may jump to some unverified address that contains malicious code. For instance, if the jump address is read from an unverified data segment, we cannot guarantee that the jump will only reach addresses that have been verified. Also, if jump/branch target addresses are stored temporarily in the general purpose registers, it is possible to jump to an unverified code segment, after the KMA returns to the kernel since the KMA restores the CPU register values. In conclusion, Pioneer limits a kernel rootkit to be placed solely in mutable data segments; it requires any pointer to the rootkit to reside in a mutable data segment as well. These properties are similar to what Copilot achieves.

Our rootkit detection scheme does not provide backward security. A malicious kernel can uninstall itself when it receives a Pioneer challenge, and our Pioneer-based rootkit detector cannot detect bad past events. Backward security can be achieved if we combine our approach with schemes that backtrack intrusions through analyzing system event logs [S. King and P. Chen. Backtracking intrusions. In *Proceedings of the ACM Symposium on Operating Systems Principles* (*SOSP*), pages 223-236, 2003].

Although the present invention has generally been described in terms of implementation on an Intel Pentium IV Xenon processor based on the Netburst Microarchitecture, the present invention is applicable to other applications.

2.1 Second Embodiment

Another embodiment of the present invention will be described in the context of sensor networks, although it is also applicable to computer networks and other types of networks, and not limited to "sensor networks". This embodiment will be described in terms of "base station" and "sensor node", or in terms of "verifier" and "device", although those terms are analogous to, and may be replaced with, terms such as "trusted computer" and "untrusted computer", as described hereinabove. Sensor networks are expected to be deployed in the near future in a variety of safety-critical applications such as critical infrastructure protection and surveillance, military applications, fire and burglar alarm systems, home and office automation, inventory control systems, and many medical applications such as patient monitoring. Sensor nodes in a sensor network typically run identical software. Vulnerabilities in the sensor node 104 software, like buffer overflows, leave all sensor nodes vulnerable to remote exploit. An attacker can exploit a vulnerability to inject and execute arbitrary code on the sensor nodes, steal their cryptographic keys, and possibly also compromise the privacy and safety of people. Security is especially challenging to achieve in this setting, due to the severe resource constraints of limited memory, computation, battery energy, and wireless communication bandwidth in current sensor network technology.

Figure 14:
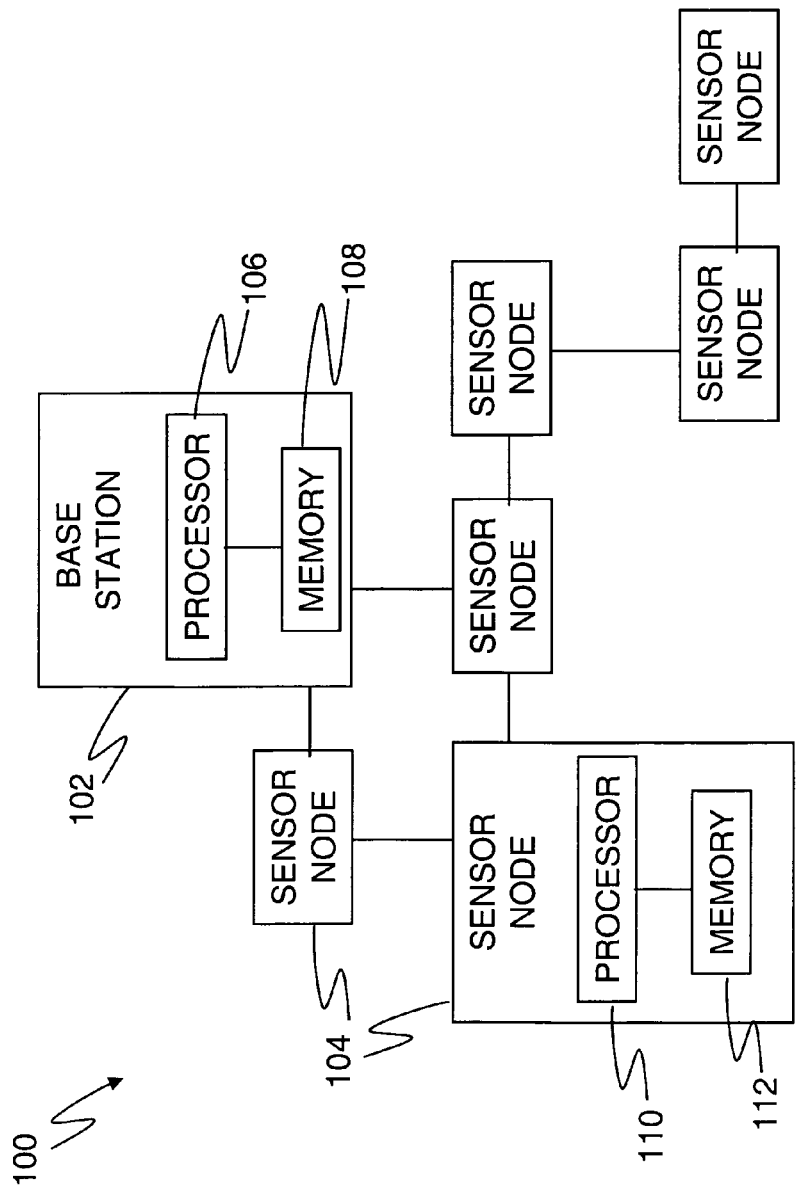
FIG. 14 illustrates a sensor network according to one embodiment of the present invention.

FIG. 14 illustrates one embodiment of a sensor network 100 according to the present invention. The sensor network 100 includes one or more base stations 102 and one or more sensor nodes 104. The base stations 102 typically include a processor 106 and memory 108. Similarly, each of the sensor nodes 104 typically include a processor 110 and memory 112. Only one sensor node 104 is shown in detail with a processor 110 and memory 112, although other sensor nodes 104 may also includes processors 110 and memory 112. Both the base stations 102 and the sensor nodes 104 may also include additional components. Other variations of the sensor network are also possible such as, for example, sensor networks containing sensor nodes 104 and without base stations 102.

This embodiment presents a suite of protocols, called FIRE (Forgery-resilient Intrusion detection, Recovery, and Establishments of keys), for detecting and recovering from intrusion in sensor networks 100. An intrusion is defined as the process of a remote attacker compromising a sensor node 104 using software vulnerabilities such as a buffer overflow. We design a novel approach for intrusion detection in sensor networks 100 that does not make any false negative claims. We define a positive as a sensor node 104 that is compromised, and a negative as a node 104 that is uncompromised. For example, when our technique claims that a node 104 is uncompromised, the node 104 is indeed uncompromised. Conversely, if a node 104 is found compromised, it is either compromised, or uncompromised but under a denial of service (DOS) attack. However, an uncompromised node 104 that is found compromised due to a DOS attack, may be found to be uncompromised after the DOS attack ends. Our intrusion detection algorithm uses a completely new technique. As we discuss in more detail in our related work section, previous intrusion detection approaches in wireless networks utilize wireless monitoring and heuristics to detect misuse or anomalous behavior. In these systems, neighboring nodes monitor packets sent by a node, and raise alarms if the node 104 misbehaves. Such approaches unfortunately are susceptible to slander and framing attacks, and exhibit false positive as well as false negative detections.

Once a node 104 is found to be under the control of an attacker, it was so far an open challenge how to regain control of the node 104 and how to set up new cryptographic keys without human intervention. To the best of our knowledge, we present the first protocols for secure code updates and secure key establishment after node 104 compromise in sensor networks 100. Our secure code update mechanism securely patches a sensor node. By "secure" we mean that a verifier obtains a firm guarantee that the patch was correctly installed and that the code image of the node, after application of the patch, is correct. Our secure key establishment mechanism enables a trusted node 104 to re-establish a secret key with a node 104 that was compromised. Our approach to key establishment is immune to man-in-the-middle attacks without requiring any shared secrets. Moreover, an eavesdropper does not learn the established secret key. The results of the present invention even more surprising since we assume commodity sensor nodes (i.e., no special hardware required). However, we do assume that the attacker only has remote access to the sensor network 100, i.e., the attacker is not physically present in the proximity, but communicates with the sensor nodes through a network. Our techniques can detect and recover nodes even if an attacker compromises an arbitrary number of sensor nodes, uploads arbitrary code into the node, and where nodes can arbitrarily collude.

All our protocols are based on a new mechanism: ICE, which stands for Indisputable Code Execution. ICE is a request-response protocol between the verifier and the device. The verifier does not have physical access to the device's CPU, bus, or memory, but can only communicate over a wireless link with the device. ICE verifies exactly what code is executing on the device at the time the verification is performed. The verifier sends a request to the device. The device computes a response to the verifier's request using a verification function (hereafter called the ICE verification function), and returns the response to the verifier. A correct response from the device guarantees to the verifier that two properties hold on the device. First, the location, in memory, of the code currently executing on the device, matches the location, in memory, of the content we are verifying. Second, the memory contents being verified are correct. Taken together, these two properties assure the verifier that the code it expected to execute on the device, at the time of verification, did indeed execute on the device. A correct response from the device should guarantee that the two properties mentioned above hold even if the attacker controls the node 104 before ICE runs and make arbitrary changes to the memory content.

We present an implementation of FIRE & ICE, Our implementation is based on the Telos sensor nodes, the most recent sensor platform of the Berkeley mote family [Jason Hill, Robert Szewczyk, Alec Woo, Seth Hollar, David E. Culler, and Kristofer S. J. Pister. System architecture directions for networked sensors. In *Architectural Support for Programming Languages and Operating Systems*, pages 93-104, 2000].

In Section 2.2, we present the problem definition, and describe the sensor network 100 architecture, assumptions, and the attacker model. Section 2.3 describes the ICE mechanism. In Section 2.4, we describe FIRE as well as our implementation and evaluation of the FIRE protocol suite. Section 2.5 discusses related work, and Section 2.6 concludes.

2.2 Problem Definition, Assumptions and Attacker Model

We first state our assumptions about the sensor network 100 architecture in Section 2.2.1. Section 2.2.2 discusses our attacker model. In Section 2.2.3, we describe the problem of detecting and repairing remote intrusions in sensor networks 100.

2.2.1 Sensor Network Assumptions

We assume a wireless sensor network 100 consisting of one or multiple base stations and several sensor nodes. The sensor nodes communicate among themselves and the base station 102 using a wireless network. The communication between the base station 102 and sensor nodes can be single-hop or multi-hop.

The base station 102 is the gateway between the sensor network 100 and the outside world. Other sensor networks 100 or computers on the world-wide Internet can send network packets to the sensor nodes through the base station. Every sensor node 104 and the base station 102 has a unique identifier, hereafter referred to as node ID or base station ID.

To authenticate messages between sensor nodes and the base station, we assume, for simplicity, that a public-key infrastructure is set up, where each sensor node 104 knows the authentic public key of the base station 102 (we assume that the base station 102 is the Certification Authority (CA) of the network). Malan et al. have recently shown that public-key cryptography takes on the order of tens of seconds on current sensor nodes [D. Malan, M. Welsh, and M. Smith. A public-key infrastructure for key distribution in TinyOS based on elliptic curve cryptography. In *Proceedings of the First IEEE International Conference on Sensor and Ad hoc Communications and Networks (SECON 2004)*, October 2004], which is justifiable for a small number of operations. We could also assume pairwise shared keys between the base station 102 and sensor nodes, and use the SPINS infrastructure to set up additional keys [Adrian Perrig, Robert Szewczyk, Victor Wen, David Culler, and J. D. Tygar. SPINS: Security protocols for sensor networks. In *Seventh Annual ACM International Conference on Mobile Computing and Networks (MobiCom 2001)*, Rome, Italy, July 2001]. We assume that the base station 102 is immune against remote attacks that inject and run arbitrary code on the base station 102 or steal the cryptographic keys in the base station. This assumption is commonly made in secure sensor networks 100, since compromise of the base station 102 implies compromise of the entire network.

We further assume that each sensor node 104 has a few bytes of Read-Only Memory (ROM) 112. The ROM 112 stores the node ID of the sensor node 104 and base station's public key. By keeping a sensor node's node ID in the ROM 112, we prevent impersonation attacks where an attacker changes the node ID of a node 104 to impersonate another node, for example the Sybil attack [Arjen Lenstra and Eric Verheul. Selecting cryptographic key sizes. In *Journal of Cryptology: The Journal of the International Association for Cryptologic Research*, 1999]. The base station's public key is used by the sensor nodes to authenticate packets from the base station. Storing the base station's public key in ROM 112 prevents an attacker from changing that key if a node 104 is compromised.

We also assume that the code that implements FIRE & ICE, being small in size (approximately 3-4 KB), can be carefully written to be free from software vulnerabilities like buffer overflows.

2.2.2 Attacker Model

In the present invention, we study all remote attacks that an attacker can launch against the sensor nodes in a sensor network. A remote attacker exploits vulnerabilities, like buffer overflows, in the software running on the sensor nodes to compromise the sensor nodes. Once a node 104 is compromised, the attacker has full control. That is, the attacker can inject and run arbitrary code, and steal cryptographic keys. Malicious nodes controlled by the attacker can collude. We assume that the attacker does not introduce its own powerful hardware like laptop computers into the sensor network 100 to impersonate sensor nodes. Introducing new hardware into a sensor network 100 requires the attacker to be physically present which translates to a substantially more determined attacker. In many physically secure sensor networks 100 like those in nuclear power plants or in military environments, the attacker will not be able to introduce its own hardware into the network. The teachings of the present invention may also be applied to situations where an attacker is present at the sensor network 100, allowing it to introduce its own malicious and computationally powerful sensor nodes 104.

2.2.3 Problem Definition

We consider the setting of a sensor node 104 that has a software vulnerability in its code. An attacker can exploit the vulnerability to compromise the sensor node. After compromising the sensor node 104 the attacker can read out the memory contents or inject malicious code into the node.

When a vulnerability is discovered in the sensor node 104 software, the base station 102 has to first detect which sensor nodes in the network have been compromised by an attacker. For uncompromised nodes, their code has to be updated to remove the vulnerability. The compromised nodes either have to be repaired or be blacklisted by the base station.

To repair compromised nodes, first, any malicious code or changes made by the attacker have to be removed from the memory of the sensor node. Then, the code running on the sensor needs to be updated to remove the software vulnerability. All repair needs to be done in the presence of malicious code that may prevent the repair from happening. For example, if the base station 102 sends a software patch to a compromised sensor node, malicious code running on the node 104 may fake the application of the patch.

New cryptographic keys have to be established between the base station 102 and the all sensor nodes. Even uncompromised nodes need new cryptographic keys because an attacker could have compromised a node, read out the cryptographic keys, and then undone all changes to make it appear as though the node 104 were not compromised. The protocol used to establish new cryptographic keys cannot be based on the assumption of the existence of any shared secrets between the base station 102 and sensor nodes. All shared secrets might have been compromised. Even without shared secrets, the cryptographic key establishment protocol has to be immune to eavesdropping and man-in-the-middle attacks.

2.3 ICE: Indisputable Code Execution

In this section, we first describe the indisputable code execution mechanism and show how self-verifying code can be used to achieve indisputable code execution. Section 2.3.2 shows attacks against self-verifying code to spoof the existence of the indisputable code execution property and the properties our self-verifying code (hereafter called the ICE verification function) has that prevent these attacks. In Section 2.3.3, we describe the design of the ICE verification function to achieve its required properties. Finally, Section 2.3.4 discusses the implementation of the ICE verification function on the Telos sensor nodes.

This embodiment of the invention will generally be described in terms of a "verifier" and a "device". The verifier may be the base station 102 or it may be one of the sensor nodes 104, or it may be something else. In this embodiment, the device is one of the sensor nodes 104 or the base station 102 or some other device in the network 100. Many variations are also possible.

2.3.1 Indisputable Code Execution

Figure 15:
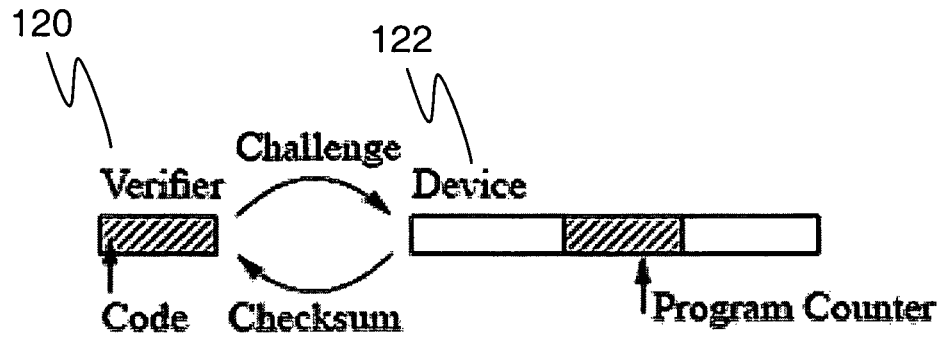
FIG. 15 illustrates setting of Indisputable Code Execution, in which a verifier wants to ensure that a device is indeed executing a certain piece of code. The verifier knows the hardware architecture of the device and the value of the piece of code it wants to verify. The device's memory contains the code the verifier wants to verify. The verifier sends a challenge and only receives the correct checksum within a bounded time period if the device is indeed executing the correct code.

We consider the model where a verifier wants to verify what code is executing on a device, when the verification is performed on the device. However, the verifier does not have physical access to the device's CPU, bus, or memory, but can only communicate with the device over a network link. The verifier knows the exact hardware configuration of the device, and can command the device to run a self-verifying checksum function, called the ICE verification function. In this model, the verifier sends a challenge to the device, asking the device to use the ICE verification function to compute and return a checksum over the contents of memory from which the ICE verification function runs. If the ICE verification function that runs on the device is correct and the ICE verification function is running from the correct location in memory, the device responds with the correct checksum within a pre-specified time period; if the ICE verification function is incorrect or running from a different location in memory than that expected by the verifier, either the checksum will be incorrect with overwhelming probability, or the device will respond after the pre-specified time period (since the ICE verification function is designed to execute slower if the ICE verification function code is different or it runs from a different location in memory). This is the same setting as previous research on this topic assumes [Rick Kennell and Leah H. Jamieson. Establishing the genuinity of remote computer systems. In *Proceedings of the* 11*th USENIX Security Symposium*. USENIX, August 2003; Arvind Seshadri, Adrian Perrig, Leendert van Doom, and Pradeep Khosla. Swatt: Software-based attestation for embedded devices. In Proceedings of the IEEE Symposium on Security and Privacy, May 2004]. FIG. 15 shows an example of a verifier 120 that verifies the code executing on a device 122. The property of ICE (Indisputable Code Execution) is that it "freezes" the code on the device 122, such that the verifier 120 obtains assurance about what code is currently running. As we show in Section 2.4, ICE is a powerful primitive that enables a wide variety of higher-level security mechanisms, such as secure verifiable code updates, secure key establishment, and intrusion detection.

We use self-verifying code to implement ICE. We define self-verifying code as a sequence of instructions, that compute a checksum over themselves in a way that the checksum would be wrong or the computation would be slower if the sequence of instructions were modified.

2.3.2 Attacks Against Self-Verifying Code

We now describe potential attacks against any self-verifying code and intuitions on how we design our defenses.

Pre-Computation and Replay Attacks.

An attacker can compute the checksum over the memory region containing the ICE verification function, before making changes to the ICE verification function. Later when the verifier asks the device to compute and return the checksum, the device returns the precomputed value. To prevent this attack, the verifier 120 sends the device 122 a random challenge along with every verification request. The checksum computed by the device is a function of this challenge. The challenge sent by the verifier is sufficiently long to prevent replay attacks when the attacker stores previously observed challenge-checksum pairs.

Data Substitution Attacks.

The ICE verification function makes multiple linear passes over memory region from which it runs and iteratively computes the checksum. An attacker can change a some bytes of the ICE verification function and keep the original values at a different location in memory. When the ICE verification function tries to read from the memory locations the attacker changed, the attacker diverts the read to the locations in memory where it stored the original values. The attacker has to insert an if statement before the instruction in the ICE verification function that reads from memory to check when the read goes to one of the locations it changed. Inserting the extra if statement slows down the computation of the checksum. This slowdown will be detected by the verifier when it does not receive the checksum from the device 122 within the correct time. However, the attacker can make one optimization to reduce the overhead of the extra if statement. We unroll the loop of the ICE verification function. Thus, the body of the ICE verification function is composed of several instances of the basic loop. Since the ICE verification function makes linear passes over memory, the attacker can predict in advance which loop instances will access the memory locations it modified. Then, it can insert the if statements in those loop instances alone. To force the attacker to insert if statements into every instance of the loop, we unroll the ICE verification function loop so that the number of instances of unrolled loop and the size of the memory region over which the checksum is computed are coprime. This ensures that the same memory location will be accessed by different loop instances during different passes over the memory region. So, the attacker is forced to insert if statements into every loop instance.

Memory Copy Attacks.

Figure 16:
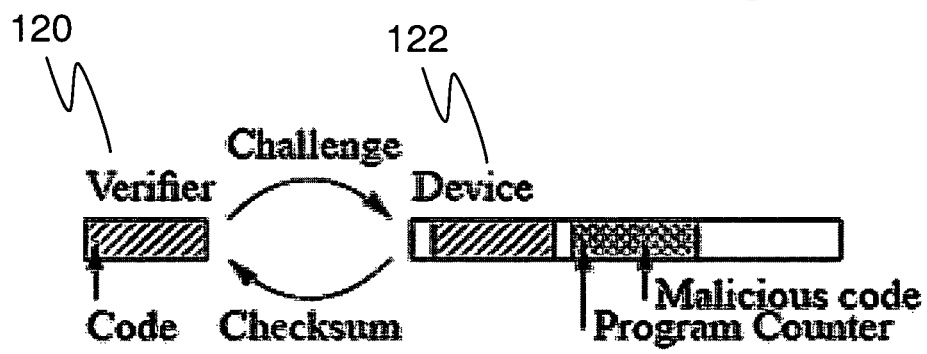
FIG. 16 illustrates an attach, in which the correct code resides at a different memory location, and the attacker executes malicious code at the correct memory location, computing the memory checksum over the correct code.
Figure 17:
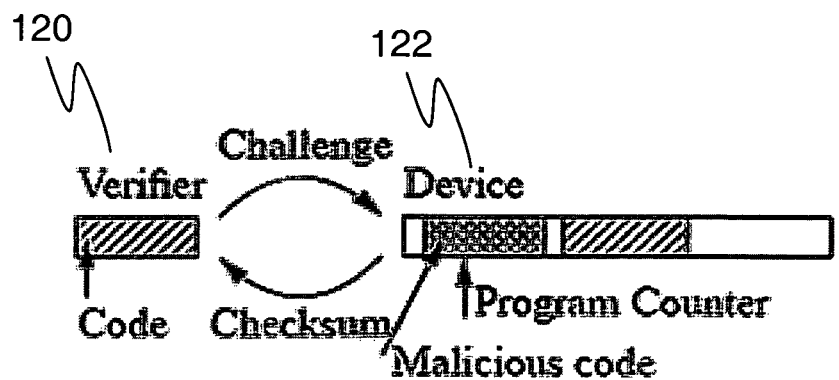
FIG. 17 illustrates an attack in which the correct code resides at the correct memory location, but the attacker executes malicious code at a different memory location, computing the memory checksum over the correct code.

Since we only want to verify the code that is currently executing on a device and that code only constitutes a small part of the full memory contents of the device, we are faced with two copy attacks: either the correct code is copied to another location in memory and malicious code is executing at the location of the correct code (FIG. 16), or the correct code resides at the correct memory location and the malicious code is executing at another location of memory (FIG. 17). It is clear that we need to prevent both attacks to have self-verifying code. To prevent the first attack, we need to ensure that the contents that we compute the checksum over are fetched from the correct address locations in memory. To prevent the second attack, we need to ensure that the program counter is pointing to the correct memory addresses. A third attack is that both the correct code and the malicious code are at different memory locations. It is clear that either of the countermeasures that prevent the first or second copy attack also prevent the third attack.

Loop Counter Modification Attack.

The attacker that has modified a certain portion of the memory being checked modifies the termination value of loop counter so that the ICE verification function runs until it reaches the beginning of the modified memory region. Once the loop is exited the attacker forges the checksum over the memory it modified. After that, the attacker jumps back to the legitimate copy of ICE verification function and runs it until completion. Although the attacker's forgery of the checksum has incurs a time overhead, this overhead would be limited to a small portion of the memory content under examination. The result is that the time overhead might be too small to be detected by the verifier 120. To prevent this attack, we incorporate the termination value of the loop counter into the checksum to catch modifications to this value.

Since the ICE verification function depends on timing, many attacks attempt to speed up the checksum computation. This allows the attacker to run a malicious verification function and use the time gained by speeding up the checksum computation to forge the correct checksum. As long as the correct checksum is returned to the verifier 120 by a certain time, the verifier 120 would consider this node 104 as uncompromised. Three such attacks leveraging timing is presented below.

Computing Checksum Out-of-Order Attack.

The verification function makes one or more linear passes over the memory region for which it computes the checksum. The attacker knows exactly how many times a given memory location is accessed during the computation of the checksum, thus it may compute the checksum contributions all at once without performing the iterations. This would enable the attacker to save time, and in conjunction with the memory copy attacks allow the attacker to return the correct checksum within the allocated time. Making the verification function non-associative prevents the attacker from making shortcuts in the computation.

Optimized Implementation Attack.

The attacker may decrease the execution time of the ICE verification function by optimizing the code, which allows the attacker to use the time gained to forge the checksum, without being detected. Similar to previous research in this area [Rick Kennell and Leah H. Jamieson. Establishing the genuinity of remote computer systems. In *Proceedings of the 11th USENIX Security Symposium*. USENIX, August 2003; Arvind Seshadri, Adrian Perrig, Leendert van Doorn, and Pradeep Khosla. Swatt: Software-based attestation for embedded devices. In *Proceedings of the IEEE Symposium on Security and Privacy*, May 2004], we need to show that the code cannot be further optimized. As previously pointed out, we can use automated tools to either exhaustively find the most efficient implementation [Free Software Foundation. superopt—finds the shortest instruction sequence for a given function. http://www.gnu.org/directory/devel/compilers/superopt.html], or to use theorem proving techniques to show that a given code fragment is optimal [Rajeev Joshi, Greg Nelson, and Keith Randall. Denali: a goal-directed superoptimizer. In *Proceedings of the ACM SIGPLAN* 2002 *Conference on Programming language design and implementation*, pages 304-314, 2002]. In any case, our goal is to keep the code exceedingly simple to facilitate manual inspection and the use of these tools.

Multiple Colluding Devices Attack.

Another way to speed up execution is by leveraging multiple devices to compute the checksum in parallel. Multiple devices can collude to compute different ranges in the ICE verification function loop and combine their results to get the final checksum. To prevent this attack, we want to make the verification function non-parallelizable to force sequential execution.

2.3.3 Design of ICE

The key idea in ICE is that the ICE verification function computes a checksum over its own instruction sequence and return the checksum to the verifier within a certain time period of time. We now discuss what primitive we use to generate the fingerprint of memory.

As mentioned in Section 2.3.2, the checksum computation to be resistant to pre-computation and reply attacks. This requirement rules out using a cyrptographic hash function. We could use a cryptographic message authentication code (MAC), like HMAC [Mihir Bellare, Ran Canetti, and Hugo Krawczyk. Keying hash functions for message authentication. In Neal Koblitz, editor, *Advances in Cryptology— Crypto '96*, pages 1-15, Berlin, 1996. Springer-Verlag. Lecture Notes in Computer Science Volume 1109]. However, MAC functions have much stronger properties than we require. MACs are designed to resist the MAC forgery attack. In this attack, the attacker has observes the MAC values for a number of different inputs. All MAC values are computed using the same key. The attacker then tries to generate a MAC for an unknown input, under the same key, using the input-MAC pairs it has observed. In our setting, the verifier sends a random challenge to the device along with each verification request. The device uses the random challenge as the key to generate the memory fingerprint. Since the key changes every time, the MAC forgery attack is not relevant in our setting.

We use a simple checksum function to generate a fingerprint of memory. The checksum function uses the random challenge sent by the verifier to seed a pseudorandom number generator (PRG) and to initialize the checksum variable. The output of the PRG is incorporated into the checksum during each iteration of the checksum function. The input used to compute the checksum changes with each verification request since the initial value of checksum variable and output of the PRG will be different for each challenge sent by the verifier. Hence, the final checksum returned by the device will be a function of the verifier's challenge.

To prove to the verifier that the ICE verification function is actually computing the checksum over itself, we need to detect the two copy attacks mentioned in Section 2.3.2. To prove to the verifier, that the ICE verification function is executing from the correct locations in memory, the ICE verification function includes the value of the program counter (PC) into the checksum. To prove to the verifier that the checksum is computed over the correct locations in memory, the ICE verification function includes the data pointer, that is used to read the memory, into the checksum. Hence, when the checksum returned by the device to the verifier is correct, the verifier is assured that the program counter, data pointer and the contents of the region of memory over which the checksum was computed, all had the correct values.

If an attacker tries to launch either of the copy attacks mentioned in Section 2.3.2, the attacker will have to incorporate additional instructions into the ICE verification function to simulate the correct values for the PC and the data pointer. These additional instructions will slowdown the computation of the ICE checksum.

The ICE verification function uses an alternate sequence of additions and XOR operations to compute the checksum, thereby making the checksum computation non-associative. An alternate sequence of additions and XOR operations is non-associative because $a \oplus b + c$ is equivalent to $(a \oplus b) + c$, but not $a \oplus (b+c)$.

In order to make the checksum function non-parallelizable, we use the two preceding checksum values to compute the current checksum value. Also, the PRG generates its current output based on its last output.

FIG. 18 shows the pseudocode of the ICE verification function. The ICE verification function iteratively computes a 128-bit checksum of the contents of memory. The pseudocode is presented in a non-optimized form for readability. It takes in a parameter y which is the number of iterations the ICE verification function should perform when computing the checksum. The 128-bit checksum is represented as an array of eight 16-bit values. The ICE verification function updated one 16-bit element of the checksum array in each iteration of its loop. To update a checksum element, the ICE verification function loads a word from memory, transforms the word that is loaded and adds the transformed value to the checksum element. The checksum element is then rotated left by one bit.

The random challenge sent by the verifier is 144 bits long. Of this, 128 bits are used to initialize the checksum array and 16 bits are used as the seed for the T function.

We use a 16-bit T function [Alexander Klimov and Adi Shamir. New cryptographic primitives based on multiword t-functions. In *Fast Software Encryption*, 11*th International Workshop*, February 2004] as the PRG. T functions have the property that the $i^{th}$ output only depends on outputs $1 \ldots i$. The particular T function we use in the pseudocode is $x \leftarrow x + (x^2 \vee 5)$. In practice, we should use a family of T functions because a T function starts repeating itself after it has generated all elements in its range. Another option for a PRG would be the RC4 stream cipher. However, T functions are very efficient, and their code can be easily showed to be non-optimizable.

To ensure that the intruder cannot modify a single byte, the checksum function needs to examine the entire memory content under verification. Previously, researchers propose to traverse the memory in pseudo-random order [Rick Kennell and Leah H. Jamieson. Establishing the genuinity of remote computer systems. In *Proceedings of the* 11*th USENIX Security Symposium. USENIX*, August 2003; Arvind Seshadri, Adrian Perrig, Leendert van Doom, and Pradeep Khosla. Swatt: Software-based attestation for embedded devices. In *Proceedings of the IEEE Symposium on Security and Privacy*, May 2004]. This approach is undesirable, however, because it requires $O(n \log(n))$ memory reads to achieve high probability that each memory location was accessed at least once, where n is memory size. The ICE verification function makes multiple linear passes over memory, thus requiring only $O(n)$ accesses to touch every memory location with a probability of one. As the pseudocode shows, the data pointer is incremented during each iteration of the loop and then checked for bounds before each memory read.

2.3.4 Implementation of ICE

2.3.4.1 Sensor Node Architecture

We implemented ICE the Telos sensor nodes, the most recent platform of the Berkeley mote family. The Telos motes the use the MSP430 microcontroller from Texas Instruments. The MSP430 is a 16-bit von-Neumann architecture with 60K of Flash memory, and 2K of RAM. The microcontroller has a 8 MHz CPU that features the RISC architecture and has 16 16-bit registers.

The ICE verification function uses all 16 CPU registers. Thus, the attacker does have any more free registers for any modifications it makes. For an architecture that has more registers, we can deny the availability of registers to the attacker by storing the checksum in registers and extending the size of the checksum until no free registers remain.

The MSP430 CPU has the following features. Operation with immediate operands take more CPU cycles than register-to-register operations. In general, this property holds for most CPU architectures. The program counter (PC) is a regular register. Hence, we can easily incorporate the PC value into the checksum. The CPU also has a hardware multiplier. The presence of the multiplier considerably speeds up the computation of the T function. However, the presence of a hardware multiplier is not absolutely necessary for the ICE verification function. In the absence of a hardware multiplier, the multiply operation in the T function can be simulated or the T function can be replaced by RC4, which does not require any multiply operations.

Assembly Instruction Explanation

2.3.4.2 Assembly Code

FIG. 19 shows the main loop the ICE verification function written in the assembly language of MSP-430. As can be seen, all variables used in the checksum computation are maintained in the CPU registers. The code is manually optimized to ensure that the attacker cannot find a more optimized implementation. The main loop consists of just 17 assembly instructions and takes 30 machine cycles. We will show that the best attack code would achieve a 3 cycle overhead in each iteration of the main loop, which represents a 10% overhead.

As part of the assembly code optimization, we unrolled the loop 8 times. This allows us to the keep the checksum array in the CPU registers and also to eliminate the checksum index variable. In the unoptimized code, bounds checking is performed on the data address at every memory access. After unrolling the loop, an obvious optimization would be to perform bounds checking at the very end of the unrolled loop instead of at every instance, thus saving cycles. If we do so, the data pointer might go out of bounds by at most 7 memory locations. To ensure the checksum function still operates correctly, we pad the end of the self verification code with known values (e.g., NOPs no-operation instructions) for up to 7 memory locations. Thus, if our memory reads are going out of bounds, we would still only be accessing known values.

Based on the assembler code, we will now show that the attacker incurs a time overhead of least 3 CPU cycles when it carries out any of attacks mentioned in Section 2.3.2. To carry out the memory copy attacks, the attacker has to forge the values of either the PC or the data pointer. The attacker does not have any free registers. Thus, the fastest way to forge the data pointer is save the correct value of the data pointer before the memory access, replace it with a value of the attacker's choosing and to restore the correct the value of the data pointer before it is incorporated into the checksum. This incurs an overhead of 4 CPU cycles per iteration on the MSP430.

To forge the PC, the attacker can replace the value of the PC by immediate since the each sampled value of a PC is a constant. However, on the MSP430 architecture (and most RISC architectures), such an operation using an immediate operand required 1 more CPU cycle compared to a register-to-register operation. Since we use the PC 3 times in each iteration, the attacker would incur a 3 CPU cycle penalty.

All other attacks that involve making changes to the ICE verification function code directly will involve the data substitution attack. The data substitution attacks requires that the attacker to insert at least one extra if statement into every iteration of the ICE verification function. An if statement translates into a compare and a branch in assembly. On the MSP430 a compare and a branch together take 3 CPU cycles.

Typically, the ICE verification function would verify itself as well as a few other functions that will execute immediately following it. After computing and returning the checksum, the ICE verification function would jump to one of these verified functions. From the assembler code, it is clear that the ICE verification function does not contain any contiguous memory region that has the same value. However, we cannot make the same claim about the other functions that ICE verifies. If these functions have a contiguous region all of which has the same value, like a buffer of zeros for example, the attacker can take advantage of this situation by having a malicious verification function that does not perform memory reads when it iterates through this memory region. In this way, the attacker would save some CPU cycles that could be used to carry out other attacks. To prevent this attack, we encrypt all memory content under verification except the code of the ICE verification function itself.

2.3.5 Results

Figure 20:
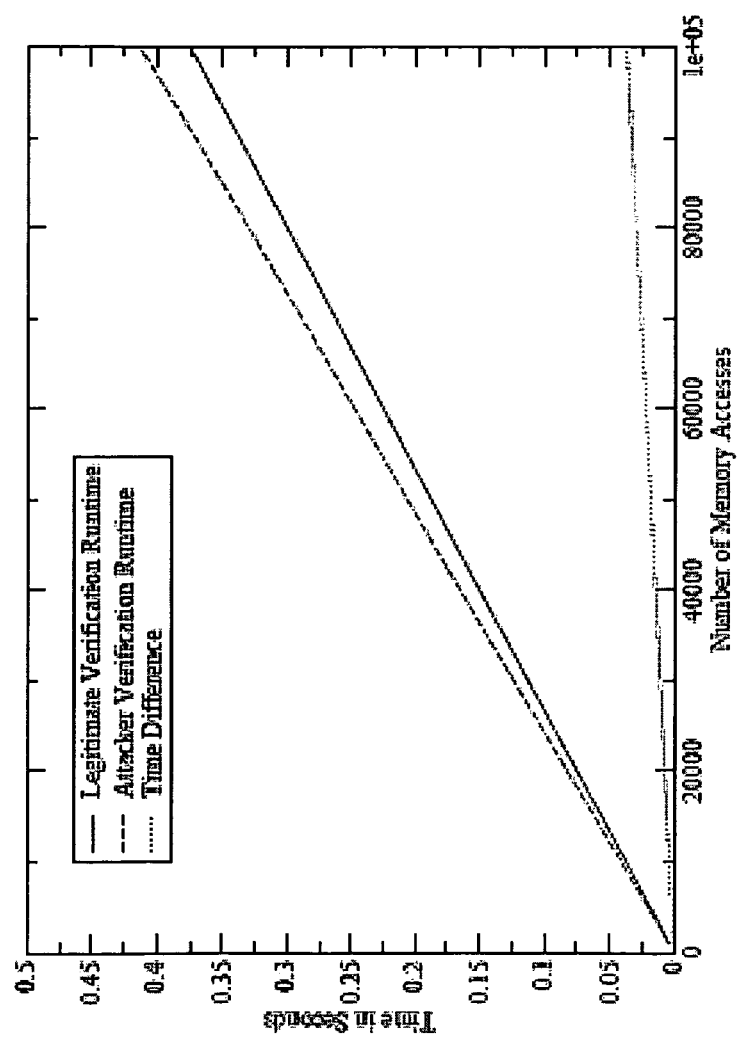
FIG. 20 illustrates one embodiment of runtime overhead of attacker.

We implemented two versions of the ICE verification function on the Berkeley Telos motes: a legitimate version and a malicious version that assumes that the attacker has a 3 CPU cycle overhead per iteration of the ICE verification function. This translates into a 10% runtime overhead. The MSP-430 microcontroller has an emulator board and a real-time C-SPY debugger that can monitor the status, register file, and memory content of the device. We profiled both executions and FIG. 20 shows the runtime overhead. A detectable time difference is required in order for the ICE protocol to identify malicious nodes. As our results show, we can achieve an arbitrarily large time difference by varying the number of memory accesses.

Since the running time of the ICE verification function increases linearly with the number of iterations, we wish to minimize this number, and yet induce a time overhead to the attacker that is detectable by the verifier. In practice, the verifier should choose the number of iterations to ensure that the attacker's overhead is greater than network latency. As a corollary, we need a strict upper bound on network latency.

2.4 Protocols for Intrusion Detection and Repair

We start this section by describing how ICE can be used to construct the FIRE protocols, i.e., protocols for intrusion detection, code updates and cryptographic key updates in sensor networks 100. This is followed by a high-level description of the protocols. Section 2.4.5, gives a more detailed description of the protocols. In Section 2.4.4, we discuss some points to be considered when using the FIRE protocols for building systems.

2.4.1 Extending ICE

The FIRE protocols use ICE as the primitive. The ICE verification function is a self-verifying function. When the ICE checksum returned by a device is correct the verifier is assured that the code that is expected to have executed on the device did in fact execute on the device.

We can ask the ICE verification function to produce a checksum of memory regions of any size. As long as the memory region being verified includes the portion of memory where the ICE verification function resides, a correct ICE checksum is a guarantee that the memory region over which the checksum was computed has the expected contents. When designing the FIRE protocols using ICE, we make the ICE verification function check a region of memory that contains the code for the FIRE protocols and the code for the ICE verification function. After computing the checksum, the ICE verification function jumps to the code of one of the FIRE protocols. In the context of sensor networks 100, the base station 102 functions as the verifier and the sensor node 104 is the device being verified. The memory of every sensor node 104 has code for the ICE verification function and the FIRE protocols.

The time taken by a sensor node 104 to compute the ICE checksum has to be measured accurately to verify the correctness of the ICE checksum. In multi-hop sensor networks 100, the network latency between the base station 102 and the sensor node 104 can considerably vary the time between sending a ICE challenge and receiving a response. To minimize the variance, the base station 102 can ask a node 104 that is the neighbor of the node 104 computing the checksum to measure the ICE checksum computation time. However, the node 104 that is asked to time the checksum computation of another node 104 has to be trusted. The base station 102 establishes the required trust relationship by using an expanding ring method. The base station 102 first verifies nodes that are one network hop away from it. In this case, the base station 102 can directly time the ICE checksum computation. The nodes that are one network hop away are then asked by the base station 102 to measure the time taken by their neighbors to compute the checksum. In this manner, the ICE verification spreads out from the base station 102 like an expanding ring.

Even a one-hop network latency is not deterministic in a wireless environment where multiple sensor nodes contend for the radio channel. To make the one hop network latency deterministic, the sensor node 104 computing the ICE checksum is given exclusive access to the radio channel. Now, the one hop network latency can be predetermined by the base station. The sensor node 104 computing the ICE checksum can be be asked by the base station 102 to do a sufficient number of iterations of the ICE verification function loop, so that the expected time overhead for an attacker's ICE checksum computation is much greater than the predetermined one hop network communication latency.

A malicious sensor node 104 can forward the ICE challenge to a proxy node 104 that has a copy of the correct memory contents and can compute the ICE checksum faster than the sensor node. The time saved by a faster computation of the ICE checksum can be used for communicating the ICE challenge from the sensor node 104 to the proxy and communicating the ICE checksum from the proxy to the sensor node. This way the malicious sensor node 104 can fake the ICE checksum and the forgery will go undetected by the base station.

Figure 21:
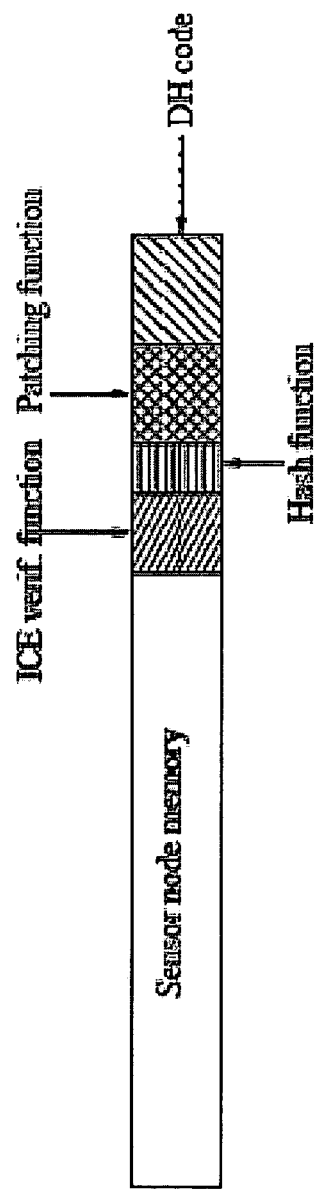
FIG. 21 illustrates memory layout of a sensor node 104 according to one embodiment of the present invention. The ICE verification function is used to verify the contents of memory containing itself, and a hash function. The hash function computes a hash of the rest of the sensor node 104 memory. The patch function is used for code updates and the Diffie-Hellman code is used for cryptographic key updates.

To compute the checksum faster than a sensor node, the proxy has to be a computing device with greater computing and storage resources than a sensor node. For example, the proxy device can be a PC on the Internet, but not another sensor node. All sensor nodes having identical memory layouts take the same amount of time to compute the ICE checksum. FIG. 21 illustrates memory layout of a sensor node 104 according to one embodiment of the present invention. The ICE verification function is used to verify the contents of memory containing itself, and a hash function. The hash function computes a hash of the rest of the sensor node 104 memory. The patch function is used for code updates and the Diffie-Hellman code is used for cryptographic key updates.

The base station 102 detects proxy attacks by delaying all packets between the sensor network 100 and the outside world by a few seconds when a sensor node 104 is computing the ICE checksum. The base station 102 is the gateway between the sensor network 100 and the outside world. Any packets sent and received between a malicious sensor node 104 and a proxy that is outside the sensor network 100 will have to pass through the base station. If a sensor node 104 tries to use a proxy node 104*to* help compute the ICE checksum, the delay introduced into the communication by the base station 102 will ensure that the sensor node 104 cannot return the ICE checksum to the base station 102 within the expected amount of time.

2.4.2 Protocols for Intrusion Detection and Code Updates

We define intrusion as the process of a remote attacker compromising a node 104 using software vulnerabilities. The purpose our intrusion detection and repair protocol is to provide a method for the base station 102 to detect whether a node 104 has been compromised.

If any intrusion is detected, either the sensor node 104 is blacklisted by the base station 102 or the node 104 is repaired. To repair a node, the base station 102 sends an update to the sensor node 104 to patch the software vulnerability. The base station 102 is guaranteed that the sensor node 104 applies the code updates sent by the base station 102 and is repaired fully.

The intrusion detection mechanism does not make any false negative claims. That is, if a node 104 is flagged by the mechanism as being uncompromised, the node 104 is actually uncompromised. If a node 104 is tagged as being compromised, then either the node 104 is actually compromised or is experiencing a DOS attack. For example, a malicious node 104 could jam an uncompromised node 104 computing the ICE checksum. Then the node 104 computing the ICE checksum will not be able to return the ICE checksum to the base station 102 within the expected amount of time and will appear to have been compromised.

The ICE verification function computes a ICE checksum over the region of memory that contains the ICE verification function and a hash function. After finishing the ICE checksum computation, the ICE verification function jumps to the hash function. The hash function computes a hash over the rest of the memory. FIG. 22 shows a simplified version of the intrusion detection and code update protocol. Section 2.4.5 gives the full protocol.

When the ICE checksum is correct, the hash function can be trusted to compute a correct hash of the sensor node's memory. In this case, the base station 102 can compare the hash of a sensor node's memory with the correct hash to determine if there have been changes to the memory contents of the sensor node. The base station 102 can also pinpoint exactly which locations in the memory of a sensor node 104 have been changed by asking the sensor node 104 to compute hashes of different regions of its memory. Once the changed locations in the memory of a sensor node 104 have been identified, the base station 102 can send memory updates for exactly those memory locations that have been modified on the sensor node. So, the amount of data sent from the base station 102 to the sensor node 104 will be minimized. Even though computing the extra hashes over memory take up energy, energy required for communication is at least an order of magnitude larger than energy used for computation. Hence, overall less energy will be utilized.

If the ICE checksum returned by the sensor node 104 is incorrect, then the memory region containing the ICE verification function, the hash function and the function to apply code updates has been modified. In this case the base station 102 has no guarantee of what is actually executing on the sensor node. Thus, the base station 102 blacklists the sensor node.

2.4.3 Cryptographic Key Update Protocol

Once a sensor node 104 has been repaired by undoing changes the attacker made to its memory contents and the software vulnerability removed using a code update, a new cryptographic key needs to be established between the sensor node 104 and the base station. Even if a sensor node 104 looks uncompromised, a new cryptographic key needs to be established since the attacker could have compromised the node, read out its cryptographic key, and then undone all changes made to the memory. Our cryptographic key update protocol does not rely on the presence of any shared secrets between the base station 102 and the sensor node. We assume that the attacker knows the entire memory contents of the sensor node. The cryptographic key update protocol establishes a symmetric key between the base station 102 and a sensor node, preventing man-in-the-middle and eavesdropping attacks.

At first glance, it may appear impossible to rule out man-in-the-middle and eavesdropping attacks without leveraging a shared secret key. However, the properties we rely on here are that, one, the attacker is remote and has a longer delay for messages and, two, all sensor nodes in the network have equal computational capabilities. Using the ICE approach, the base station 102 sends a challenge that only a node 104 with the correct memory contents can correctly solve. We assume that each sensor node 104 has a few bytes of Read-Only Memory (ROM) containing its node 104 id. The sensor node 104 uses the challenge sent by the base station 102 to compute a checksum over the memory region containing the ICE verification function, a hash function and its node 104 id. The sensor node 104 with the correct node 104 id and memory layout will be able to generate the ICE checksum faster than all other nodes in sensor network. We leverage this asymmetry in time of computing the ICE checksum to establish a symmetric key between the base station 102 and the sensor node.

A symmetric key is established between the base station 102 and sensor node 104 using the Diffie-Hellman (DH) key exchange protocol. In order to prevent man-in-the-middle attacks, the sensor node 104 and the base station 102 need to authenticate the DH protocol messages. We assume that all sensor nodes have the base station's public key in their Read-Only Memory (ROM). Hence, the sensor node 104 can authenticate the base station's DH half key. A simple way to complete the DH key exchange is for the sensor node 104 to generate and send a DH half key to the base station 102 immediately after computing the ICE checksum. The sensor node 104 also sends a MAC of its DH half key to the base station. The MAC is generated using the ICE checksum as the key. If the time taken by the sensor node 104 to compute the ICE checksum and generate its DH half-key is less than the time taken by the attacker to forge the ICE checksum, then, on the verifying the MAC, the base station 102 is assured that the DH half key could have only come from the correct sensor node. This statement is true since no other sensor node 104 can compute the ICE checksum as fast the correct sensor node.

However, computing DH half keys is too slow on sensor nodes. An attacker can pre-compute a Diffie-Hellman half key before the ICE challenge arrives from the base station 102 and then use the extra time to forge the ICE checksum. The attacker can then generate the correct MAC for its DH half-key.

Since generation of the Diffie-Hellman half key is too slow to perform right after computing the ICE checksum, we need a fast mechanism to set up an authenticated channel between the node 104 and the base station. This authenticated channel can be used by the sensor node 104 to send its Diffie-Hellman half key to the base station. Since one-way functions are efficient to compute, we use the Guy Fawkes protocol by Anderson et al. [R. Anderson, F. Bergadano, B. Crispo, J. Lee, C. Manifavas, and R. Needham. A new family of authentication protocols. *ACM Operating Systems Review*, 32(4):9-20, October 1998] to set up the authenticated channel. Both the base station 102 and the sensor node 104 compute a short one-way hash chain. We let the node 104 create a fresh one-way hash chain, containing three elements, right after the checksum computation. The node 104 generates the initial element of its hash chain as a function of the ICE checksum and a randomly chosen value. This ensures that an attacker cannot precompute the hash chain to save some time for forging the ICE checksum. In addition, since the node 104 also uses a random value to generate the its hash chain, no other node 104 can generate the node's hash chain even when after forging the ICE checksum sometime in the future.

The node 104 uses the ICE checksum to authenticate its one-way chain to the base station. Then, the node 104 computes a fresh Diffie-Hellman half key, and authenticates it through the Guy Fawkes protocol. Thus, we achieve secure key establishment without shared secrets, robust to man-in-the-middle attacks and eavesdropping by colluding malicious nodes. FIG. 23 shows a simplified version of our key update protocol where we do not show details of how the sensor node 104 authenticates packets from the base station. Section 2.4.5 gives the full protocol.

2.4.4 Considerations for System Design Selection of Cryptographic Primitives Selection of cryptographic primitives. Because of our application onto sensor nodes with limited computation power and resources, implementation of the cryptographic primitives posed a major challenge. To save program memory, we reuse one block cipher to implement all cryptographic primitives. We suggest using RC5 [Ron Rivest. The RC5 encryption algorithm. In Ross Anderson, editor, *Proceedings of the 1$^{st}$ International Workshop on Fast Software Encryption*, volume 809 of *Lecture Notes in Computer Science*, pages 86-96. Springer-Verlag, Berlin Germany, 1995] as the block cipher because of its small code size and efficiency. In prior work in sensor network 100 security [Adrian Perrig, Robert Szewczyk, Victor Wen, David Culler, and J. D.

Tygar. SPINS: Security protocols for sensor networks. In *Seventh Annual ACM International Conference on Mobile Computing and Networks (MobiCom* 2001), Rome, Italy, July 2001], Perrig et al. stated that an optimized RC5 algorithm can compute an 8 byte block encryption in 120 cycles. Thus, on this architecture, one execution of RC5 merely requires 0.015 MS.

A CBC-MAC operation can be implemented by using RC5 as the block cipher. The hash function can also be constructed with RC5 as follows: $h(x)=RC5(x)\oplus x$, using a standard value as the key.

Diffie-Hellman Parameters

Because of stringent resource constraint on sensor nodes, most work on sensor network 100 security only operates with symmetric cryptographic, protocols. Generally, it is considered impractical to perform expensive asymmetric cryptographic operations on sensor nodes because they do not have enough computation power or memory size. In our work, by carefully picking the parameters, it is possible to run asymmetric algorithms on the Berkeley Telos motes.

By selecting the bare minimum needed to perform Diffie-Hellman, we used a subset of the TinyPK package from BBN [BBN. Tinypk. Private communications, 2003]. The Diffie-Hellman key exchange is an asymmetric cryptographic protocol that is based on the operation $g^x$ mod p. The security of Diffie-Hellman is based on the length of secret x and a public p. The security of Diffie-Hellman is based on the length of secret x a subgroup discrete logarithm key size of 112 bits. According to Lenstra et al. [Arjen Lenstra and Eric Verheul. Selecting cryptographic key sizes. In *Journal of Cryptology: The Journal of the International Association for Cryptologic Research*, 1999], these parameters would be deemed as secure in the year 1990 using state of the art technology at that time. Since we are dealing with low cost, mass quantity sensor nodes, 1990 levels of security is sufficient. Of course, the attacker can break our system using powerful Gigahertz machines for each sensor node, but this would be a very unlikely scenario because the attacker would incur a high cost.

Since g is relatively unimportant in the security of the protocol, we set g to be 2 in order to speed up computation. Using these parameters, the Telos mote were able to perform $g^x$ mod p in 13.8 seconds. Since the Diffie-Hellman calculation is not timed as part of the ICE loop, a runtime of 13.8 s is acceptable.

2.4.5 Protocol

FIG. 24 shows the protocol that is used by the base station 102 (B) detecting intrusion in a sensor node 104 and sending code updates to a sensor node 104 (A). The base station 102 and the sensor node 104 are one network hop away from each other. The protocol is for a node 104 which has not been compromised but has a software vulnerability that needs to be patched. The base station 102 has a private key, denoted in the protocol by $K_B^{-1}$.

FIG. 25 shows the detailed protocol for symmetric key establishment between the base station, B, and a sensor node, A. The base station 102 has a private key, denoted in the protocol by $K_B^{-1}$.

2.5 Related Work

In this section, we review related work in code attestation, intrusion detection in wireless networks, code updates in wireless networks, and key distribution in wireless networks.

Hardware based attestation is promoted by the Trusted Computing group (TCG) [Trusted Computing Group (TCG). https://www.trustedcomputinggroup.org/, 2003]. Several chip manufacturers sell Trusted Platform Modules (TPMs), which implement the TCG standard. TCG and Microsoft's NGSCB have been proposed as memory-content attestation techniques that use secure hardware in form of a TPM chip to provide attestation [Next-Generation Secure Computing Base (NGSCB). http://www.microsoft.com/resources/ngscb/default.mspx, 2003; Trusted Computing Group (TCG). https://www.trustedcomputinggroup.org/, 2003]. Due to cost and power constraints, sensor nodes are unlikely to have secure hardware. Also, TCG and NGSCB provide load-time attestation i.e. they can only guarantee what was initially loaded into memory initially was correct. ICE requires runtime attestation to know what the current contents of memory are.

In the software-based attestation space, Kennel and Jamieson propose the first system [Rick Kennell and Leah H. Jamieson. Establishing the genuinity of remote computer systems. In *Proceedings of the 11th USENIX Security Symposium*. USENIX, August 2003], however Shankar, Chew, and Tygar have identified weaknesses in their work [Umesh Shankar, Monica Chew, and J. D. Tygar. Side effects are not sufficient to authenticate software. In *Proceedings of USENIX Security Symposium*, pages 89-101, August 2004]. Seshadri et al. propose SWATT, which is a software-based memory content attestation mechanism [Arvind Seshadri, Adrian Perrig, Leendert van Doom, and Pradeep Khosla. Swatt: Software-based attestation for embedded devices. In *Proceedings of the IEEE Symposium on Security and Privacy*, May 2004]. SWATT needs to check the entire memory of the node 104 to ensure that an attacker cannot hide malicious code anywhere in memory. Checking the entire memory is time consuming on nodes with large memory sizes. Further, SWATT does a pseudorandom access pattern over memory. This requires SWATT to perform O(n*ln n) accesses to memory, where n is the size of memory in bytes, to ensure that every memory location is accessed with high probability. This approach is impractical for large memories. Our ICE technique only checks a portion of memory instead of the whole memory, relieving this drawback. Our attestation performs a linear pass over memory. Thus, all memory locations are accessed with a probability of one.

Zhang and Lee [Yongguang Zhang andWenke Lee. Intrusion detection in wireless ad-hoc networks. In *Proceedings of International Conference on Mobile Computing and Networking (MobiCom* 2000), August 2000] describe the issues of intrusion detection systems (IDS) in ad hoc wireless networks. They describe an architecture for an IDS for wireless networks. Marti et al. [Sergio Marti, T. J. Giuli, Kevin Lai, and Mary Baker. Mitigating routing misbehaviour in mobile ad hoc networks. In *Proceedings of the sixth annual International Conference on Mobile Computing and Networking*, pages 255-265, Boston Mass., USA, August 2000] propose an intrusion detection system specifically for the DSR routing protocol, their Watchdog and Pathrater attempt to find nodes that do not correctly forward traffic by identifying the attacking nodes and avoiding them in the routes used. Buchegger and LeBoudec [Sonja Buchegger and Jean-Yves Le Boudec. Performance analysis of the confidant protocol (cooperation of nodes—fairness in dynamic ad-hoc networks). In *ACM International Symposium on Mobile Ad Hoc Networking and Computing (MobiHoc* 2002), Lausanne, June 2002] propose CONFIDANT, a system consisting of a monitor, a trust monitor, a reputation system, and a path manager. Lee et al. studied intrusion detection in wireless networks in more detail [Yi an Huang, Wei Fan, Wenke Lee, and Philip S. Yu. Cross-feature analysis for detecting ad-hoc routing anomalies. In *Proceedings of The 23rd International Conference on Distributed Computing Systems (ICDCS)*, May 2003; Yian Huang and Wenke Lee. Attack analysis and detection for ad hoc routing protocols. In *Proceedings of The 7th International Symposium on Recent Advances in Intrusion Detection (RAID 2004)*, September 2004; Yongguang Zhang and Wenke Lee. Intrusion detection in wireless ad-hoc networks. In *Proceedings of International Conference on Mobile Computing and Networking (MobiCom 2000)*, August 2000; Yongguang Zhang, Wenke Lee, and Yian Huang. Intrusion detection techniques for mobile wireless networks. *ACM/Kluwer Wireless Networks Journal (ACM WINET)*, 9(5), September 2003]. All these approaches rely on passive network monitoring to detect malicious activity. These techniques all have false positives and false negatives. The approaches we describe in the present invention take an active approach, by checking the memory of a node 104 our technique is not susceptible to false negatives, however, an attacker who interferes with the verification may delay, corrupt, or jam the response message and thus cause false positives. In any case, this work is the first work that we are aware of that proposes an intrusion detection system for sensor networks 100.

In the area of sensor network 100 software updates, all related research projects we are aware of do not consider security, but are mainly concerned with efficiency and reliability [Jonathan W. Hui and David Culler. The dynamic behavior of a data dissemination protocol for network programming at scale. In *Proceedings of ACM Conference on Embedded Networked Sensor Systems (SenSys '04)*, November 2004; Philip Levis, Sam Madden, David Gay, Joseph Polastre, Robert Szewczyk, Alec Woo, Eric Brewer, and David Culler. The emergence of networking abstractions and techniques in TinyOS. In *Proceedings of the First USENIX/ACM Symposium on Networked Systems Design and Implementation (NSDI 2004)*, March 2004; Philip Levis, Neil Patel, David Culler, and Scott Shenker. Trickle: A self-regulating algorithm for code propagation and maintenance in wireless sensor networks. In *Proceedings of the First USENIX/ACM Symposium on Networked Systems Design and Implementation (NSDI 2004)*, March 2004; Umesh Shankar, Monica Chew, and J. D. Tygar. Side effects are not sufficient to authenticate software. In *Proceedings of USENIX Security Symposium*, pages 89-101, August 2004]. They all assume a trustworthy environment.

Many researchers have considered key establishment protocols, however, all these efforts assume the presence of secret information to prevent man-in-the-middle attacks [Ross Anderson, Haowen Chan, and Adrian Perrig. Key infection: Smart trust for smart dust. In *Proceedings of IEEE International Conference on Network Protocols (ICNP 2004)*, October 2004; Haowen Chan, Adrian Perrig, and Dawn Song. Random key predistribution schemes for sensor networks. In *IEEE Symposium on Security and Privacy*, May 2003; W. Du, J. Deng, Y. Han, and P. Varshney. A pairwise key pre-distribution scheme for wireless sensor networks. In *Proceedings of the Tenth ACM Conference on Computer and Communications Security (CCS 2003)*, pages 42-51, October 2003; L. Eschenauer and V. Gligor. A key-management scheme for distributed sensor networks. In *Proceedings of the 9th ACM Conference on Computer and Communication Security*, pages 41-47, November 2002; D. Liu and P. Ning. Establishing pairwise keys in distributed sensor networks. In *Proceedings of the Tenth ACM Conference on Computer and Communications Security (CCS 2003)*, pages 52-61, October 2003; D. Liu and P. Ning. Location-based pairwise key establishments for static sensor networks. In *ACM Workshop on Security in Ad Hoc and Sensor Networks (SASN '03)*, October 2003; Adrian Perrig, Robert Szewczyk, Victor Wen, David Culler, and J. D. Tygar. SPINS: Security protocols for sensor networks. In *Seventh Annual ACM International Conference on Mobile Computing and Networks (MobiCom 2001)*, Rome, Italy, July 2001; Roberto Di Pietro, Luigi V. Mancini, and Alessandro Mei. Random key assignment for secure wireless sensor networks. In *ACM Workshop on Security of Ad Hoc and Sensor Networks (SASN 2003)*, November 2003; S. Zhu, S. Setia, and S. Jajodia. LEAP: Efficient security mechanisms for large-scale distributed sensor networks. In *Proceedings of the Tenth ACM Conference on Computer and Communications Security (CCS 2003)*, pages 62-72, October 2003]. One key establishment protocol in the present invention is the first sensor network 100 routing protocol that prevents man-in-the-middle attacks without assuming the presence of authentic or secret information, or a trusted side-channel to establish authentic information.

2.6 Conclusion

We present a new architecture to secure sensor networks 100, which enables secure detection and recovery from sensor node 104 compromise. Our approach is to design an intrusion detection system that is free of any false negatives, and that can identify compromised nodes. In addition, we design two mechanisms to recover compromised nodes, which to the best of our knowledge are the first protocols to deal with such issues. Our first mechanism can securely update the code of a sensor node, offering a strong guarantee that the node 104 has been correctly patched. Our second mechanism sets up new cryptographic keys, even though an attacker may know all memory contents of the node, and can eavesdrop on and inject arbitrary messages in the network. All our mechanisms are based on ICE (Indisputable Code Execution), which freezes the memory contents to verify the correctness of the code currently executing on the node. Through our implementation in off-the shelf sensor nodes we demonstrate that our techniques are practical on current sensor nodes, without requiring specialized hardware. We are excited about other applications that our techniques may enable, which we will explore in our future work.

3.1. Third Embodiment

Another embodiment of the present invention will be described in the context of sensor networks, although it is also applicable to computer networks and other types of networks, and not limited to "sensor networks". Sensor networks are expected to be deployed in the near future in many safety-critical applications such as critical infrastructure protection and surveillance, alarm systems, home and office automation, inventory control systems, and many medical applications such as patient monitoring. Hence, if an attacker injects malicious code into the sensor nodes, it can compromise the safety and privacy of users. We consider the setting of a sensor network where an attacker has compromised sensor nodes by injecting malicious code into their memory. The base station wants to verify the code memory contents of the nodes, and either repair the nodes by undoing any changes made by the attacker or blacklist the nodes which cannot be repaired.

Figure 26:
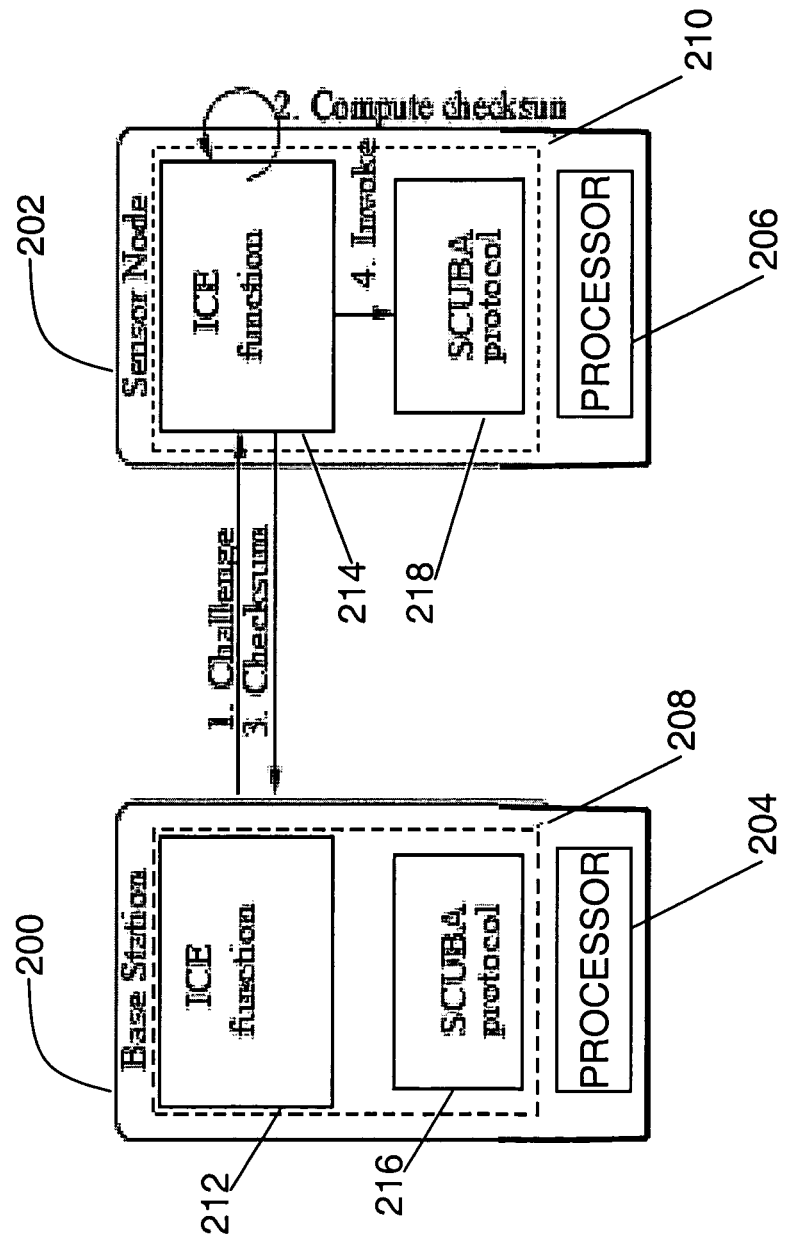
FIG. 26 illustrates an overview of one embodiment of the present invention referred to as "ICE" and in which the numbers represent the temporal ordering of events.

FIG. 26 illustrates a base station 200 and a sensor node 202 according to one embodiment of the present invention. The base station 200 and sensor node 202 are presented in a manner similar to that of the dispatcher 10 and untrusted platform 12 of FIG. 1, although they may also exist in other forms, such as with multiple sensor nodes as illustrated in FIG. 14. Both the base station 200 and the sensor node 202 are illustrated as including a processor 204, 206, memory 208, 210, an ICE function 212, 214, and a SCUBA protocol 216, 218.

This embodiment of the present invention will be described in the context of the SCUBA (Secure Code Update By Attestation) protocol, which enables the base station to perform code updates to sensor nodes. The protocol assumes that the update has to be performed in the presence of malicious code that might try to interfere with the update. For example, if the base station sends a code patch, malicious code on the node may fake the installation of the patch. To make the problem tractable, we assume that the attacker's hardware devices are not present in the sensor network for the duration of the repair process. Even with this assumption, our protocol represents a significant benefit since circumventing it requires the attacker's hardware to be always present in the sensor network. This significantly increases the attacker's exposure compared to the situation today where the attacker need only be physically present intermittently in order to compromise sensor nodes.

To the best of our knowledge, we present the first protocol for secure code updates to recover from node compromise in sensor networks. The base station, which sends the code update, obtains a firm guarantee either that the code update was correctly installed (thereby undoing all changes made by the attacker) or that the malicious code running on the sensor node is preventing the application of the code update. In the latter case, the base station can blacklist the sensor node. We assume commodity sensor nodes (i.e., no special hardware required). The SCUBA protocol can recover nodes even if an attacker compromises an arbitrary number of nodes, uploads arbitrary code into the compromised nodes, and if compromised nodes arbitrarily collude. In order to securely perform the code update, the base station needs to obtain a guarantee that no malicious code will interfere with the execution of the SCUBA protocol on the sensor node. The Pioneer primitive can be used to obtain this guarantee [Arvind Seshadri, Mark Luk, Elaine Shi, Adrian Perrig, Leendert van Doorn, and Pradeep Khosla. Pioneer: Verifying integrity and guaranteeing execution of code on legacy platforms. In Proceedings of ACM Symposium on Operating Systems Principles (SOSP), pages 1-15, October 2005.]. Pioneer, which is implemented for the x86 architecture, allows an external verifier to obtain the guarantee of untampered code execution on an untrusted computing platform. That is, the external verifier obtains an assurance that no malicious code present on the untrusted computing platform can interfere with the execution of some arbitrary executable that the verifier wants to invoke on the untrusted computing platform. We port the Pioneer primitive to the TI MSP430, the CPU used on the Telos rev.B sensor nodes [Moteiv Corp. *Tmote Sky: Low Power Wireless Sensor Module*, June 2006.]. We call our primitive for the MSP430 CPU ICE (Indisputable Code Execution) since it enables the base station (the external verifier) to obtain an indisputable guarantee that the SCUBA protocol executable on the sensor node (the untrusted computing platform) will execute untampered.

The base station commands the sensor node to invoke the ICE verification function, which sets up an execution environment for untampered execution of the SCUBA protocol executable. The ICE verification function is constructed so that any attempt by the attacker to fake the creation of the correct execution environment will be detected by the base station. When the base station does not detect any such attempt, it is assured that the SCUBA protocol code will execute on the node without interference from malicious code.

The base station then sends a code update to the SCUBA protocol on the node, which installs the code update thereby removing the changes made by the attacker.

Outline

In Section 3.2, we describe the problem definition, the sensor network architecture, and assumptions, and the attacker model. Section 3.3 discusses prior research in the areas of untampered code execution and software-based attestation. Section 3.4 describes the ICE primitive. In Section 3.5, we describe the SCUBA protocol. Section 3.6 discusses related work, and Section 3.7 concludes.

3.2. Problem Definition, Attacker Model, and Assumptions

In this section, we first define our problem in the context of sensor networks. We then discuss our attacker model. Finally, we state our assumptions about the sensor network, the base station and the sensor nodes.

3.2.1 Problem Definition

We consider the setting of a sensor network where an attacker has compromised sensor nodes by injecting malicious code into their memory. The base station wants to verify the code memory contents of the nodes, and either repair the nodes by undoing any changes made by the attacker or blacklist the nodes which cannot be repaired. The repair needs to be done in the presence of malicious code that may interfere with the repair.

3.2.2 Attacker Model

In this embodiment, we study an attacker who compromises sensor nodes by injection of malicious code. Malicious nodes controlled by the attacker can collude. We assume that the attacker's hardware devices are not present in the sensor network for the duration of the repair process. While this is a strong assumption, the SCUBA protocol represents a significant advance since circumventing it requires the attacker's hardware to be always present in the sensor network. This significantly increases the attacker's exposure compared to the situation today where the attacker need only be physically present intermittently in order to compromise sensor nodes. In our future work, we will consider an attacker who is present at the sensor network, allowing it to introduce its own malicious and computationally powerful devices.

3.2.3 Sensor Network Architecture

We consider a wireless sensor network consisting of one or multiple base stations and several sensor nodes. All sensor nodes have have the same make and model of CPU and identical memories. The sensor nodes communicate among themselves and the base station using a wireless network. Every sensor node and the base station has a unique identifier, hereafter referred to as node ID or base station ID. The communication between the base station and sensor nodes can be single-hop or multi-hop.

The base station is the gateway between the sensor network and the outside world. Sensor nodes can send and receive packets to hosts on external networks only through the base station.

3.2.4 Assumptions

The base station knows the make and model of the CPU on the sensor nodes. To authenticate messages between sensor nodes and the base station, we assume, for simplicity, that a public-key infrastructure is set up, where each sensor node knows the authentic public key of the base station (we assume that the base station is the Certification Authority (CA) of the network). Malan et al. have recently shown that public-key cryptography takes on the order of tens of seconds on current sensor nodes [D. Malan, M. Welsh, and M. Smith. A public-key infrastructure for key distribution in TinyOS based on elliptic curve cryptography. In *Proceedings of IEEE Conference on Sensor and Ad hoc Communications and Networks (SECON)*, October 2004.], which is justifiable for a small number of operations. We could also assume pairwise shared keys between the base station and sensor nodes, and use the SPINS infrastructure to set up additional keys [A. Perrig, R. Szewczyk, V. Wen, D. Culler, and J. D. Tygar. SPINS: Security protocols for sensor networks. In *Proceedings of Conference on Mobile Computing and Networks (MobiCom)*, July 2001.]. We assume that the base station is not compromised by the attacker. This assumption is commonly made in secure sensor networks, since compromise of the base station implies compromise of the entire network.

We assume that the base station and sensor nodes share a cryptographic key. However, when the attacker compromises a node, it could learn the node's key. Therefore, as part of undoing the changes made by the attacker, the base station also needs to establish a new key with the node. The issue is one of key establishment: how can we establish a key between the base station and a node without relying the pre-existence of shared secrets between them? The untampered code execution mechanism provided by ICE can be used to perform this task.

We also assume that each sensor node has a few bytes of Read-Only Memory (ROM). The ROM stores the node ID of the sensor node and base station's public key. By keeping a sensor node's node ID in the ROM, the attacker cannot modify the memory region containing the node ID even after it compromises the sensor node. The ICE verification function uses the sensor node's node ID as part of the input used to generate the checksum. By doing so, we leverage ICE to prevent impersonation attacks where an attacker changes the node ID of a node to impersonate another node, for example as in the Sybil attack [J. Douceur. The Sybil attack. In *Proceedings of Workshop on Peer-to-Peer Systems (IPTPS)*, March 2002.]. We discuss our defense in detail in Section 3.4.3. The base station's public key is used by the sensor nodes to authenticate packets from the base station. Storing the base station's public key in ROM prevents an attacker from changing that key in compromised nodes.

The sensor network is assumed to provide a reliable transport layer protocol like PSFQ [C. Y. Wan, A. T. Campbell, and L. Krishnamurthy. reliable transport protocol for wireless sensor networks. *Proceedings of ACM Workshop on Wireless Sensor and Applications (WSNA)*, September 2002.]. The SCUBA protocol requires that protocol messages be reliably delivered between participants.

3.3. Background

In this section, we discuss prior research in the areas of software-based untampered code execution, and software-based attestation. We focus on software-based techniques because sensor nodes are unlikely to have hardware extensions for attestation or untampered code execution due to cost, size, and power concerns.

Pioneer is the first software-based technique that provides the guarantee of untampered code execution, the property that we need to perform secure code updates on compromised sensor nodes [Arvind Seshadri, Mark Luk, Elaine Shi, Adrian Perrig, Leendert van Doorn, and Pradeep Khosla. Pioneer: Verifying integrity and guaranteeing execution of code on legacy platforms. In *Proceedings of ACM Symposium on Operating Systems Principles (SOSP)*, pages 1-15, October 2005.]. However, Pioneer relies on hardware-dependent techniques specific to the Pentium platform, and thus cannot be used on the CPU of sensor nodes. ICE is the only software-based primitive that we are aware of which achieves untampered code execution on simple CPU architectures.

An area that is closely related to untampered code execution is that of software-based attestation. Attestation enables a verifier to check the integrity of software present on a computing platform. However, attestation by itself cannot guarantee untampered code execution since the attacker can modify the code between the time the code is verified and the time the code is invoked for execution. This is referred to as a time-of-check-to-time-of-use (TOCTTOU) attack. Hence, none of the techniques we discuss below can be used to address the problem of secure code updates on compromised sensor nodes.

Spinellis proposed using self-verifying code as a means to verify software integrity [D. Spinellis. Reflection as a mechanism for software integrity verification. *ACM Transactions on Information and System Security*, 3(1):51-62, February 2000.]. The work uses the setting of an external verifier that wants to verify the integrity of some piece of code on a device. The external verifier asks the device the split the memory region being verified into two overlapping regions. The start and end addresses of these two regions differ from one verification request to another. The device generates a hash of each region separately and returns the hashes to the verifier. Since the memory regions that are hashed vary from verification to verification, the attacker cannot pre-compute or replay the hash values. The external verifier has a copy of the code being verified and can hence check the correctness of the hashes returned by the device. Spinellis also proposes using CPU state such as the behavior of caches or performance counters as inputs to the checksum to detect attempts by the attacker to modify the hash computation in order to forge the correct hash values.

Kennell and Jamieson propose a system, Genuinity, that uses ideas similar to those of Spinellis in the context of the x86 architecture [R. Kennell and L. Jamieson. Establishing the genuinity of remote computer systems. In *Proceedings of USENIX Security Symposium*, August 2003.]. The main difference between the two works is that Genuinity adds the use of time as a side channel to detect cheating by the attacker.

SWATT is a software-based memory attestation technique that allows an external verifier to perform an equality check on the memory contents of an embedded device [A. Seshadri, A. Perrig, L. van Doorn, and P. Khosla. SWATT: Software-based attestation for embedded devices. In *Proceedings of the IEEE Symposium on Security and Privacy*, May 2004.]. SWATT is targeted towards simple CPUs and uses the idea to pseudorandom memory traversal and uses time as a side channel to detect attempts by the attacker to manipulate the verification process. The setting of ICE is similar to that of SWATT [A. Seshadri, A. Perrig, L. van Doorn, and P. Khosla. SWATT: Software-based attestation for embedded devices. In *Proceedings of the IEEE Symposium on Security and Privacy*, May 2004.]. However, as we mentioned earlier, SWATT can only provide a guarantee of memory content integrity, unlike ICE which provides the stronger guarantee of untampered code execution. Also, unlike ICE, SWATT needs to check the entire memory contents of the device. Checking the entire memory contents of a device might be impractical since part of the device's memory might have contents that are unknown to the verifier (e.g., dynamic data or cryptographic secrets). The ability to check memory sizes smaller than the entire memory of the device also reduces the energy consumed by ICE to perform the verification of memory when compared to SWATT.

PIV is a technique to perform program integrity checks on sensor nodes [T. Park and K. Shin. Soft tamper-proofing via program integrity verification in wireless sensor networks. *IEEE Transactions on Mobile Computing*, 4(3), May/June 2005.]. The primary idea is that the verifier creates a new randomized hash function for each verification request and sends the hash function to the sensor node along with the verification request. However, PIV does not time the hash computation on the sensor node, and could be vulnerable to dynamic attacks where the attacker manipulates the execution of the hash function on the sensor node to generate the correct checksum despite having made modifications to the program running on the sensor node.

Shaneck et al. propose a technique for remote attestation of sensor nodes [M. Shaneck, K. Mahadevan, V. Kher, and Y. Kim. Remote software-based attestation for wireless sensors. In *ESAS*, pages 27-41, 2005.]. The verifier constructs a new attestation procedure for each verification request and sends the code to the sensor node being verified. The attestation procedure uses various code obfuscation techniques to make it hard for the attacker to perform static or dynamic analysis of the attestation procedure within the time alloted to the sensor node by the base station for computing the attestation response. However, the paper does not have any results to substantiate this claim. Further, the authors state that the base station should set the expected time for getting a response from a sensor node to the sum of the network round trip time, the time taken to compute the attestation procedure on the sensor node, and the expected delay in response due to factors like network delay. As long as the base station can determine an upper bound on the expected delay due to random factors like network jitter, SWATT can be used in the setting of the paper to perform attestation of sensor nodes. Also, unlike ICE, the authors do not consider impersonation attacks and they assume that the sensor network is a one-hop network.

3.4. ICE: Indisputable Code Execution

In this section, we first give an overview the ICE primitive and show how we use self-checksumming code to build the ICE verification function in this embodiment. We then discuss various attacks against the ICE verification function and show how we design the defences against them. Finally, we describe our implementation of the ICE verification function on the Telos rev.B motes.

3.4.1 Indisputable Code Execution Overview

We consider the model where the base station wants to invoke some executable on the sensor node. The sensor node could have malicious code which may attempt to interfere with the execution. The base station wants to obtain the guarantee that the execution of the executable on the sensor node has not been tampered with in any manner. We refer to this guarantee as untampered code execution.

The following three step process is one way to achieve untampered code execution. 1) Check the integrity of the executable. This ensures that the executable has not been modified before it is invoked for execution. 2) Set up an execution environment in which the execution of the executable is guaranteed to be atomic. That is, once it starts executing, no other code on the sensor node is allowed to execute until the executable exits. We refer to such an execution environment as an untampered execution environment. 3) Invoke the executable to execute in the untampered execution environment. It is important that the three steps outlined above be executed atomically. Otherwise, the attacker can carry out a timeof-check-to-time-of-use (TOCTTOU) attack. In this attack, the attacker modifies the executable after the integrity check but before the executable is invoked for execution.

We construct a challenge-response protocol, called ICE (Indisputable Code Execution) between the base station and sensor node to enable the base station to obtain the guarantee of untampered code execution. The sensor node has a function called the ICE verification function which carries out the three step process described in the previous paragraph to ensure that the execution of an arbitrary executable on the sensor node will not be tampered by any malicious code that exists on the sensor node. However, since the ICE verification function is also a piece of software, malicious code could tamper with the execution of the ICE verification function. How do we ensure that the ICE verification function itself executes untampered?

The ICE verification function is a self-checksumming code. We define self-checksumming code as a sequence of instructions that compute a checksum over themselves in a way that the checksum would be wrong or the computation would be slower if the sequence of instructions were modified. This provides us with a means to verify the integrity of the ICE verification function executable. However, malicious code may attempt to tamper with the execution of the ICE verification function, even when the executable image of the ICE verification function is correct. To prevent this attack, the ICE verification function sets up an untampered execution environment for its execution before it starts to compute the checksum. This consists of setting up CPU state to ensure atomic execution of the ICE verification function. An example of setting CPU state to ensure atomic execution is disabling interrupts. The ICE verification function takes the CPU state used to set up the untampered execution environment as input to generate the checksum. The ICE verification function is constructed so that if any part of the relevant CPU state is incorrect then either the checksum will be incorrect or the checksum computation would be slower. Thereby, a correct checksum that is generated within the expected amount of time guarantees that the ICE verification function will execute untampered.

FIG. 26 shows an overview of ICE. The base station sends a "check integrity and execute" request to the sensor node. The ICE verification function on the sensor node computes a checksum as a function of the memory region containing its own instruction sequence, the instruction sequence of the executable, and the CPU state that needs to be set up to create an untampered execution environment. The ICE verification function returns the checksum to the base station and invokes the executable. Since the executable is directly invoked by the ICE verification function, the executable "inherits" the untampered execution environment of the ICE verification function and hence executes untampered by malicious code. The base station has a copy of the ICE verification function code and the executable. It also knows the correct value of the CPU state necessary to create the untampered execution environment on the sensor node. Hence, the base station can verify if the checksum re-turned by the sensor node is correct. Since the base station knows the CPU make and model on the sensor node, it knows the expected time to compute the checksum on the sensor node. If the base station receives the correct checksum from the sensor node within the expected time, the base station obtains the guarantee of untampered execution of the executable on the sensor node.

3.4.2 Attacks Against Self Checksumming Code

In order to fake the untampered execution of the executable, the attacker has to fake the correct checksum within the expected time even though it modifies either the memory region containing the executable and the ICE verification function, or sets up the CPU state corresponding to the untampered execution environment incorrectly. Such attacks can be classified into three types. In the first type of attack, an attacker attempts to forge the checksum locally on the sensor node. In the second type of attacks, the adversary attempts to speed up the checksum computation, either locally or by use helper devices. Finally, in the third type, malicious nodes in a sensor network may attempt to use impersonation attacks. For example, a malicious node may attempt to have an unmodified sensor node compute the response to the base station's challenge by forwarding the base station's challenge to the unmodified node. Having given an overview of ICE in Section 3.4.1, we now describe how we design our defenses against these attacks.

3.4.2.1 Checksum Forgery Attacks

The attacker needs to forge the value despite modifying the memory contents being checksummed or having an incorrect CPU state corresponding to the untampered execution environment. The different attacks in this category are as follows:

Pre-Computation and Replay Attacks.

An attacker may attempt to compute the checksum over the memory region containing the ICE verification function and the target executable, before making changes to the memory region. Later, when the verifier asks the device to compute and return the checksum, the device returns the pre-computed value. To prevent this attack, the verifier sends the device a random challenge with every verification request. The checksum computed by the device is a function of this challenge. The challenge sent by the verifier is sufficiently long to prevent dictionary attacks when the attacker stores previously observed challenge-checksum pairs.

Data Substitution Attacks.

An attacker may attempt to change some locations of the memory region containing the ICE verification function and the executable and keep the original values at a different location in memory. When the ICE verification function tries to read from the memory locations the attacker changed, the attacker diverts the read to the locations in memory where it stored the original values. This attack can be detected by having the ICE verification function access memory in pseudorandom pattern. Thereby the attacker cannot predict in advance which memory accesses by the ICE verification function will read the memory locations modified by the attacker. The attacker is then forced to check every memory access by the ICE verification function. The extra checks slow down the attacker's checksum computation. This approach is similar to the one in our earlier work on SWATT [A. Seshadri, A. Perrig, L. van Doom, and P. Khosla. SWATT: Software-based attestation for embedded devices. In *Proceedings of the IEEE Symposium on Security and Privacy*, May 2004.].

We use the result of the Coupon Collector's Problem to guarantee that the checksum code will read every memory location of the ICE verification function and the executable with high probability, despite the pseudo-random memory access pattern. If the size of the ICE verification function and the executable is n words, the result of the Coupon Collector's Problem states: if X is the number of memory reads required to read each of the n words at least once, then $Pr[X>cn \ln n] \square n-c+1$. Thus, after $O(n \ln n)$ memory reads, each memory location is accessed at least once with high probability.

Memory Copy Attacks.

Figure 27:
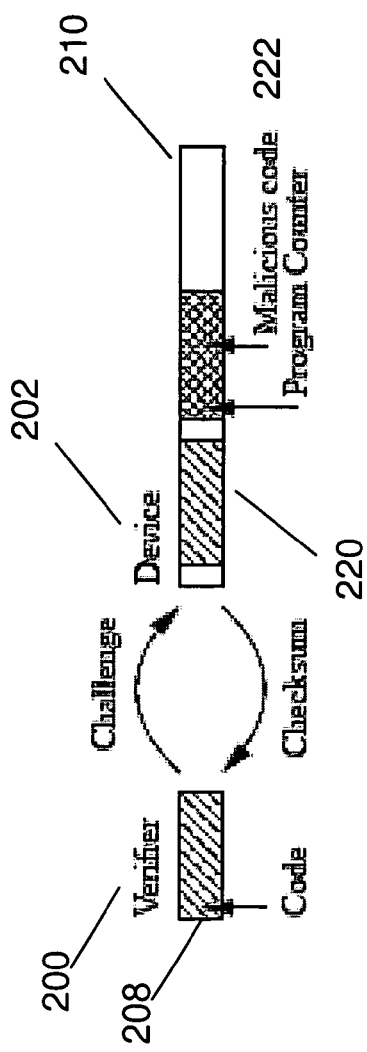
FIG. 27 illustrates one example of an attack in which the correct code resides at a different memory location, and the attacker executes malicious code at the correct memory location, computing the memory checksum over the correct code.
Figure 28:
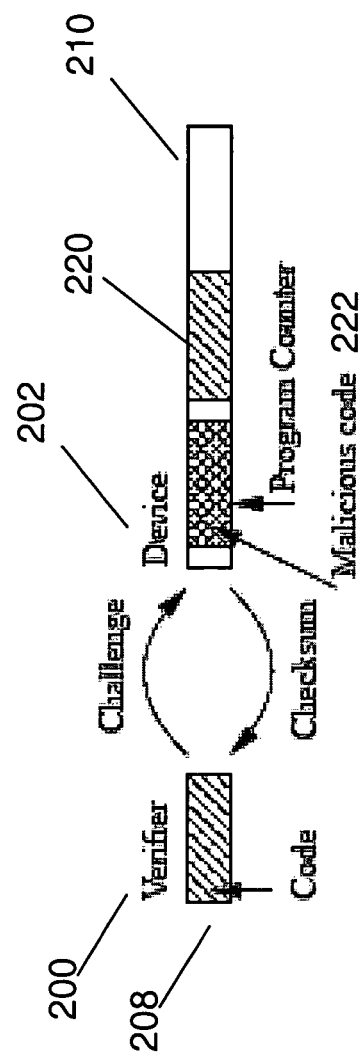
FIG. 28 illustrates one example of an attack in which the correct code resides at the correct memory location, but the attacker executes malicious code at a different memory location, computing the memory checksum over the correct code.

Since we only want to verify a small part of the memory of the device, we are faced with two copy attacks: either the correct code is copied to another location in memory and malicious code is executing at the location of the correct code, or the correct code resides at the correct memory location and the malicious code is executing at another location of memory. FIGS. 27 and 28 illustrate examples of both types of attacks. FIG. 27 illustrates an attack in which the attacker move the correct code 220 to a different location in memory 210 on the untrusted machine 202 and the attacker executes malicious code 222 at the location of memory where the correct code 220 should reside. The malicious code 222 then causes the untrusted computer 202 to perform the memory checksum over the correct code 220. FIG. 28 illustrates another example of an attack. In that example, the attacker leaves the correct code 220 at the correct memory location, but the attacker executes malicious code 222 at a different memory location. The memory checksum is performed over the correct code 220.

It is clear that we need to prevent both attacks to have self-checksumming code. To prevent the first attack, we need to ensure that the contents that we compute the checksum over are fetched from the correct address locations in memory. To prevent the second attack, we need to ensure that the program counter is pointing to the correct memory addresses. A third attack is that both the correct code and the malicious code are at different memory locations. It is clear that either of the countermeasures that prevent the first or second copy attack also prevent the third attack.

To detect the two memory copy attacks, we use the program counter and the data pointer as part of the data used to compute the checksum. Either of the copy attacks requires the attacker to incorporate additional instructions into the ICE verification function to simulate the correct values for the PC and the data pointer. These additional instructions will slow down checksum computation.

Forging CPU State Inputs.

We mentioned earlier that setting up the untampered execution environment is equivalent to ensuring atomic execution of the executable. ICE guarantees atomic execution by setting up the corresponding CPU state and incorporating them into the checksum. An attacker may attempt to forge the creation of the untampered execution environment by incorrectly setting up the CPU state and then forging the correct CPU state during checksum computation. We now describe this potential attack in detail and argue why such an attack would fail.

The CPU state required for atomic execution varies depending on the CPU architecture. In the following discussion, we will focus on architecturally simple CPUs that are commonly employed on sensor nodes. Such processors lack advanced architectural features such as support for virtual memory, memory protections, or caches. On such CPUs, atomicity of execution can be achieved by disabling interrupts during execution. Since the CPUs under consideration do not support exceptions, disabling interrupts ensures that no other code can execute.

Interrupts are of two kinds: maskable and non-maskable. Setting the interrupt-disable bit to the appropriate state disables maskable interrupts. Non-maskable interrupts, however, cannot be disabled. Therefore, in the presence of non-maskable interrupts, we cannot guarantee execution atomicity of the executable. Instead we relax our requirement of atomicity to state that only code that has been verified by the ICE verification function be allowed to execute during the execution of the executable. With this relaxed requirement, we include a default handler for non-maskable interrupts in the ICE verification function. This is a dummy handler that simply executes an interrupt-return instruction to return control to whatever code was executing when the non-maskable interrupt occurred. The ICE verification function modifies the CPU's interrupt vector table so that the interrupt vectors for all the nonmaskable interrupts point to the dummy interrupt handler within the ICE verification function. With this change, any non-maskable interrupt that occurs during the execution of the executable will cause control to be unconditionally returned to ICE.

By including the interrupt-disable bit and the CPU's interrupt vector table in the checksum, we ensure that the checksum is correct only if these inputs are correct. If the attacker sets up (one of) these CPU states incorrectly, the attacker will have to forge the correct value during checksum computation thereby leading to a time overhead.

3.4.2.2 Attacks to Speed Up Checksum Computation

The attacker may attempt to speed up checksum computation in two ways: use a helper device or do it on the sensor node. The first attack mentioned below attempts to speed the checksum computation on the sensor node. The second and the third attack try to use helper devices.

Optimized Implementation Attack.

The attacker may decrease the execution time of the ICE verification function by optimizing the code, which allows the attacker to use the time gained to forge the checksum, without being detected. Similar to previous research in this area [R. Kennell and L. Jamieson. Establishing the genuinity of remote computer systems. In *Proceedings of USENIX Security Symposium*, August 2003. A. Seshadri, A. Perrig, L. van Doorn, and P. Khosla. SWATT: Software-based attestation for embedded devices. In *Proceedings of the IEEE Symposium on Security and Privacy*, May 2004.], we need to show that the code cannot be further optimized. We can use automated tools to either exhaustively find the most efficient implementation [Free Software Foundation. superopt—finds the shortest instruction sequence for a given function. http://www.gnu.org/directory/devel/compilers/superopt.html.], or to use theorem proving techniques to show that a given code fragment is optimal [R. Joshi, G. Nelson, and K. Randall. Denali: a goal-directed superoptimizer. In *Proceedings of ACM Conference on Programming Language Design and Implementation (PLDI)*, pages 304-314, 2002.]. In any case, our goal is to keep the code exceedingly simple to facilitate manual inspection and the use of these tools.

Multiple Colluding Devices Attack.

Another way to speed up execution is by leveraging multiple devices to compute the checksum in parallel. Multiple devices may attempt to collude to compute different ranges in the ICE verification function loop and combine their results to get the final checksum. To prevent this attack, we make the verification function non-parallelizable to force sequential execution.

Proxy Attack.

A malicious sensor node may attempt to forward the ICE challenge to a proxy node with greater computing resources. The proxy node has a copy of the correct memory contents of the sensor node. Having greater computing resources, the proxy node can compute the ICE checksum faster than the sensor node. The time saved by a faster computation of the ICE checksum can be used for communicating the ICE challenge from the sensor node to the proxy and communicating the ICE checksum from the proxy to the sensor node. This way the malicious sensor node can forge the ICE checksum and the forgery will go undetected by the base station. We call this attack the proxy attack. We assume in this paper that all sensor nodes in the network have identical computing resources and the attacker is not physically present during verification. Hence, the proxy will have to be a node outside the network (e.g., a PC on the Internet). Any packets sent by the sensor nodes to devices outside the network will have to pass through the base station since the sensor nodes only have short-range wireless links.

The base station prevents proxy attacks by blocking all network packets from outside the sensor network during the process of verification. Hence, any sensor node that tries to use an external proxy will be unable to receive the computed checksum from the proxy.

3.4.2.3 Impersonation Attacks

A malicious sensor node may attempt to have a legitimate sensor node impersonate it in the ICE protocol by forwarding protocol messages from the base station to the legitimate sensor node. Also, a malicious sensor node may attempt to assume multiple identities (Sybil attack).

To prevent such attacks, the base station needs an assurance that the ICE response it receives comes from the sensor node the base station is trying to verify. We achieve this property through a few bytes of Read-only Memory (ROM) on every node. The ROM stores the node ID of the node. The node ID is unique to each node and since it is in a ROM the attacker cannot modify it, even when the attacker compromises the node. The ICE verification function uses the ROM-based node ID as an input to the checksum computation. By doing so, the attacker is forced to forge the node ID if it wants to do an impersonation attack. To perform this forgery, the attacker has to use a data substitution attack to insert a conditional check. This check would divert the read to the ROM to other memory location where the attacker has stored the node ID of the node the attacker is trying to impersonate. Thereby, the attacker's checksum computation is slowed down. Hence, the base station can detect impersonation attacks through the slowdown in checksum computation.

3.4.3 Design of the ICE Verification Function

We now discuss how we design the ICE verification function to implement the defenses we mentioned in the previous section.

Keyed Checksum.

The checksum computed by the device should be a function of the challenge sent by the verifier to prevent precomputation and replay attacks. We could use a cryptographic message authentication code (MAC), like HMAC [M. Bellare, R. Canetti, and H. Krawczyk. Keying hash functions for message authentication. In *Advances in Cryptology—Crypto*, pages 1-15, 1996.] to generate the checksum. However, MAC functions have much stronger properties than we require. MACs are designed to resist a MAC forgery attack. In this attack, an attacker observes the MAC values for a number of different inputs, all of which are computed using the same MAC key. The attacker then tries to generate a MAC for an unknown input, under the same key, using the input-MAC pairs it has observed. In our setting, the verifier sends a random challenge to the device along with each verification request. The device uses the random challenge as the key to generate the memory fingerprint. Since the key changes every time, the MAC forgery attack is not relevant in our setting.

We use a simple checksum function to generate a fingerprint of memory. The checksum function uses the random challenge sent by the verifier to seed a pseudorandom number generator (PRG) and to initialize the checksum variable. The output of the PRG is incorporated into the checksum during each iteration of the checksum function. Hence, the input used to compute the checksum changes with each verification request and so the final checksum returned by the device will be a function of the verifier's challenge.

Pseudo-Random Number Generator.

We use a 16-bit T-function as the PRG [A. Klimov and A. Shamir. New cryptographic primitives based on multiword t-functions. In *Fast Software Encryption*, February 2004.]. A T-function is a bijection from n-bit words to n-bit words. Certain T-functions also have the property that their single cycle length is equal to $2^n$, where n is the size of the input to the T-function in bits. The particular T-function we use in the ICE verification function, $x \leftarrow \tilde{x}+(x^2 \vee 5)$ where v is the bitwise or operator, has this property.

In practice, we should use a family of T-functions because a Tfunction starts repeating itself after it has generated all elements in its range. Another option for a PRG would be the RC4 stream cipher. However, T-functions are very efficient, and their code can be easily shown to be optimal.

Preventing Memory Copy Attacks.

FIG. 27 and FIG. 28 illustrates the two memory copy attacks. In the first one, the attacker executes malicious code at the correct memory location, while computing the checksum over the correct code residing elsewhere. This could be implemented either by faking the data pointer used to read memory, or displacing all memory reads by an offset. In the second attack, the correct code resides at the correct memory location, but the attacker executes malicious code elsewhere. This would require the attacker to forge the value of the program counter when used as an input to the checksum. By incorporating the program counter and data pointer into the checksum, such potential attacks would result in extra computation, which would slow down checksum computation.

Strongly-Ordered Checksum Function.

The ICE verification function uses an alternate sequence of additions and XOR operations to compute the checksum. This sequence of operations has the property that the final value of checksum will be different with high probability if the sequence of operations is altered in any way. A strongly-ordered checksum function prevents the attacker from computing the checksum out-of-order or in parallel. It also prevents the attacker from removing operations from the checksum function or replacing them with other operations in an attempt to speed up checksum computation.

Non-Parallelizable.

In order to make the checksum function nonparallelizable, we use the two preceding checksum values to compute the current checksum value. Also, the PRG generates its current output based on its last output.

3.4.4 Implementing ICE

This section describes our implementation of the ICE verification function on the TI MSP430 micro-controller that is used on the Telos rev.B motes.

Overview of the TIMSP430.

The MSP430 is a 16-bit RISC CPU that uses the von-Neumann architecture. It has 48 KB of Flash memory, 10 KB of RAM, and uses a 8 MHz clock. There are 16 16-bit general purpose registers, r0 through r15. Of these r0 is the PC, r1 is the stack pointer, r2 is the status (flags) register, and r3 is the constant generator. This leaves 12 registers available for general purpose use by programs. The CPU also has a hardware multiplier. The presence of the multiplier considerably speeds up the computation of the T-function. However, the presence of a hardware multiplier is not absolutely necessary for the ICE verification function. In the absence of a hardware multiplier, the multiply operation in the T-function can be simulated or the T-function can be replaced by RC4, which does not require any multiply operations. The interrupt-disable bit on the MSP430 is part of the status register, r2. Also, the interrupt vector table resides in the top 32 bytes of memory.

Pseudocode.

FIG. 29 shows the pseudocode of the ICE verification function. The ICE verification function iteratively computes a 160-bit checksum. The pseudocode is presented in a non-optimized form to improve readability. It takes in a parameter y which is the number of iterations the ICE verification function should perform when computing the checksum.

The ICE verification function uses r13 to hold the loop counter, which is initialized to y, r14 to hold the data pointer used to read memory, and r15 to hold the current value of the T-function output. This leaves 10 registers available, including the stack pointer. The ICE verification function can use the stack pointer as a general purpose register since it does not use the stack. To ensure that the attacker does not have any free registers available the ICE verification function uses all 10 registers to hold the checksum, resulting in a 160-bit checksum value.

To efficiently compute the checksum that is held in 10 general purpose registers, we unroll the ICE verification function loop 10 times. Each unrolled code block updates one of the registers holding the checksum. After unrolling the loop, an obvious optimization is to decrement the loop counter by 10 at the very end of the unrolled loop instead of performing it in every code block.

Each code block includes the memory word read, the PC, the data pointer, the output of T-function, the loop counter, and the two previously computed checksum values in the checksum. The code blocks also include the status register in the checksum to check the status of the interrupt-disable flag. The memory region containing the interrupt vector table is also used as an input to compute the checksum. Pseudo-random memory traversal is implemented by xoring the current value of the T-function with the data pointer and appropriately masking the result to ensure that the data pointer falls within the memory region of interest.

The challenge sent by the verifier is 128 bits long. This challenge is used to initialize 8 of the 10 16-bit registers that hold the checksum. The ninth and the tenth register are initialized to a value computed by xoring the first four and last four 16-bit words of the 128-bit challenge. The 16-bit seed for the T-function is generated by xoring together the eight 16-bit words that make up the 128-bit challenge.

The code illustrated in FIG. 29 is similar to that illustrated in FIG. 18 with regard to the second embodiment. Many variations of code may be used with the present inventions, and the particular code shown and described herein is not required to realize the benefits of the present invention.

Assembly Code.

FIG. 30 shows one code block of the unrolled loop of the ICE verification function written in the assembly language of MSP430. The code is manually optimized to ensure that the attacker cannot find a more optimized implementation. The code block consists of 17 assembly instructions and takes 32 CPU cycles. Incorporating the PC into the checksum is made simple by the fact that the PC can be treated as a general purpose register. This property holds for most RISC CPUs.

The code illustrated in FIG. 30 is similar to that illustrated in FIG. 19 with regard to the second embodiment. Many variations of code may be used with the present inventions, and the particular code shown and described herein is not required to realize the benefits of the present invention.

3.4.5 Results

In this section, we show the attacker's overhead for the attacks described in Section 3.4.2. The design of the checksum function only allows the attacker to use the data substitution attack or the memory copy attacks to forge the checksum. If the attacker uses any of the other attacks, the final checksum will be wrong. We developed the fastest implementation of both attacks and timed their execution.

Since the ICE verification function uses all 16 CPU registers, the attacker does not have any more free registers. Therefore, the attacker can only use immediate or memory operands in its code. With this constraint, the two fastest implementations of the memory copy attack are as follows. In the first method, the attacker replaces all accesses to the PC with immediates. This allows the attacker to keep an unmodified code image at the expected location while executing a modified ICE function elsewhere. This modified ICE function would forge the PC by using an immediate instead of the actual PC. In the second method, the attacker displaces all memory reads by a fixed constant. This allows the attacker to execute a modified ICE function at the expected location, while redirecting all memory reads to an unmodified code image placed at a constant offset.

Both memory copy attacks incur a one-cycle overhead per code block. On the MSP430 architecture, a register-to-register operation takes one cycle, while an immediate-to-register operation takes two cycles. Thus, in the first attack, the attacker incurs a one-cycle overhead every time it forges the PC value with an immediate. Another feature of the MSP430 architecture is that memory reads with displacement addressing require three cycles, while direct memory reads require two cycles. By replacing direct memory access with displaced reads, the second memory copy attack also incurs a one cycle penalty per code block. Since each code block consists of 32 CPU cycles, a memory copy attack would have an overhead of 1/32, of 3.1%. We implemented this attack and timed the execution, both on the node (local timing), and by the base station (one hop RTT). In the data substitution attack, the attacker needs to check every memory read by inserting an if statement. This translates into a compare instruction and a jump instruction. The compare instruction uses an immediate or memory operand and hence requires at least 2 cycles to execute. The jump instruction also takes 2 cycles to execute. Thus, this attack suffers an overhead of 4/32, or 12.5%.

Selecting Number of Loop Iterations.

The base station and the node communicate over a network link. The attacker may attempt to reduce the latency of network communication to gain time to forge the checksum. The theoretically best attacker has zero network latency. Therefore, if we estimate a worst-case bound on the network latency, then we can always detect the existence of an attacker if its time overhead to forge the checksum is greater than the worst-case network latency.

Estimating the worst-case network latency in a multi-hop sensor network is not easy. In Section 3.5.2 we develop a technique that allows the checksum computation time of a node to be always observed by a node that is one-hop away. Therefore, we only need to estimate the worst-case one-hop network latency. However, even the one-hop latency is not deterministic in a wireless environment where multiple nodes contend for the radio channel. To make the one hop network latency deterministic, the node computing the ICE checksum is given exclusive access to the radio channel. Now, the worst-case one hop network latency can be predetermined.

The attacker's overhead to forge the checksum is directly proportional to the number of iterations of ICE verification function. So, in our experiments we choose the number of iterations so that the attacker's overhead for its fastest attack is still higher than the worst-case one-hop network latency of the sensor network. The time allowed to compute the checksum is set to be the expected computation time plus the worst-case one-hop network latency. If the perceived execution time by the verifier is higher than the threshold, the device executing the ICE verification function is assumed to be compromised. A false negative is the case of a device verifying correctly even though it is compromised, while a false positive occurs when a legitimate device is classified to be malicious. In this setting, false negatives are impossible since a malicious ICE verification function would not be able to forge the checksum within the expected checksum computing time. However, if the actual latency of a legitimate packet was higher than the worst-case one-hop latency we allow for, a false positive would occur.

The Telos motes have a radio interface that communicates at 250 Kbps. The lowest overhead attack for the attacker is the memory copy attack, which has a 3% attacker overhead. The worst-case one-hop communication latency between two nodes was measured by having them continually exchange packets over a period of time and monitoring for the maximum latency experienced, which was 51 ms. Based on these data, we choose the number of iterations to be 40,000.

Experimental Setup.

Figure 31:
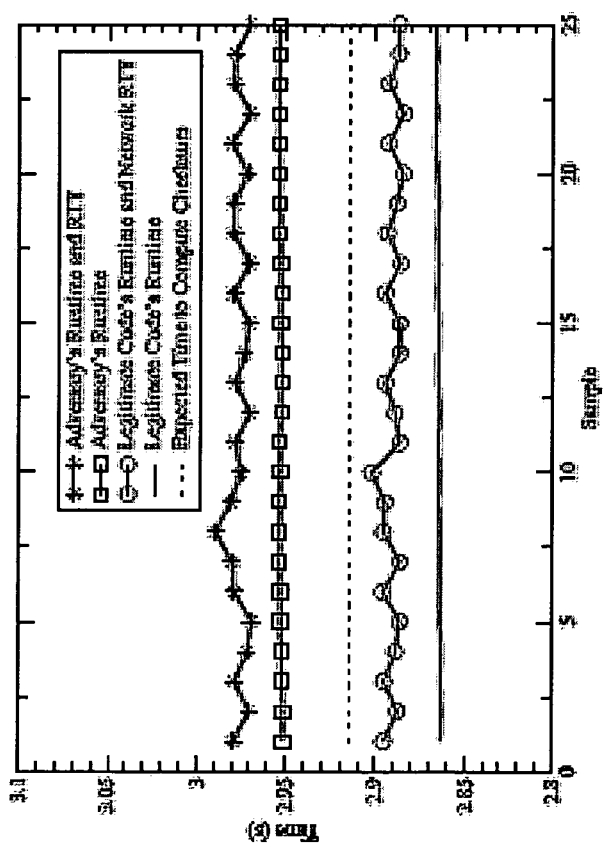
FIG. 31 illustrates results of ICE and the fastest implementation memory copy attack, running 40,000 iterations.

There are two Telos motes within direct communication range, one acting as the base station, and one acting as the sensor node running the ICE verification function. We implemented the ICE protocol between these two nodes on TinyOS. We implemented two versions of the ICE verification function: a legitimate function and a malicious function employing the memory copy attack. Execution timing measurements were taken by both nodes, and the experiment was repeated for the legitimate and the malicious verification functions. Hence, FIG. 31 reports four sets of timing measurements. Timing measurements taken by the base station is the sum of the execution time of the ICE verification function and the one-hop network RTT, while timing measurements by the node being verified only consist of the running time of the ICE verification function. The expected time to compute the checksum was set to be the execution time of the legitimate ICE verification function plus maximum one-hop network latency (51 ms). As our results show, the base station that is one hop away from the node was always be able to observe the attacker's time overhead.

3.5. Protocol for Secure Code Updates

In this section we describe how ICE can be used to construct the SCUBA protocol. We start off with a high level description of the SCUBA protocol between the base station and a sensor node separated by one network hop. Section 5.1 gives a more detailed description of the protocol. Then, we discuss how the SCUBA protocol can be extended to work with sensor nodes that are multiple hops away from the base station. Finally, we discuss how the SCUBA protocol can be used to undo modifications made by the attacker to the data on the sensor nodes.

3.5.1 SCUBA Protocol

The purpose of the SCUBA protocol is to provide a method for the base station to repair a compromised sensor node through code updates. The compromised node could contain malicious code that will interfere with the code update process. The SCUBA protocol will either blacklist the node or repair it. To repair a node, the base station sends a code update to undo any changes made to software on the node by the attacker.

FIG. 32 shows a simplified version of the SCUBA protocol. The base station invokes the ICE verification function on the sensor node by sending a challenge. The ICE verification function computes a checksum over the memory region containing itself, the SCUBA protocol executable, and the ROM containing the base station's public key and the sensor node's node ID. If the base station receives the correct checksum from the sensor node within the expected time, the base station obtains the guarantee that the SCUBA protocol executable on the sensor node will execute untampered. In this case the base station will repair the node's software via code updates. If the checksum received by the base station is incorrect, or it takes too long to arrive, the base station presumes that malicious code on the node is interfering with the code update process and blacklists the node.

After computing and returning the checksum, the ICE verification function invokes the hash function within the SCUBA protocol executable. The hash function sends the hash of the node's code memory to the base station. The base station compares the hash returned by the sensor node with the correct hash value of the code memory to determine if there have been changes to the code memory contents of the sensor node. The base station can also pinpoint exactly which locations in the memory of a sensor node have been modified by the attacker by asking the sensor node to compute hashes of different regions of its memory. Once the modified locations in the memory of a sensor node have been identified, the base station can send memory updates for exactly those memory locations that have been modified by the attacker. Thereby the amount of data sent from the base station to the sensor node will be minimized.

The base station and the sensor node need to authenticate the protocol packets they receive. The SCUBA protocol uses the Guy-Fawkes protocol to set up a two-way authenticated channel between the base station and the node [R. Anderson, F. Bergadano, B. Crispo, J. Lee, C. Manifavas, and R. Needham. A new family of authentication protocols. *ACM Operating Systems Review*, 32(4):9-20, October 1998.]. To use the Guy-Fawkes protocol, both the base station and node generate short hash chains. However, before the hash chains can be used, both the base station and the node need to authenticate the first element of each other's hash chain. The base station sends the first element of its hash chain along with the digital signature of the element generated using its private key to the node. The node uses the base station's public key in its ROM to verify the digital signature. In this way, the node can authenticate the first element of the base station's hash chain.

To enable the base station to authenticate the first element of the node's hash chain, we make use of the fact that only the node with the correct memory layout will be able to generate the ICE checksum within the expected time. Since the memory content that is checked includes the node's node ID (which is immutable) only the node being verified (one with the correct node ID) will be able to generate the checksum within the expected time. After it finishes computing the checksum, the node sends the first member of its hash chain and a MAC of this element to the base station. The MAC is computed using the ICE checksum as the key. The base station independently generates the ICE checksum and can verify the MAC sent by the sensor node. If the MAC of the hash chain member sent by the node verifies correctly at the base station and the element and the MAC are received within the expected time, the base station is guaranteed that the hash chain element came from the correct node.

The code illustrated in FIG. 32 is similar to that illustrated in FIG. 22 with regard to the second embodiment. Many variations of code may be used with the present inventions, the particular code shown and described herein is not required to realize the benefits of the present invention.

FIG. 33 presents the full SCUBA protocol, which shows how a two-way authenticated channel is established between the base station and the node. It shows the protocol that is used by the base station B for verifying code integrity and sending code updates to a node A. For simplicity, the base station and the sensor node are one network hop away from each other. The base station has a public/private key pair, denoted in the protocol by KB and K−1 B, respectively.

The SCUBA protocol uses the Guy-Fawkes protocol [R. Anderson, F. Bergadano, B. Crispo, J. Lee, C. Manifavas, and R. Needham. A new family of authentication protocols. *ACM Operating Systems Review*, 32(4):9-20, October 1998.] to establish a two-way authenticated communication channel between the base station B and sensor node A. The node generates its hash chain as a function of the ICE checksum. This prevents a malicious node from saving time to forge the ICE checksum by pre-computing the hash chain.

The code illustrated in FIG. 33 is similar to that illustrated in FIG. 24 with regard to the second embodiment. Many variations of code may be used with the present inventions, the particular code shown and described herein is not required to realize the benefits of the present invention.

3.5.2 Expanding Ring Method

The protocol description above deals with a sensor node that is one hop away from the base station. For a node that is multiple hops away from the base station, the time between sending an ICE challenge and getting a response can vary considerably due to variations in network latency. Since the time taken by a node to compute the ICE checksum has to be measured accurately to verify the correctness of the ICE checksum, we need a way to minimize the network latency variance for nodes that are multiple hops away.

We propose the following expanding ring method to minimize the network latency variance. The intuition behind our method is that if the checksum computation time of a node is always measured by a neighboring node, then the network latency is always that of a single hop. To achieve this condition, the base station first verifies nodes that are one network hop away from it. In this case, the base station can directly time the ICE checksum computation. The nodes that are one network hop away are then asked by the base station to measure the time taken by their neighbors to compute the checksum. In this manner, the ICE verification spreads out from the base station like an expanding ring.

To verify a node that is multiple hops away, the base station first selects a verified neighbor of the node. The base station then sends an ICE challenge to the neighbor. The challenge is encrypted using the key that the neighbor shares with the base station. Encrypting the challenge prevents a colluding malicious node along the path between the base station and a neighbor from receiving the challenge before the node being verified. The malicious node may attempt to use the time saved by receiving the challenge earlier to forge the ICE checksum. The neighbor decrypts the challenge, issues it to the node being verified, and times the checksum computation. Upon receiving the checksum, the neighbor constructs a result packet containing the checksum and the time taken to compute the checksum. The neighbor computes a MAC of the result packet computed using the key it shares with the base station. The neighbor then sends the result packet to the base station along with the MAC. The base station uses the MAC to verify that the result packet it receives is authentic. The base station then verifies the correctness of the checksum in the result packet and the time taken to compute the checksum.

There are two issues in the expanding ring method that need to be addressed. One, the key which the neighbor shares with the base station needs to changed as part of the verification of the neighbor since the attacker might have compromised the neighbor and read out its key. Two, the neighbor may get compromised after it is verified but before it is asked by the base station to verify other nodes.

The first issue is one of key establishment: how can we establish a key between the base station and a node without relying the preexistence of shared secrets between them? The untampered code execution mechanism provided by ICE can be used to perform this task. We do not give the details here since it is out of the scope of this paper. A preliminary version of our protocol for key establishment based on ICE is available [A. Seshadri, M. Luk, A. Perrig, L. van Doorn, and P. Khosla. Using FIRE and ICE for detecting and recovering compromised nodes in sensor networks. Technical Report CMU-CS-04-187, School of Computer Science, Carnegie Mellon University, December 2004.]. A forthcoming paper discusses a better version of the protocol.

To prevent the neighbor from getting compromised in the time between its verification and the time it is asked to verify other nodes, the verified nodes do not exit the SCUBA protocol executable to resume normal processing until the entire network has been verified by the base station. Due to its small code size, the SCUBA executable can be subjected to formal verification and manual audit to verify that it does not contain known software vulnerabilities in its code. Since any verified node continues to execute the SCUBA executable till it is explicitly asked to exit by the base station, the base station is assured that none of the verified nodes will get compromised till the verification process is complete. At the end of the verification process, the base station broadcasts an exit message to all nodes. Upon receiving this message, the nodes exit the SCUBA executable and resume normal processing.

3.5.3 Repairing Data

So far, we have discussed how the SCUBA protocol can be used to undo changes made by the attacker to the code in a sensor node. However, it is possible that the attacker modifies data present on the node in addition to the code. Then to repair a node fully, the base station would need to undo changes to the data as well.

The SCUBA protocol can easily be extended to address this. Data can be classified as static data and dynamic data. Static data is data that never changes. The base station knows the correct contents of the memory region on the node containing static data. Therefore, the method used to undo changes to static data is identical to the method used for code.

Dynamic data is data that is generated and modified by programs running on the node. Therefore, the base station cannot know the correct contents of memory regions on the node that contain dynamic data. Therefore, the base station asks the SCUBA protocol executable on the sensor node to reset the node after updating the node's code and static data. This way, the node starts executing from a clean state where all dynamic data is cleared to zero. The only caveat to this approach is that software on the node might use both volatile and non-volatile memory to store dynamic data. Since non-volatile memory is not cleared on reset, the SCUBA protocol executable must clear all dynamic data in non-volatile memory before resetting the node.

3.6. Related Work

In this section, we review research related to software updates in sensor networks. We already discussed research in the areas of untampered code execution and software-based attestation in Section 3.3.

In the area of sensor network software updates, extensive research had been conducted in the context of efficiency and reliability, but assumes a trustworthy environment [J. Hui and D. Culler. The dynamic behavior of a data dissemination protocol for network programming at scale. In *Proceedings of ACM Conference on Embedded Networked Sensor Systems (SenSys)*, November 2004, P. Levis, S. Madden, D. Gay, J. Polastre, R. Szewczyk, A. Woo, E. Brewer, and D. Culler. The emergence of networking abstractions and techniques in TinyOS. In *Proceedings of Symposium on Networked Systems Design and Implementation (NSDI)*, March 2004, P. Levis, N. Patel, D. Culler, and S. Shenker. Trickle: A self-regulating algorithm for code propagation and maintenance in wireless sensor networks. In *Proceedings of Symposium on Networked Systems Design and Implementation (NSDI)*, March 2004, T. Stathopoulos, J. Heidemann, and D. Estrin. A remote code update mechanism for wireless sensor networks. Technical Report CENS-TR-30, UCLA-CENS, November 2003]. Deng et al. attempted to secure code updates by using Merkle hash trees and hash chains to authenticate the code distribution [J. Deng, R. Han, and S. Mishra. Secure code distribution in dynamically programmable wireless sensor networks. In *Proceedings in International Conference on Information Processing in Sensor Networks (IPSN 2006)*, 2006]. By leveraging authenticated streams, Dutta et al. secured Deluge, the de facto TinyOS network programming system [P. Dutta, J. Hui, D. Chu, and D. Culler. Securing the deluge network programming system. In *Proceedings in International Conference on Information Processing in Sensor Networks (IPSN)*, 2006.]. However, these protocols only solve one half of the secure code update problem: how can the receiver authenticate code updates from the base station. In this paper, we solve the other half: how can the sender verify that the receiver indeed applied the code update. Combining the SCUBA with above approaches provides a complete solution for securing code updates.

3.7. Conclusion

We present SCUBA, a protocol that enables secure detection and recovery from sensor node compromise. To the best of our knowledge, this is the first protocol to deal with recovering sensor nodes after compromise. Our code update protocol can securely update the code of a sensor node, offering a strong guarantee that the node has been correctly patched, or detect when the patch failed.

Our protocol is based on ICE (Indisputable Code Execution), a primitive that can guarantee untampered execution of code even on a compromised node. ICE is a novel primitive in sensor networks, and applying it to secure code updates is just one of its many applications. The utility of ICE is only limited by the program verified as the target executable, and we envision that ICE would be a useful tool to develop other secure sensor network protocols.

There are some research issues outstanding in our current work. The assumption that attacker's hardware devices are not present in the sensor network during the repair is a strong one and we are working towards providing similar properties for a relaxed attacker model. Also, the ICE verification function needs to be subjected to further cryptanalysis.

Our implementation in off-the shelf sensor nodes shows that our techniques are practical on current sensor nodes, without requiring specialized hardware. We are excited about other applications that our techniques may enable, which we will explore in our future work.

The present invention has been described in terms of several embodiments and examples. The examples are illustrative and not limiting, and other variations and modifications of the present invention are contemplated. For example, particular examples of code are provided herein, although none of that particular code is required and many different versions and variations of code may be used to realize the benefits of the present invention. Furthermore, the present invention is described in terms of several embodiments and examples, although many variations and modifications are possible. For example, the particular number and arrangement of computers, base stations, and sensor nodes may vary from the examples presented herein. Those and other variations and modifications of the present invention are possible and contemplated, and it is intended that the foregoing specification and the following claims cover such modifications and variations.

The invention claimed is:

1. A software-based method for establishing untampered execution of a target executable in memory of an untrusted computer, comprising:
    calculating, on a trusted computer, the time for a verification function using a nonce as input to execute on said untrusted computer;
    sending said nonce from said trusted computer to the untrusted computer;
    running said verification function on the untrusted computer, said verification function using said nonce as an input, said verification function being run on memory containing at least the verification function and producing one or more results;
    sending the results to the trusted computer;
    determining, at the trusted computer, whether the results are correct;
    determining, at the trusted computer, whether the execution of said verification function on said untrusted computer has taken the calculated amount of time; and
    indicating, at the trusted computer, if the results are correct and if the verification function has taken the calculated time to execute, that the untrusted computer has an untampered execution environment;
    wherein determining whether the verification function and the target executable are unmodified from a value expected by the trusted computer includes:
    using the verification function to determine a checksum over memory that includes the verification function;
    sending the checksum value to the trusted computer;
    determining at the trusted computer whether the checksum value is correct; and
    determining at the trusted computer whether the checksum value is received within an expected elapsed time period;
    using the verification function to compute a cryptographic hash over memory that contains the target executable;
    sending the hash value to the trusted computer; and
    determining at the trusted computer whether the hash value is correct.

2. The method of claim 1, wherein the verification function produces a checksum value and further wherein:
    determining at the trusted computer whether the checksum value is correct includes determining at a first trusted computer whether the checksum value is correct; and wherein
    determining at the trusted computer whether the checksum value is received within an expected time period includes determining at a second trusted computer whether the checksum value is received within an expected time period; and further comprising sending information about the checksum value from one of the first and second trusted computers to the other of the first and second trusted computers.

3. The method of claim 1, wherein the verification function produces a checksum value and further wherein:
    determining at the trusted computer whether the checksum value is correct includes determining at a first trusted computer whether the checksum value is correct; and wherein
    determining at the trusted computer whether the checksum value is received within an expected time period includes determining at a second trusted computer whether the checksum value is received within an expected time period; and further comprising;
    sending information about the checksum value from the first and second trusted computers to a third computer.

4. The method of claim 1, wherein the verification function calculates a checksum over read only data on the untrusted computer.

5. The method of claim 4 wherein the read only data includes a security key for the trusted computer.

6. The method of claim 4, further comprising utilizing the checksum value to instantiate a long term secret between the trusted computer and the untrusted computer.

7. The method of claim 1, further comprising:
    receiving a nonce from the trusted computer; and wherein:
    using the verification function to determine a checksum includes using the verification function to determine the checksum over memory that includes the verification function as a function of the nonce; and wherein
    using the verification function to compute a cryptographic hash includes using the verification function to compute a cryptographic hash over memory that contains the target executable as a function of the nonce.

8. The method of claim 1, wherein using the verification function to determine a checksum includes arranging an instruction sequence of checksum code so that a processor executing that code in the untrusted computer does not include empty instruction issue slots in any clock cycle.

9. The method of claim 1, wherein using the verification function to determine the checksum includes:
   executing checksum code at a highest privilege level on a processor executing the checksum code on the untrusted; and
   turning off all maskable interrupts on the processor executing the checksum code on the untrusted computer.

10. The method of claim 9, wherein using the verification function to determine the checksum further includes:
   placing the checksum code completely within an LI instruction cache of the processor executing the checksum code on the untrusted computer.

11. The method of claim 10, wherein using the verification function to determine the checksum further includes sequencing instructions of the checksum code so that the processor executing that checksum code in the untrusted computer does not include empty instruction issue slots in any clock cycle.

12. The method of claim 1, wherein:
   determining whether the verification function and a target executable are unmodified from a value expected by the trusted computer includes determining a checksum over the memory that includes at least the verification function; and
   establishing the untampered execution environment is performed at a time selected from a group comprising before determining the checksum, during determining the checksum, and after determining the checksum.

13. The method of claim 1, wherein:
   determining whether the verification function and a target executable are unmodified from a value expected by the trusted computer includes determining a checksum over the memory that includes at least the verification function; and
   establishing the untampered execution environment is performed in at least two parts, wherein each part of establishing the untampered execution environment is performed at a time selected from a group comprising before determining the checksum, during determining the checksum, and after determining the checksum.

14. The method of claim 1, wherein establishing the untampered execution environment includes:
   determining a state of a processor in the untrusted computer; and
   determining a state of hardware associated with the untrusted computer.

15. The method of claim 14, wherein:
   the state of the processor to be determined is a function of the processor in the untrusted computer; and
   the state of the hardware to be determined is a function of a configuration of the hardware.

16. The method of claim 14, further comprising:
   changing the state of the processor in the untrusted computer when the state is different from a predetermined state; and
   changing the state of the hardware associated with the untrusted computer when the state is different from a predetermined state.

17. The method of claim 16, further comprising:
   checking the at least one memory location which establishes an execution state for the processor in the untrusted computer;
   changing the at least one memory location which establishes an execution state for the processor in the untrusted computer when the at least one memory location which establishes an execution state for the processor in the untrusted computer is different from a predetermined state
   checking the at least one memory location which establishes an execution state for hardware associated with the untrusted computer; and
   changing the at least one memory location which establishes an execution state for hardware associated with the untrusted computer when the at least one memory location which establishes an execution state for hardware associated with the untrusted computer is different from a predetermined state.

18. The method of claim 1, wherein determining the state of the untampered execution environment includes:
   determining a state of a processor in the untrusted computer; and
   determining a state of hardware associated with the untrusted computer.

19. The method of claim 18, wherein determining the state of the untampered execution environment includes:
   receiving a nonce from the trusted computer;
   using the verification function to determine a checksum over the processor and hardware state on the untrusted computer as a function of the nonce;
   sending the checksum to the trusted computer;
   determining at the trusted computer whether the checksum value is correct; and
   determining at the trusted computer whether the checksum value is received within an expected time period.

20. The method of claim 19, wherein:
   determining whether the verification function and the target executable are unmodified from a value expected by the trusted computer includes using the verification function to determine a checksum over the memory that includes the verification function; and
   using the verification function to determine the checksum over the processor and hardware state is performed at the same time as using the verification function to determine the checksum over the memory that includes the verification function.

21. The method of claim 20, wherein using the verification function to determine the checksum includes using the verification function to determine the checksum over the memory that includes the verification function and the target executable.

22. The method of claim 19 wherein
   determining whether the verification function and the target executable are unmodified from a value expected by the trusted computer includes using the verification function to determine a checksum over the memory that includes the verification function; and
   using the verification function to determine the checksum over the processor and hardware state is performed at a different time than using the verification function to determine the checksum over the memory that includes the verification function.

23. The method of claim 1, wherein establishing the untampered execution environment includes:
   writing at least one value into at least one memory location in the untrusted computer, wherein the at least one memory location establishes an execution state for a processor in the untrusted computer; and
   writing at least one value into at least one memory location in the untrusted computer, wherein the at least one memory location establishes an execution state for hardware associated with the untrusted computer.

24. The method of claim 1, wherein determining the state of the untampered execution environment includes:
writing at least one value into at least one memory location in the untrusted computer, wherein the at least one memory location establishes an execution state for a processor in the untrusted computer; and
writing at least one value into at least one memory location in the untrusted computer, wherein the at least one memory location establishes an execution state for hardware associated with the untrusted computer.

25. The method of claim 24, wherein determining the state of the untampered execution environment includes:
receiving a nonce from the trusted computer;
using the verification function to determine a checksum over the at least one memory location which establishes an execution state for the processor and over the at least one memory location which establishes an execution state for the hardware on the untrusted computer as a function of the nonce;
sending the checksum to the trusted computer;
determining at the trusted computer whether the checksum value is correct; and
determining at the trusted computer whether the checksum value is received within an expected time period.

26. The method of claim 25, wherein the checksum over the at least one memory location which establishes an execution state for the processor and over the at least one memory location which establishes an execution state for the hardware can be computed at the same time as computing the checksum over the verification function, or over the verification function and the target executable.

27. The method of claim 1, further comprising:
using the verification function to determine additional information about the untrusted computer;
sending the additional information to the trusted computer; and
determining at the trusted computer whether the additional information is unmodified from a value expected by the trusted computer.

28. The method of claim 27, wherein determining additional information includes hashing the target executable on the untrusted computer as a function of a nonce sent by the trusted computer, and wherein sending the additional information includes sending a hash value of the executable.

29. The method of claim 27, wherein determining additional information includes hashing a kernel image on the untrusted computer and wherein sending includes sending a hash value of the kernel image to the trusted computer.

30. The method of claim 29, wherein the verification function includes a kernel management agent.

31. The method of claim 30, wherein determining additional information includes:
hashing kernel code on the untrusted computer between "text" and "etext";
reading kernel version information;
determining which loadable kernel modules have been loaded;
hashing loadable kernel module code which has been loaded;
determining whether function pointers in a system call table refer only to kernel code segments and loadable kernel module code; and
determining whether a return address on a stack points back to the kernel code segments and loadable kernel module code segment.

32. The method of claim 31, wherein sending additional information includes: sending the hash of the kernel code segment;
sending the kernel version information and information indicating which loadable kernel modules have been loaded;
sending a hash of loadable kernel module code which has been loaded; sending information indicative of the function pointers; and
sending information indicative of whether a return address on a stack points back to the kernel code segments and loadable kernel module code segment.

33. The method of claim 32, further comprising:
clearing processor caches in the untrusted computer; and
restoring register values in the untrusted computer.

34. The method of claim 27, wherein determining additional information includes determining a value from an integrity measurement of a software stack on the untrusted computer.

35. The method of claim 1 wherein said calculated amount of time is the calculated time plus or minus a tolerance.

* * * * *